US012311524B2

(12) United States Patent
Baruch et al.

(10) Patent No.: US 12,311,524 B2
(45) Date of Patent: May 27, 2025

(54) CONVERTIBLE SAWHORSE AND WORKTABLE

(71) Applicant: The Stanley Works Israel Ltd., Rosh Ha'Ayin (IL)

(72) Inventors: Danny Baruch, Lapid (IL); Ehud Ben-Menashe, Hod Hasharon (IL); Nir Joseph Evron, Yehud (IL)

(73) Assignee: The Stanley Works Israel Ltd., Rosh Ha'Ayin (IL)

( * ) Notice: Subject to any disclaimer, the term of this patent is extended or adjusted under 35 U.S.C. 154(b) by 0 days.

(21) Appl. No.: 17/871,327

(22) Filed: Jul. 22, 2022

(65) Prior Publication Data

US 2022/0355461 A1 Nov. 10, 2022

Related U.S. Application Data

(63) Continuation of application No. 16/530,325, filed on Aug. 2, 2019, now Pat. No. 11,426,856.

(60) Provisional application No. 62/714,248, filed on Aug. 3, 2018.

(51) Int. Cl.
*B25H 1/06* (2006.01)
*B25H 1/04* (2006.01)

(52) U.S. Cl.
CPC ................ *B25H 1/06* (2013.01); *B25H 1/04* (2013.01)

(58) Field of Classification Search
CPC ... B25H 1/04; B25H 1/06; B25H 1/18; B25H 1/10; B25H 1/12; B25B 11/00; Y10S 269/90; Y10S 269/901
USPC ..... 182/153, 181.1, 186.5; 269/16, 136–140, 269/289 R, 45, 79, 283, 100, 244, 88, 99, 269/901, 900
See application file for complete search history.

(56) References Cited

U.S. PATENT DOCUMENTS

| | | | | |
|---|---|---|---|---|
| 4,405,116 A * | 9/1983 | Eisenberg | ............. B66F 7/0608 | 187/269 |
| 6,286,824 B1 * | 9/2001 | Sagol | ....................... B25H 1/04 | 269/900 |
| 6,659,440 B2 * | 12/2003 | Levy | ........................ B25H 1/12 | 269/45 |

* cited by examiner

*Primary Examiner* — Brian D Keller
*Assistant Examiner* — Jason Khalil Hawkins
(74) *Attorney, Agent, or Firm* — Mintz, Levin, Cohn, Ferris, Glovsky and Popeo, P.C.

(57) ABSTRACT

A convertible sawhorse and worktable including a sawhorse assembly having first and second outer-facing side surfaces and a worktable top assembly arranged for selectable positioning relative to the sawhorse assembly, the worktable top assembly including a worktable surface defining element and a worktable auxiliary support assembly, the worktable top assembly having at least two operative orientations including a storage operative orientation wherein the worktable surface defining element is located adjacent the first outer-facing side surface of the sawhorse assembly and the worktable auxiliary support assembly is located adjacent the second outer-facing side surface of the sawhorse assembly and a worktable usage operative orientation wherein the worktable surface defining element is located above the sawhorse assembly and the worktable auxiliary support assembly is located adjacent the second outer-facing side surface of the sawhorse assembly.

10 Claims, 69 Drawing Sheets

CONVERTIBLE SAWHORSE AND WORKTABLE

REFERENCE TO RELATED APPLICATIONS

This application is a continuation of and claims priority to U.S. patent application Ser. No. 16/530,325 filed Aug. 2, 2019 which claimed priority to U.S. Provisional Application Ser. No. 62/714,248 filed Aug. 3, 2018, both of which are incorporated herein by reference in their entireties.

FIELD OF THE INVENTION

The present invention relates to work facilitation equipment generally and more particularly to a convertible sawhorse and worktable.

BACKGROUND OF THE INVENTION

Various types of work facilitation equipment are known. Reference is made to U.S. Pat. No. 6,659,440, entitled Portable Support Assembly for a Workpiece, owned by the assignee of the present invention, the disclosure of which is hereby incorporated by reference, which describes a commercially successful convertible sawhorse and worktable.

BRIEF SUMMARY OF THE INVENTION

The present invention seeks to provide an improved convertible sawhorse and worktable.

There is thus provided in accordance with a preferred embodiment of the present invention a convertible sawhorse and worktable including a sawhorse assembly having first and second outer-facing side surfaces and a worktable top assembly arranged for selectable positioning relative to the sawhorse assembly, the worktable top assembly including a worktable surface defining element and a worktable auxiliary support assembly, the worktable top assembly having at least two operative orientations including a storage operative orientation wherein the worktable surface defining element is located adjacent the first outer-facing side surface of the sawhorse assembly and the worktable auxiliary support assembly is located adjacent the second outer-facing side surface of the sawhorse assembly and a worktable usage operative orientation wherein the worktable surface defining element is located above the sawhorse assembly and the worktable auxiliary support assembly is located adjacent the second outer-facing side surface of the sawhorse assembly.

In accordance with a preferred embodiment of the present invention the worktable top assembly also includes at least one intermediate linkage interconnecting the worktable surface defining element and the worktable auxiliary support assembly, thereby enhancing ease of articulation of the worktable defining element relative to the worktable auxiliary support assembly.

In accordance with a preferred embodiment of the present invention the convertible sawhorse and worktable also includes an automatically operative lock for automatically locking the worktable surface defining element to the sawhorse assembly when the worktable top assembly is in the worktable usage operative orientation. Additionally or alternatively, the convertible sawhorse and worktable also includes an automatically operative lock for automatically locking the worktable surface defining element to the worktable auxiliary support assembly when the worktable top assembly is in the worktable usage operative orientation.

Preferably, the automatically operative lock for automatically locking the worktable surface defining element to the sawhorse assembly when the worktable top assembly is in the worktable usage operative orientation includes a manually engageable button for unlocking the worktable surface defining element from the sawhorse assembly.

In accordance with a preferred embodiment of the present invention the sawhorse assembly includes a pair of rollers and the worktable top assembly includes a pair of tracks arranged to ride on the rollers when the worktable top assembly is being displaced between the storage operative orientation and the worktable usage operative orientation.

There is also provided accordance with another preferred embodiment of the present invention a convertible sawhorse and worktable including a sawhorse assembly having first and second outer-facing side surfaces and a worktable top assembly arranged for selectable positioning relative to the sawhorse assembly, the worktable top assembly including a worktable surface defining element, a worktable auxiliary support assembly and at least one intermediate linkage interconnecting the worktable surface defining element and the worktable auxiliary support assembly, thereby enhancing ease of articulation of the worktable defining element relative to the worktable auxiliary support assembly.

In accordance with a preferred embodiment of the present invention the worktable top assembly has at least two operative orientations including a storage operative orientation and a worktable usage operative orientation. Additionally, the convertible sawhorse and worktable also includes an automatically operative lock for automatically locking the worktable surface defining element to the sawhorse assembly when the worktable top assembly is in the worktable usage operative orientation. Additionally, or alternatively, the convertible sawhorse and worktable also includes an automatically operative lock for automatically locking the worktable surface defining element to the worktable auxiliary support assembly when the worktable top assembly is in the worktable usage operative orientation.

Preferably, the automatically operative lock for automatically locking the worktable surface defining element to the sawhorse assembly when the worktable top assembly is in the worktable usage operative orientation includes a manually engageable button for unlocking the worktable surface defining element from the sawhorse assembly.

In accordance with a preferred embodiment of the present invention the sawhorse assembly includes a pair of rollers and the worktable top assembly includes a pair of tracks arranged to ride on the rollers when the worktable top assembly is being displaced between the storage operative orientation and the worktable usage operative orientation.

There is further provided accordance with yet another preferred embodiment of the present invention a convertible sawhorse and worktable including a sawhorse assembly having first and second outer-facing side surfaces and a worktable top assembly arranged for selectable positioning relative to the sawhorse assembly, the worktable top assembly including a worktable surface defining element, a worktable auxiliary support assembly and an automatically operative lock for automatically locking the worktable surface defining element to the sawhorse assembly when the worktable top assembly is in a worktable usage operative orientation.

In accordance with a preferred embodiment of the present invention worktable top assembly has at least two operative orientations including a storage operative orientation and the worktable usage operative orientation.

Preferably, the worktable top assembly has at least one intermediate linkage interconnecting the worktable surface defining element and the worktable auxiliary support assembly, thereby enhancing ease of articulation of the worktable defining element relative to the worktable auxiliary support assembly.

Preferably, the convertible sawhorse and worktable also includes an automatically operative lock for automatically locking the worktable surface defining element to the worktable auxiliary support assembly when the worktable top assembly is in the worktable usage operative orientation.

In accordance with a preferred embodiment of the present invention the automatically operative lock for automatically locking the worktable surface defining element to the sawhorse assembly when the worktable top assembly is in the worktable usage operative orientation includes a manually engageable button for unlocking the worktable surface defining element from the sawhorse assembly.

In accordance with a preferred embodiment of the present invention the sawhorse assembly includes a pair of rollers and the worktable top assembly includes a pair of tracks arranged to ride on the rollers when the worktable top assembly is being displaced between the storage operative orientation and the worktable usage operative orientation.

There is even further provided in accordance with still another preferred embodiment of the present invention a convertible sawhorse and worktable including a sawhorse assembly having first and second outer-facing side surfaces and a worktable top assembly arranged for selectable positioning relative to the sawhorse assembly, the worktable top assembly including a worktable surface defining element, a worktable auxiliary support assembly and an automatically operative lock for automatically locking the worktable surface defining element to the worktable auxiliary support assembly when the worktable top assembly is in a worktable usage operative orientation.

In accordance with a preferred embodiment of the present invention the worktable top assembly has at least two operative orientations including a storage operative orientation and the worktable usage operative orientation. Additionally, or alternatively, the worktable top assembly has at least one intermediate linkage interconnecting the worktable surface defining element and the worktable auxiliary support assembly, thereby enhancing ease of articulation of the worktable defining element relative to the worktable auxiliary support assembly.

Preferably, the convertible sawhorse and worktable also includes an automatically operative lock for automatically locking the worktable surface defining element to the sawhorse assembly when the worktable top assembly is in the worktable usage operative orientation. Additionally, the automatically operative lock for automatically locking the worktable surface defining element to the sawhorse assembly when the worktable top assembly is in the worktable usage operative orientation includes a manually engageable button for unlocking the worktable surface defining element from the sawhorse assembly.

In accordance with a preferred embodiment of the present invention the sawhorse assembly includes a pair of rollers and the worktable top assembly includes a pair of tracks arranged to ride on the rollers when the worktable top assembly is being displaced between the storage operative orientation and the worktable usage operative orientation.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 1A:
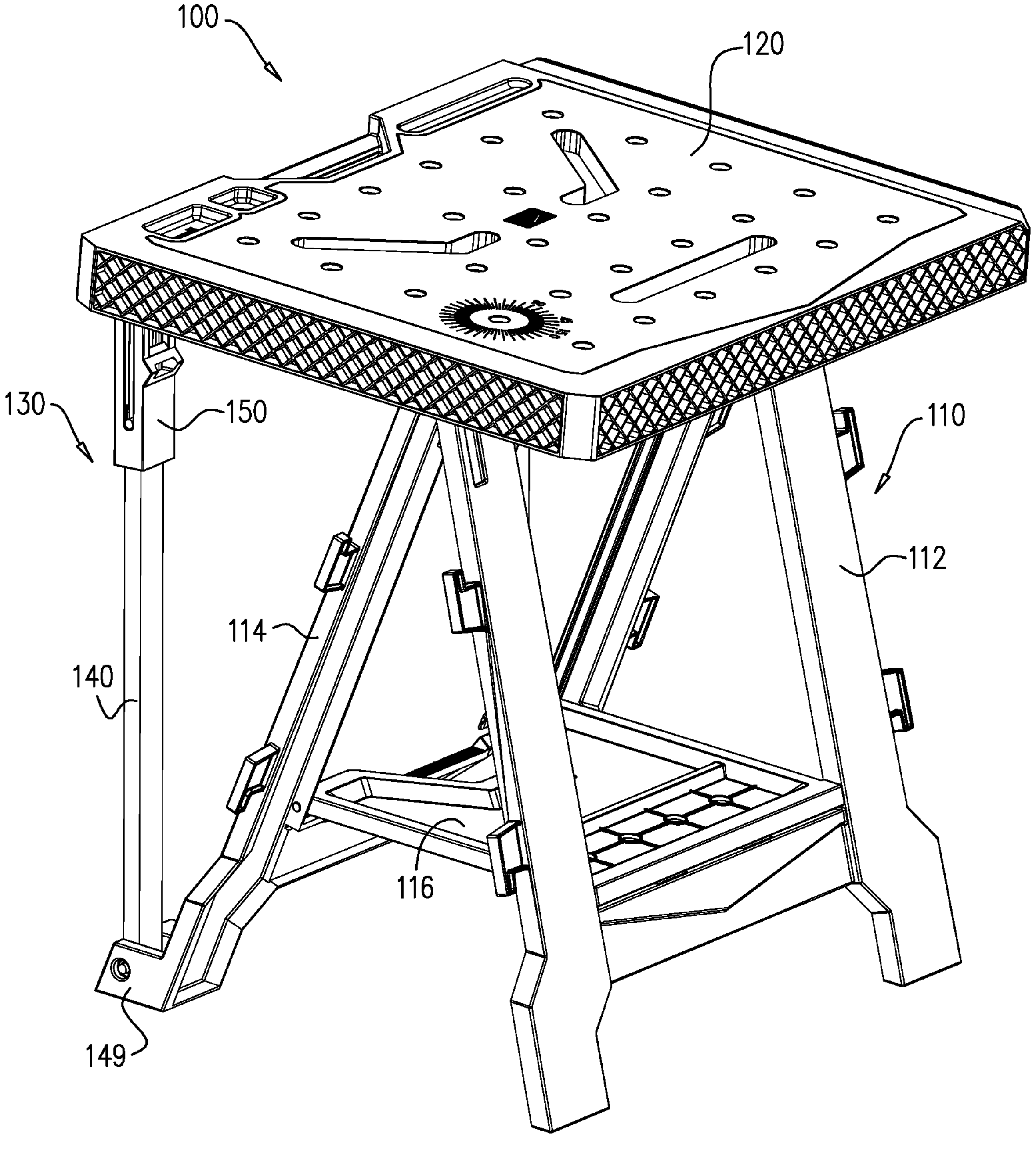
FIGS. 1A, 1B and 1C are three simplified pictorial view illustrations, taken from different angles, of a convertible sawhorse and worktable assembly constructed and operative in accordance with a preferred embodiment of the invention, in a worktable usage operative orientation.
Figure 1B:
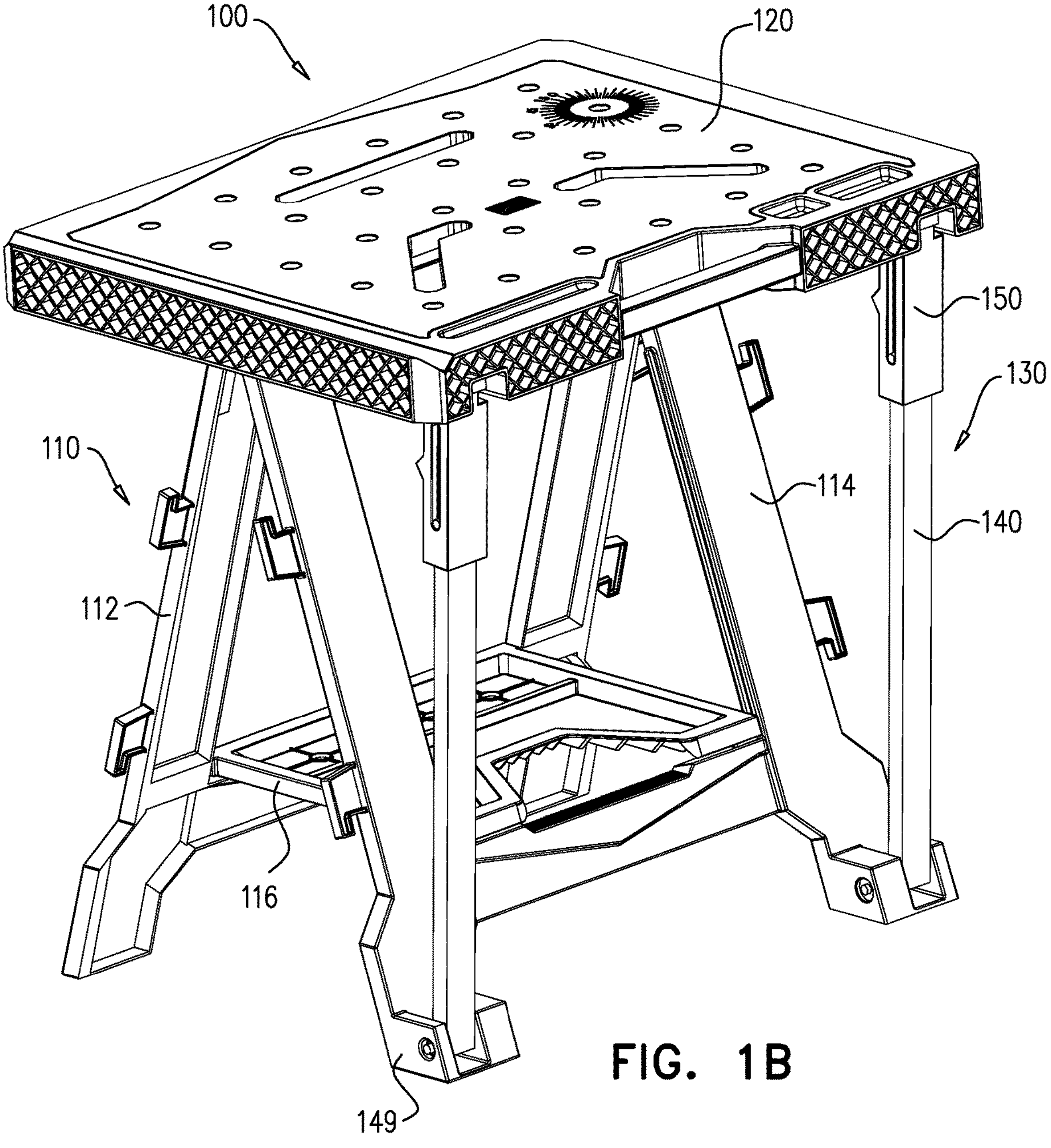
Figure 1C:
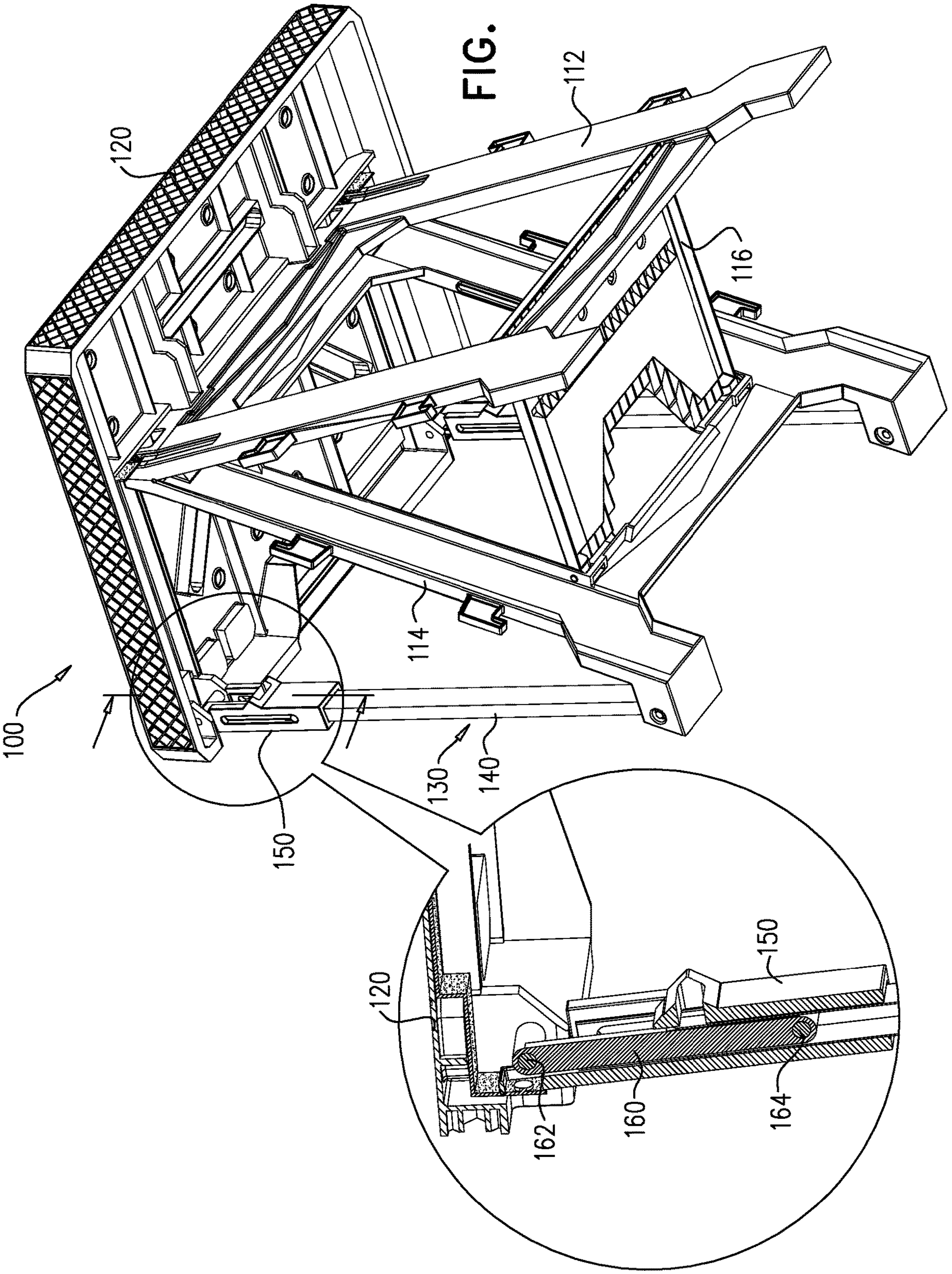

Reference is now made to FIGS. 1A-2B, which illustrate a convertible sawhorse and worktable assembly 100 constructed and operative in accordance with a preferred embodiment of the invention, in a worktable usage operative orientation.

As seen in FIGS. 1A-2B, the convertible sawhorse and worktable assembly 100 comprises a sawhorse assembly 110, including first and second mutually articulated sawhorse elements 112 and 114 and a tray element 116, which is pivotably mounted onto first sawhorse element 112 for selectable stable engagement with second sawhorse element 114. First and second mutually articulated sawhorse elements 112 and 114 are mutually pivotable about a pivot axle 118, as described hereinbelow with reference to FIGS. 13A-14B. The structure and assembly of the sawhorse assembly 110 is described hereinbelow and shown in detail in FIGS. 4A-6D and FIGS. 13A-14C.

Selectably and convertibly positioned onto the sawhorse assembly 110 is a worktable surface defining element 120, which, when in a worktable usage operative orientation, is supported by the sawhorse assembly 110 and also supported by a worktable auxiliary support assembly 130.

Figure 16:
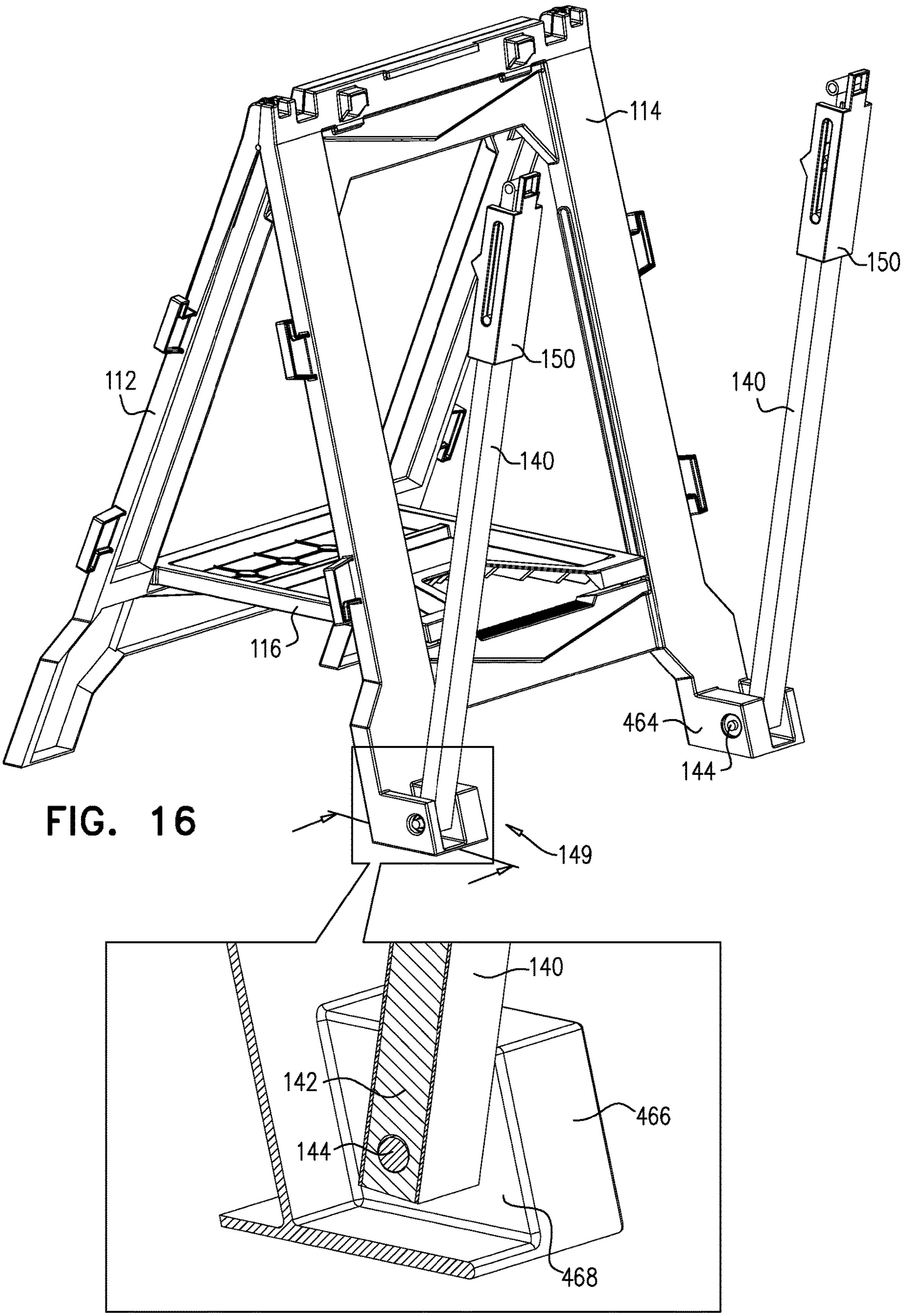
FIG. 16 is a simplified pictorial illustration of the pivotable mounting of worktable auxiliary support assembly onto the sawhorse assembly.

Worktable auxiliary support assembly 130 preferably comprises a pair of leg elements 140, which are described hereinbelow in greater detail with reference to FIGS. 7A-7D. Associated with each of leg elements 140 is a leg bottom reinforcing and mounting element 142, which is inserted in the bottom of each leg element 140 and a mounting pin 144, which extends through mutually corresponding pivot mounting apertures 146 and 148 in each leg element 140 and each leg bottom reinforcing and mounting element 142. Each leg element 140 and corresponding leg bottom reinforcing and mounting element 142 is pivotably mounted via mounting pin 144 onto a correspondingly apertured foot 149 of second sawhorse element 114, as seen clearly in FIG. 16.

Associated with each leg element 140 at a top portion thereof is a corresponding selectably lockable leg articulation element 150, which is described hereinbelow in greater detail with reference to FIGS. 8A-8E. Each leg articulation element 150 cooperates with a corresponding linkage element 160, which is described hereinbelow in greater detail with reference to FIGS. 9A-9D. Linkage elements 160 slidably and pivotably engage worktable surface defining element 120 and, together with leg articulation elements 150, enable worktable surface defining element 120 to be displaced from a storage operative orientation to a worktable usage operative orientation and vice versa with relative ease. Each of linkage elements is associated with a worktable surface defining element pivotable engagement pin 162 and an articulation element pivotable and slidable engagement pin 164.

Convertible sawhorse and worktable assembly 100 also comprises a mechanism for selectable locking of the worktable surface defining element 120 in the worktable usage operative orientation and which includes a manually operable table locking element 170, which is described hereinbelow in greater detail with reference to FIGS. 10A-10C and which is associated with compression springs 172. Manually operable table locking element 170 is pivotably mounted onto worktable surface defining element 120 as will be described hereinbelow in greater detail and retained in position by a pair of transverse retaining pins 174.

A pair of roller elements 180, each of which is described hereinbelow in greater detail with reference to FIGS. 11A & 11B, facilitates displacement of worktable surface defining element 120 from the storage operative orientation to the worktable usage operative orientation.

A pair of leg locking elements 190 are flexibly mounted on the underside of the worktable surface defining element 120 for selectable locking engagement with corresponding selectably lockable leg articulation element 150, as described hereinbelow with reference to FIGS. 25A-25C.

Figure 2A:
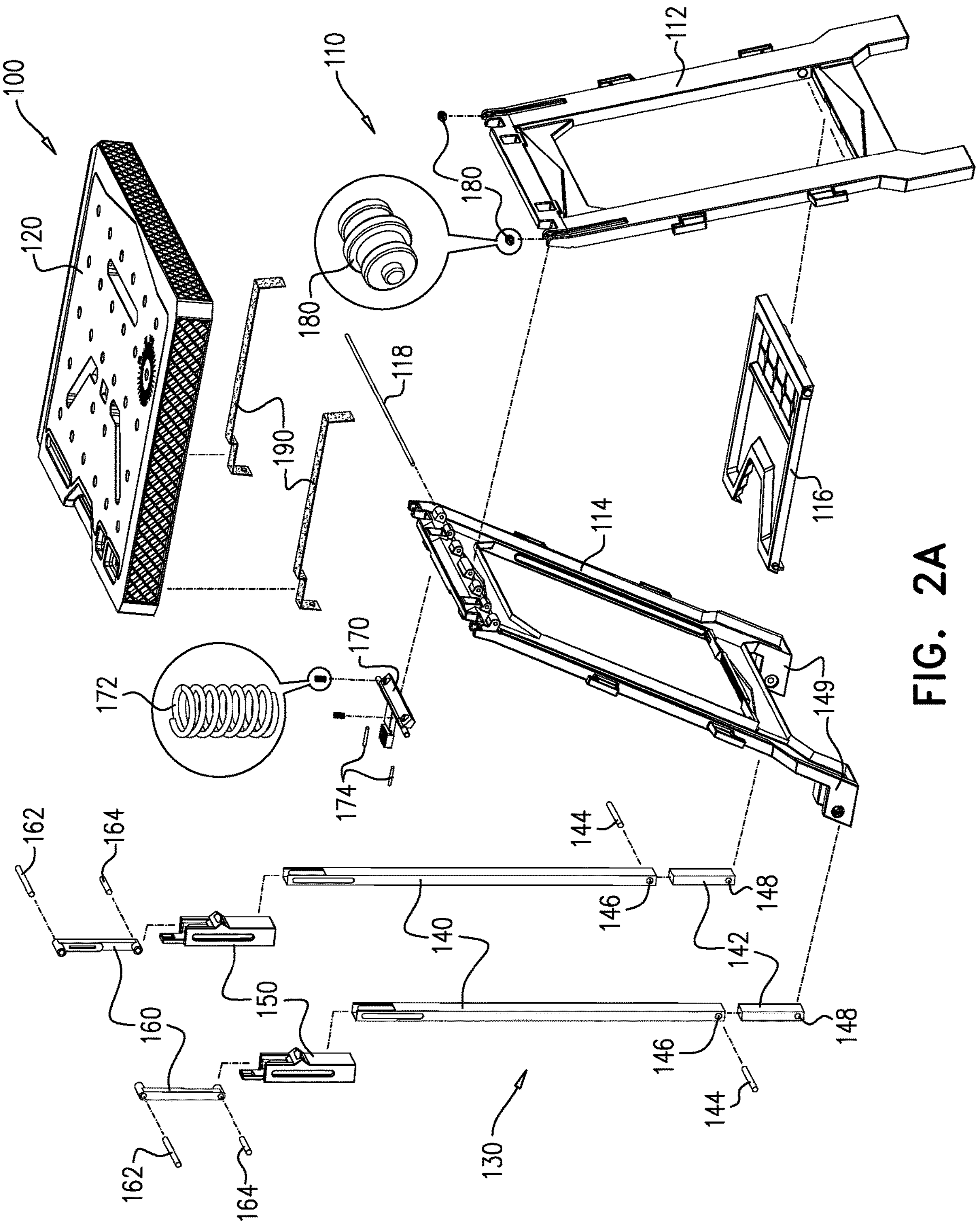
FIGS. 2A and 2B are simplified fully and partially exploded view illustrations of the convertible sawhorse and worktable assembly of FIGS. 1A-1C.
Figure 2B:
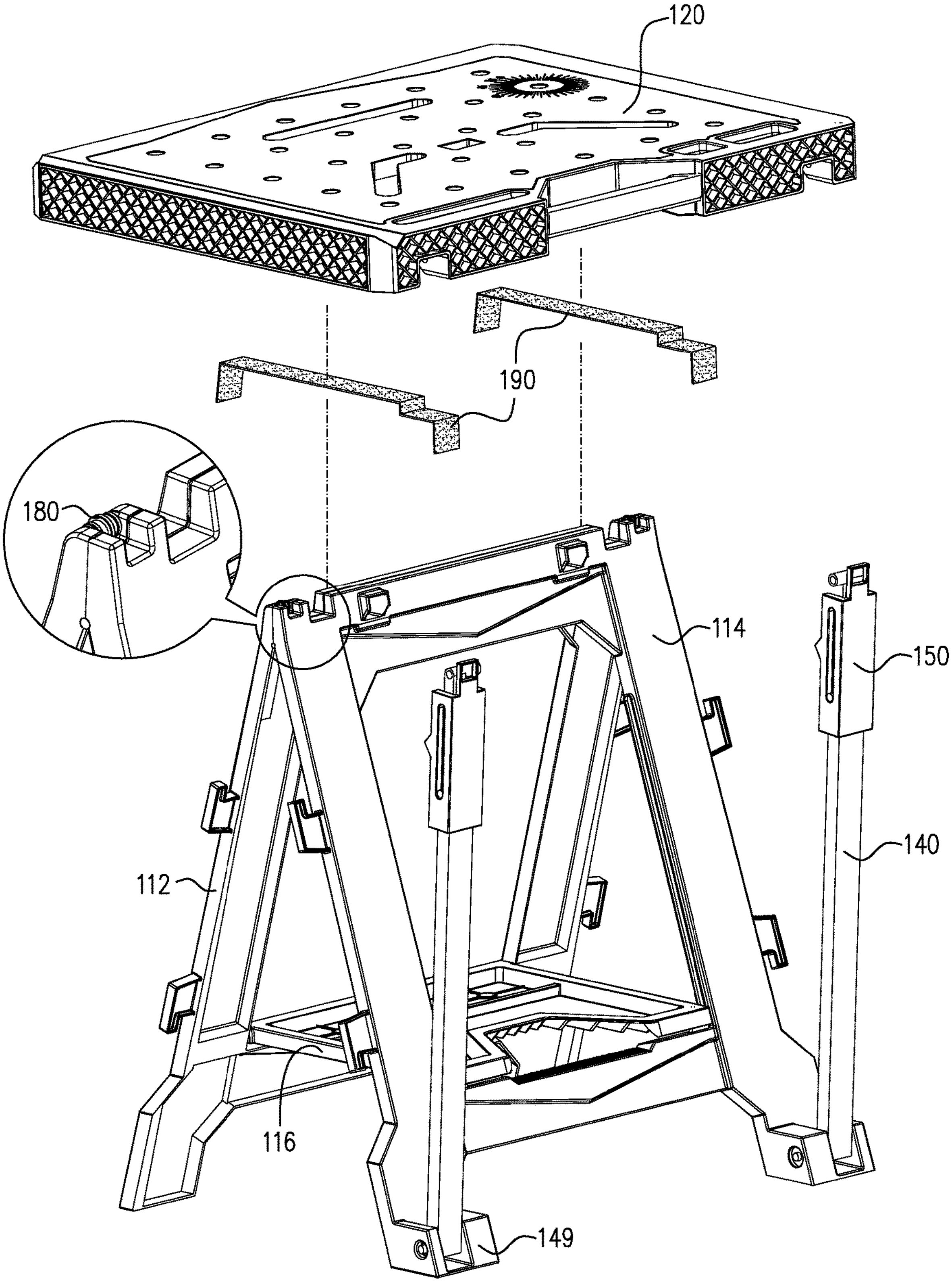
Figure 3A:
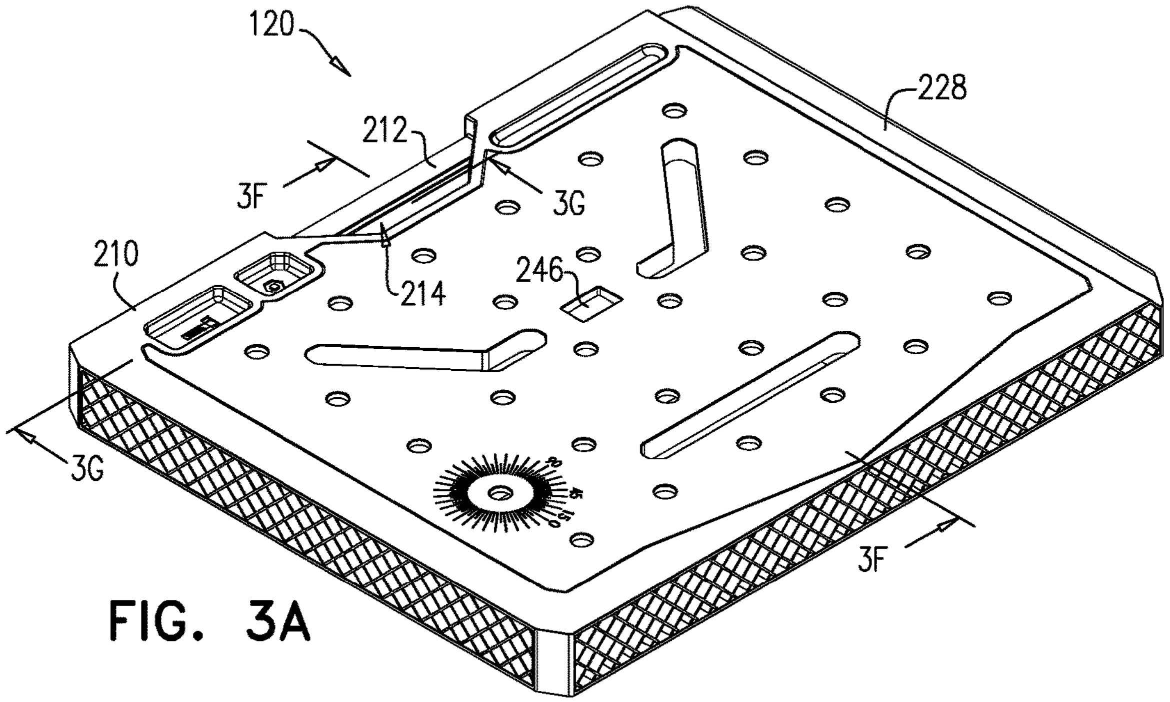
FIGS. 3A, 3B, 3C, 3D, 3E, 3F and 3G are simplified respective top pictorial, bottom pictorial, top planar, bottom planar and side planar views and first and second pictorial sectional views of a worktable surface defining element forming part of the convertible sawhorse and worktable assembly of FIGS. 1A-2B, FIGS. 3F and 3G being taken along respective lines 3F-3F and 3G-3G in FIG. 3A.

Reference is now made to FIGS. 3A, 3B, 3C, 3D, 3E, 3F and 3G, which are simplified respective top pictorial, bottom pictorial, top planar, bottom planar and side planar views and first and second pictorial sectional views of worktable surface defining element 120, forming part of the convertible sawhorse and worktable assembly of FIGS. 1A-2B, FIGS. 3F and 3G being taken along respective lines 3F-3F and 3G-3G in FIG. 3A.

As seen in FIGS. 3A-3G, worktable surface defining element 120 is a generally rectangular, generally flat element which defines, at a front edge 210 thereof, a carrying handle 212, which spans a carrying handle recess 214. Also located at an underside of worktable surface defining element 120 adjacent front edge 210 of worktable surface defining element 120 are first and second pairs 220 of apertured pivotable mounting brackets 222 for pivotable mounting therebetween of linkage elements 160 via respective pins 162. Additionally located on an underside of worktable surface defining element 120 are a pair of locking protrusions 226.

Figure 3B:
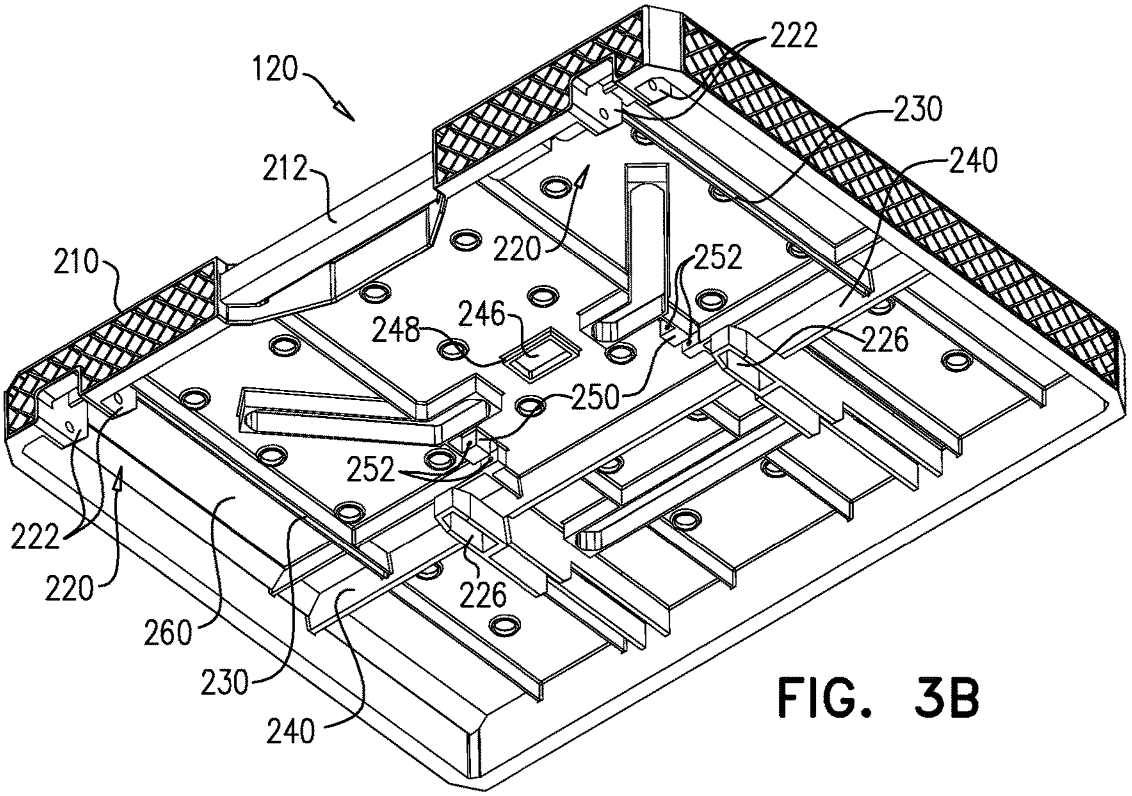
Figure 3C:
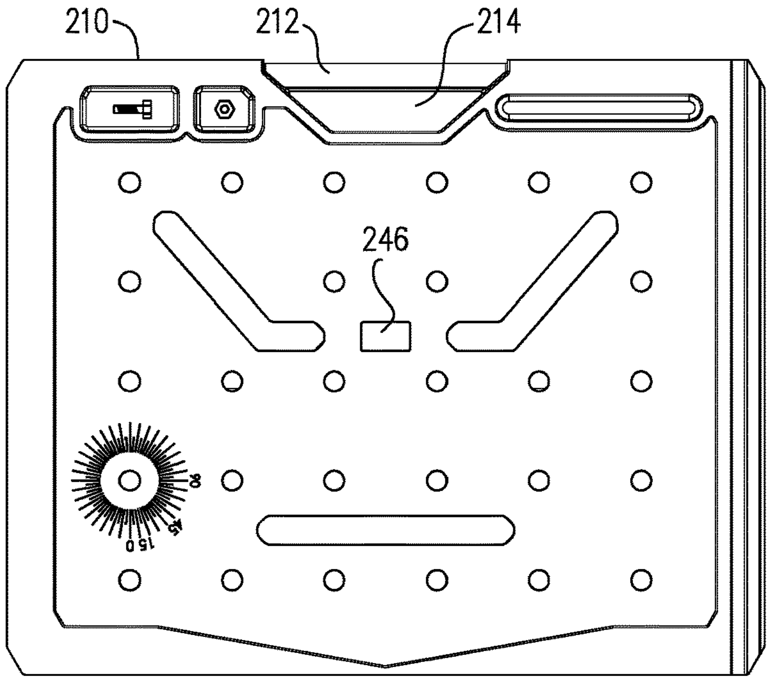
Figure 3D:
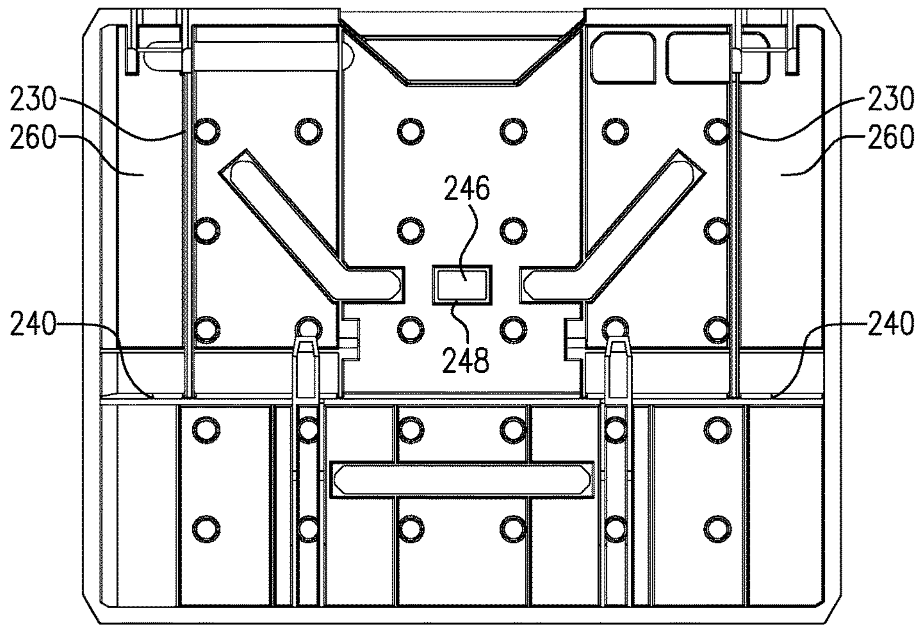
Figure 3E:
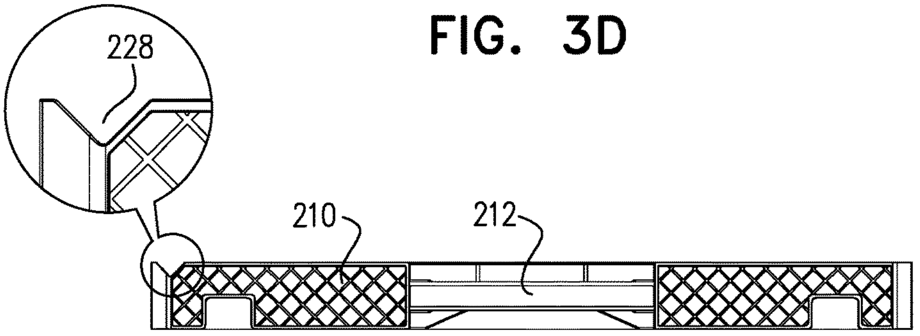
Figure 3F:
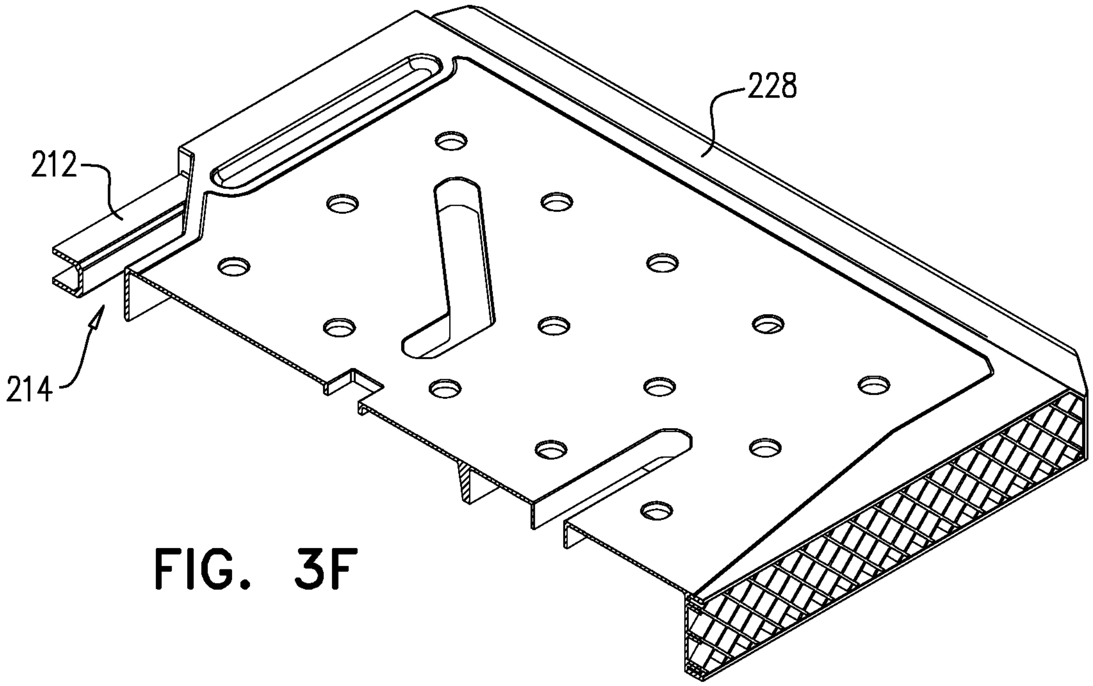
Figure 3G:
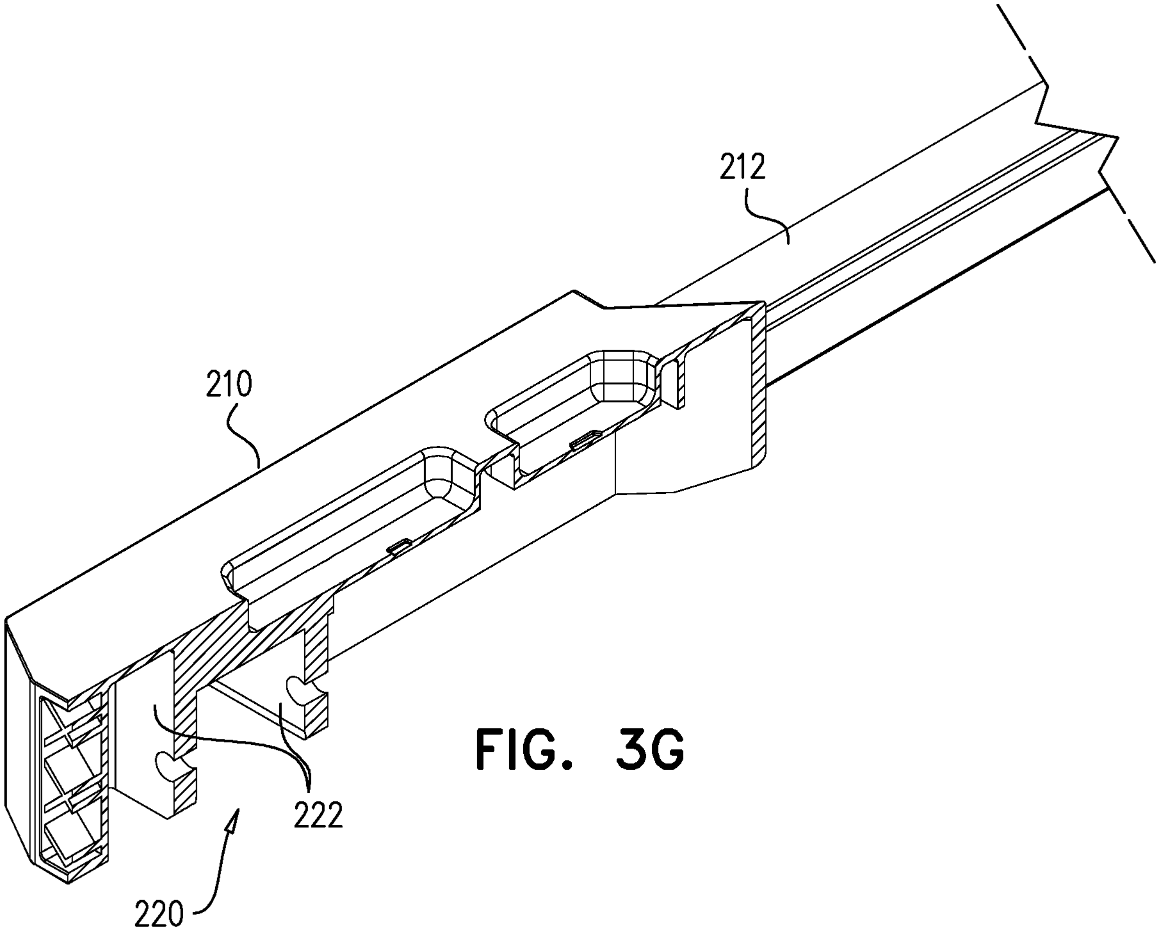
Figure 4A:
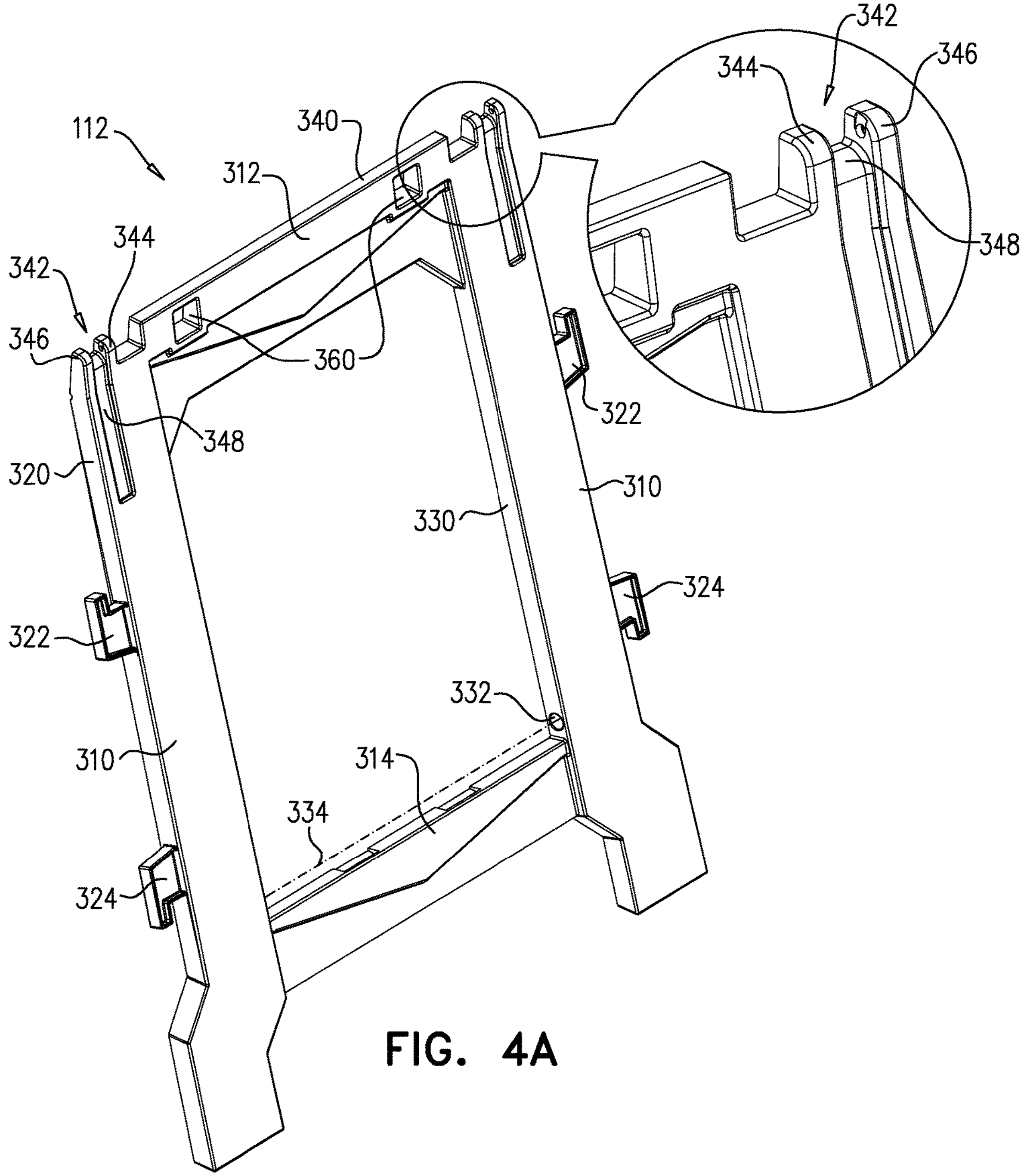
FIGS. 4A, 4B, 4C and 4D are simplified respective first and second pictorial, and inward-facing planar and side planar views of a first sawhorse element, forming part of the convertible sawhorse and worktable assembly of FIGS. 1A-2B.
Figure 4B:
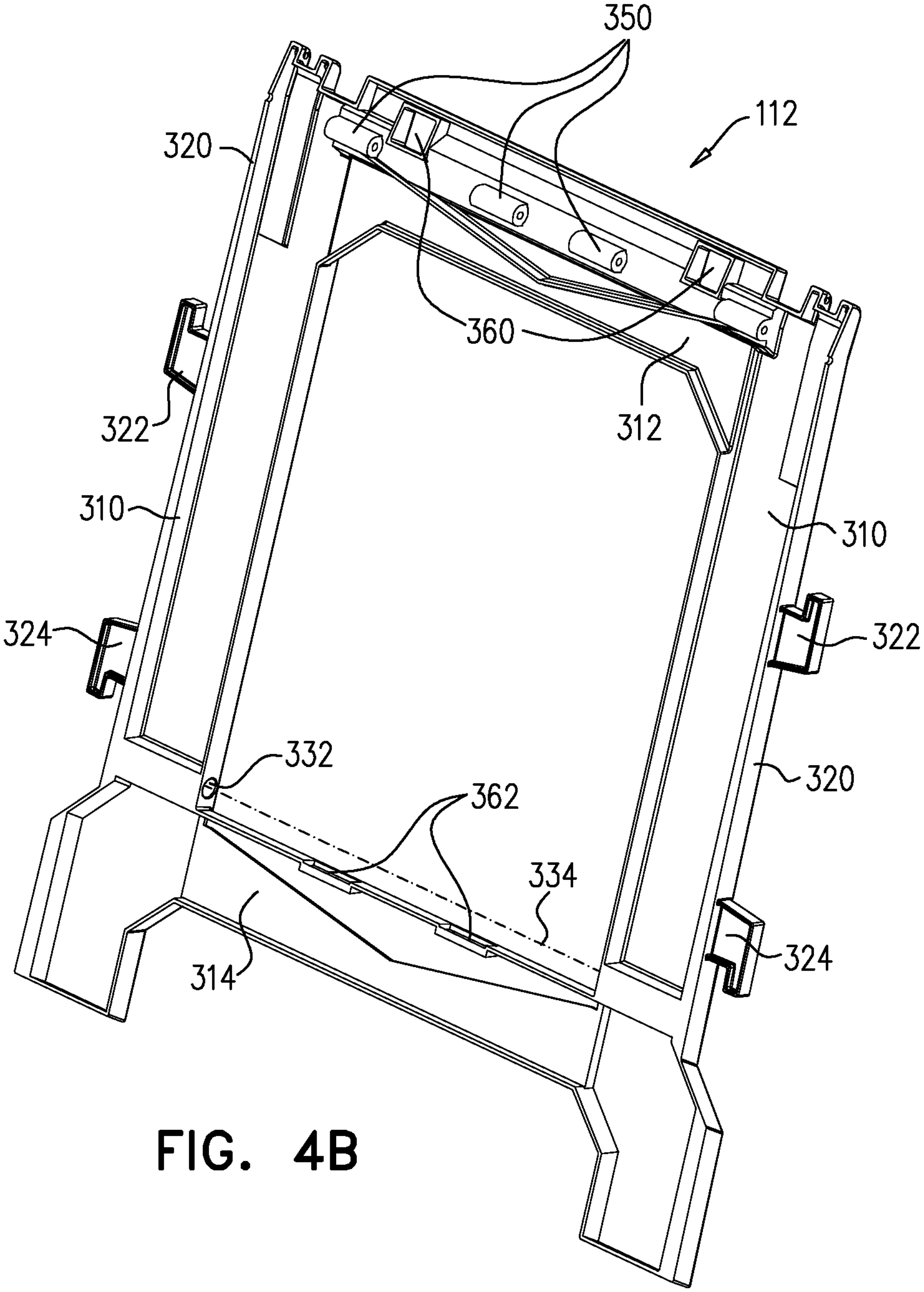
Figure 4D:
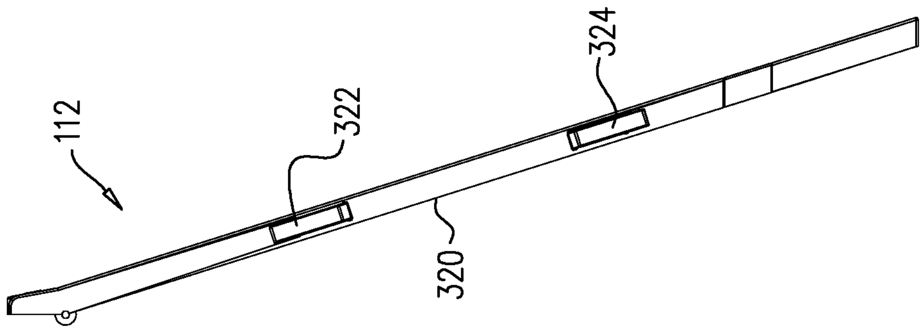
Figure 4C:
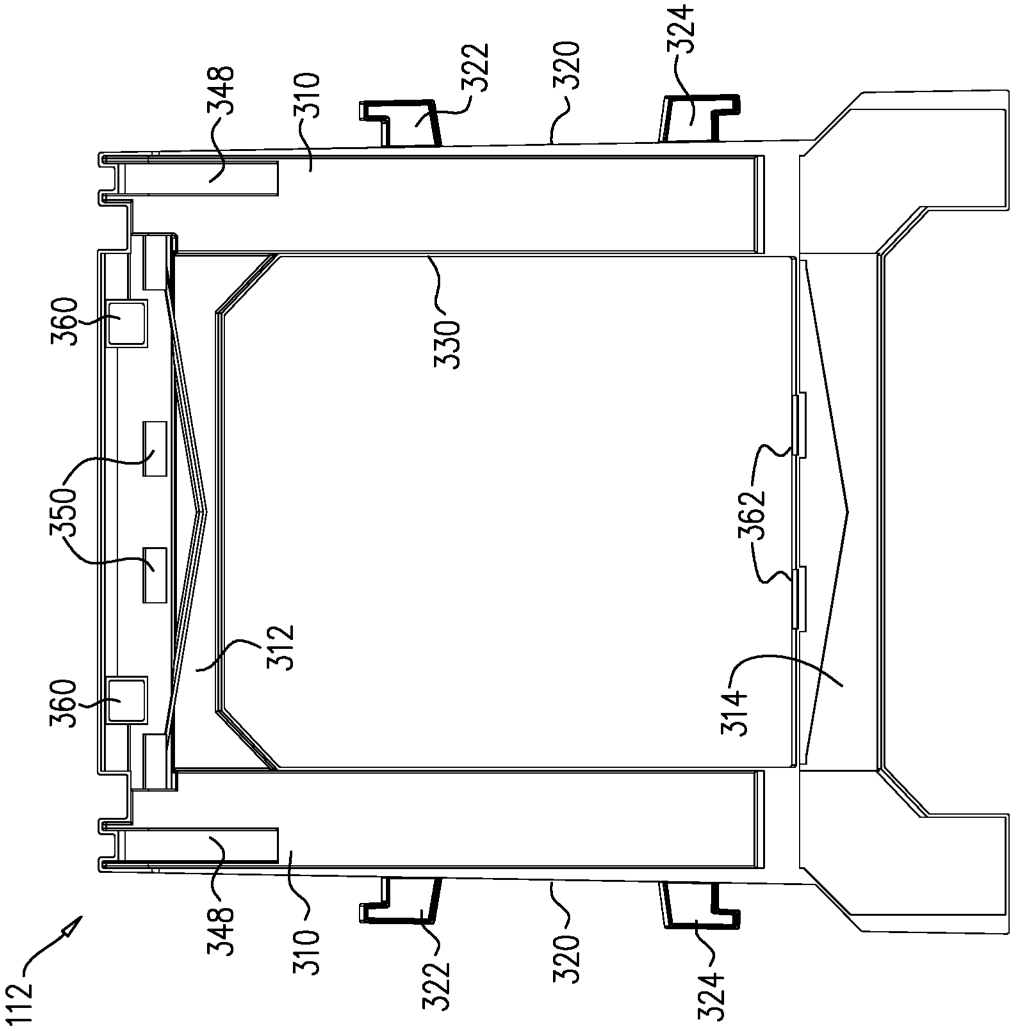
Figure 5A:
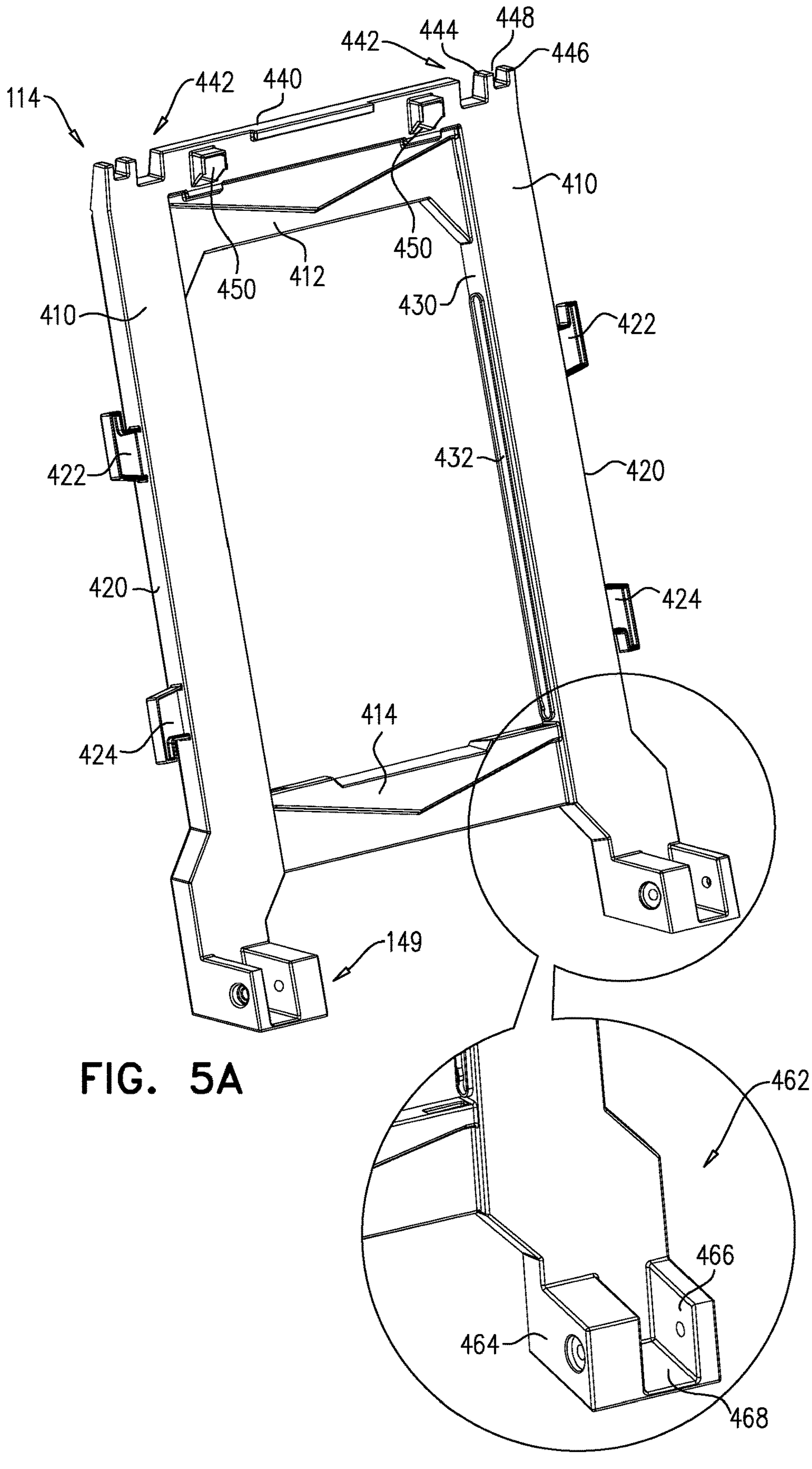
FIGS. 5A, 5B, 5C and 5D are simplified respective first and second pictorial, and inward-facing planar and side planar views of a second sawhorse element, forming part of the convertible sawhorse and worktable assembly of FIGS. 1A-2B.
Figure 5B:
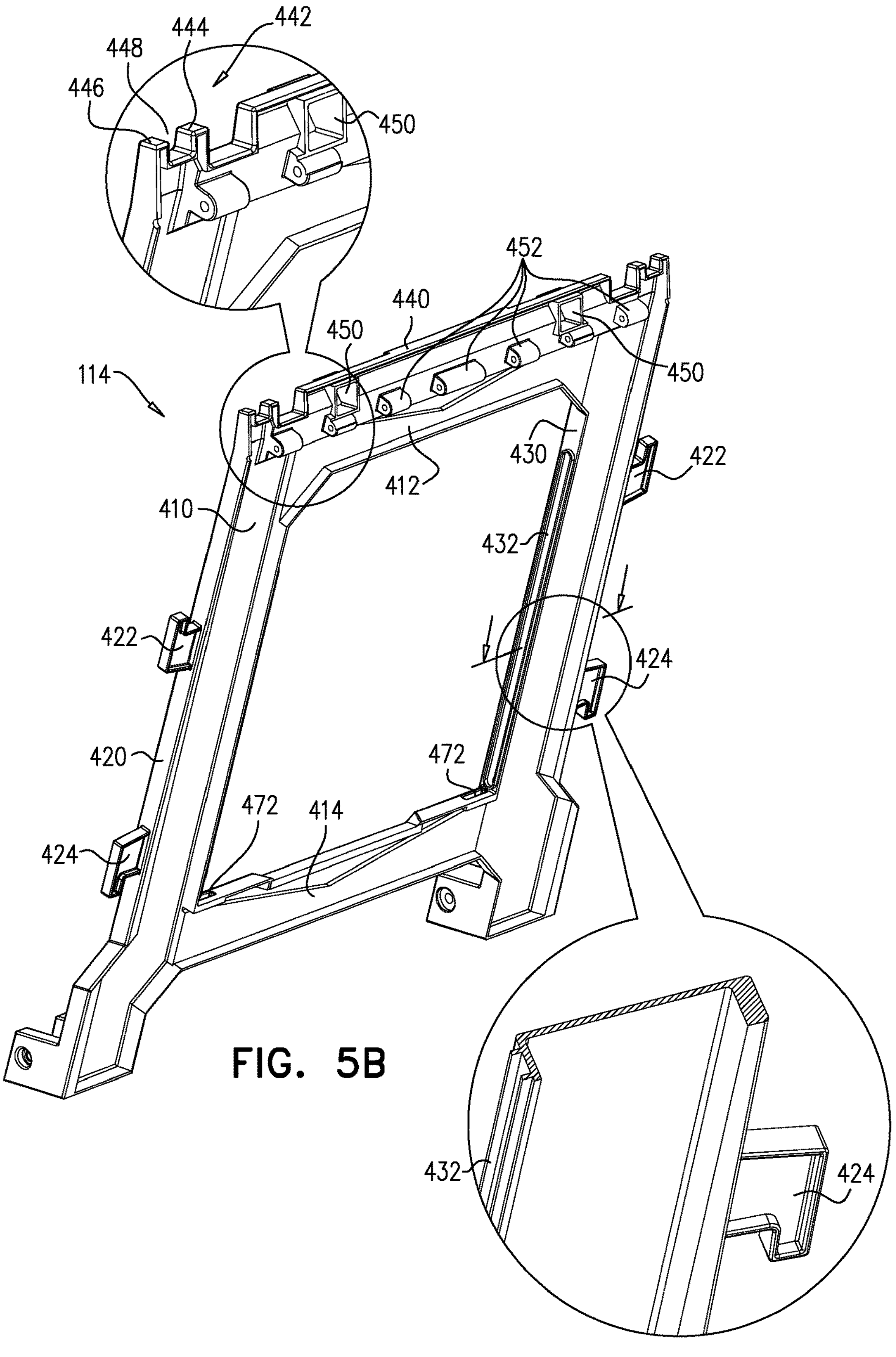
Figure 5D:
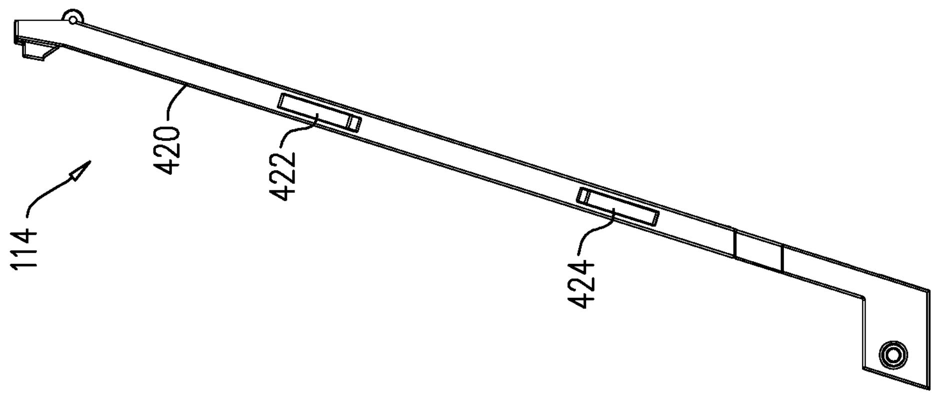
Figure 5C:
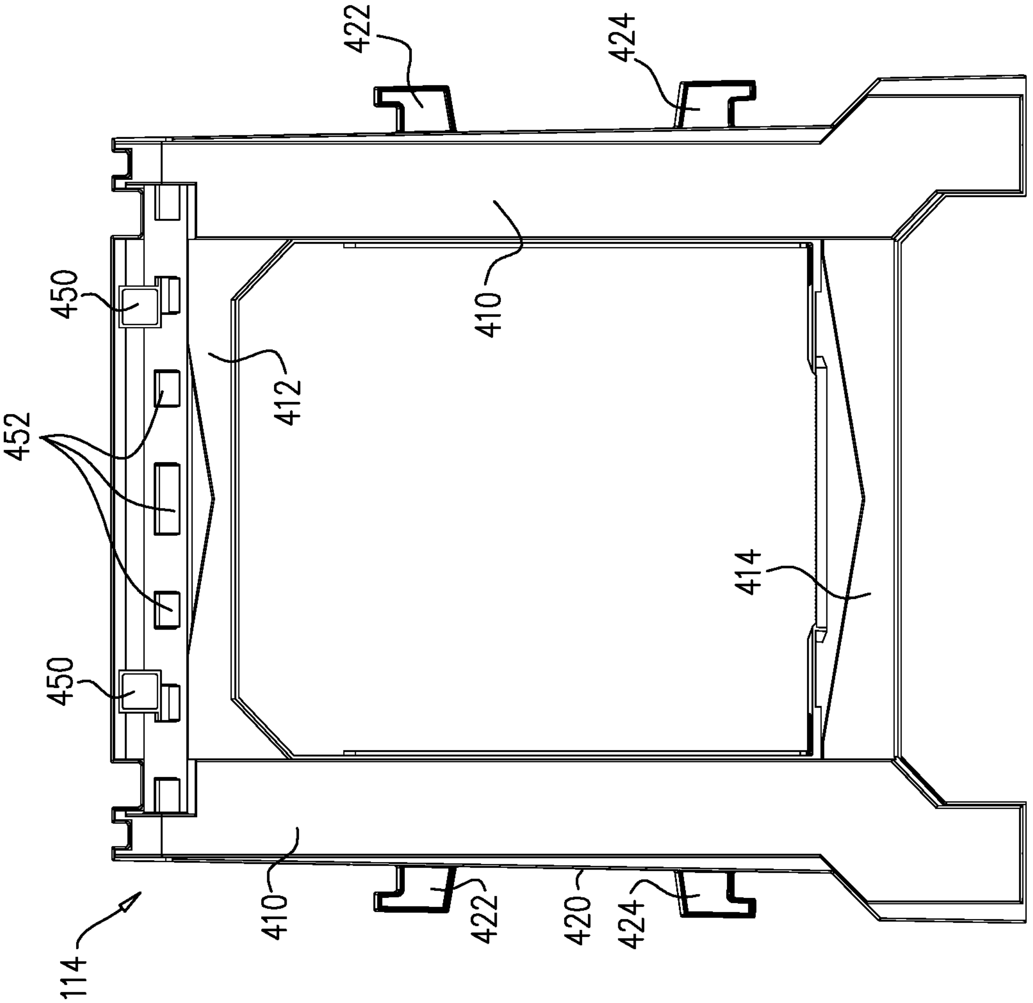
Figure 6A:
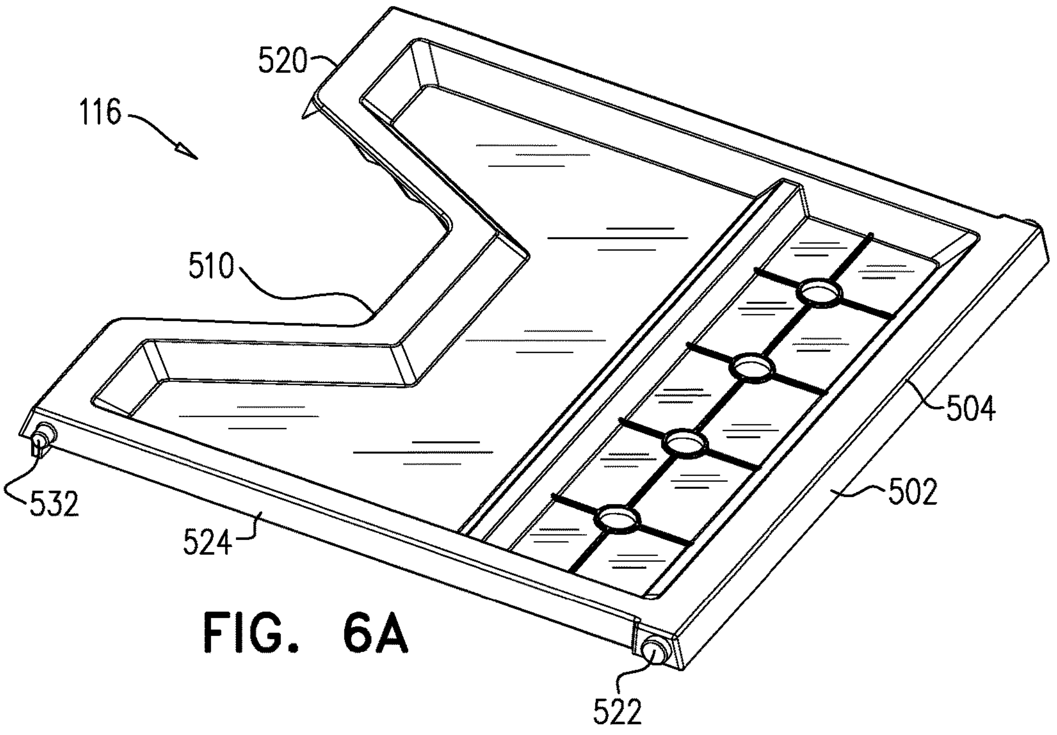
FIGS. 6A, 6B, 6C and 6D are simplified respective top and bottom pictorial, and top planar and side planar views of a tray element, forming part of the convertible sawhorse and worktable assembly of FIGS. 1A-2B.
Figure 6B:
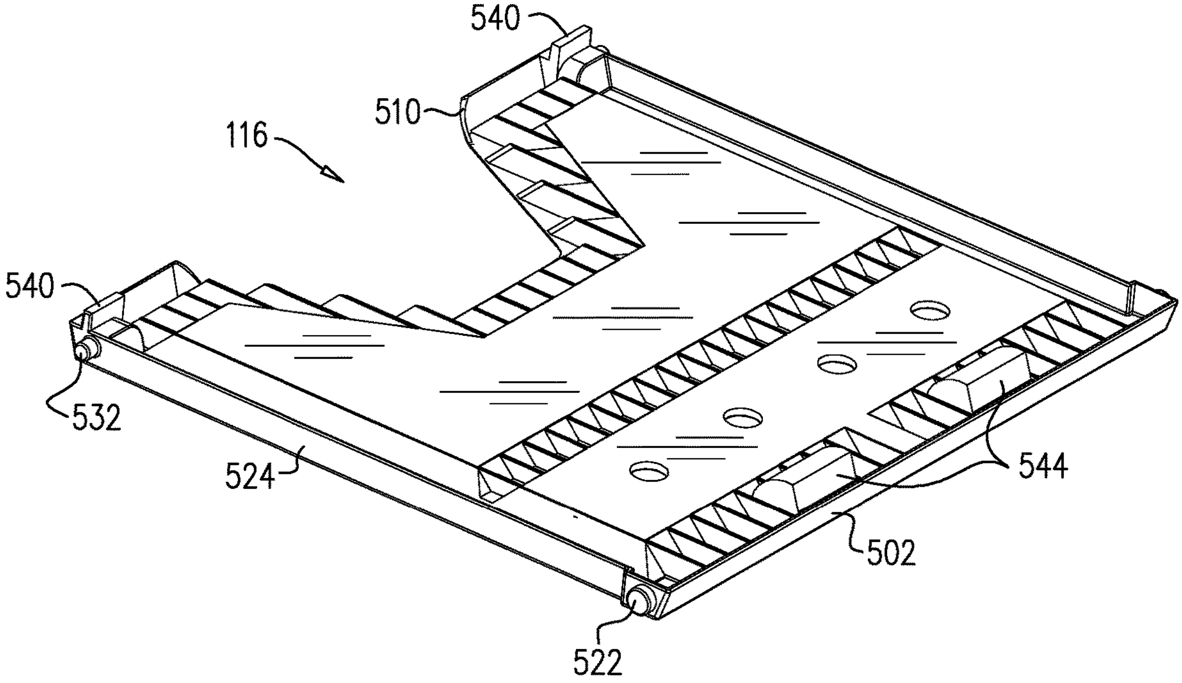
Figure 6C:
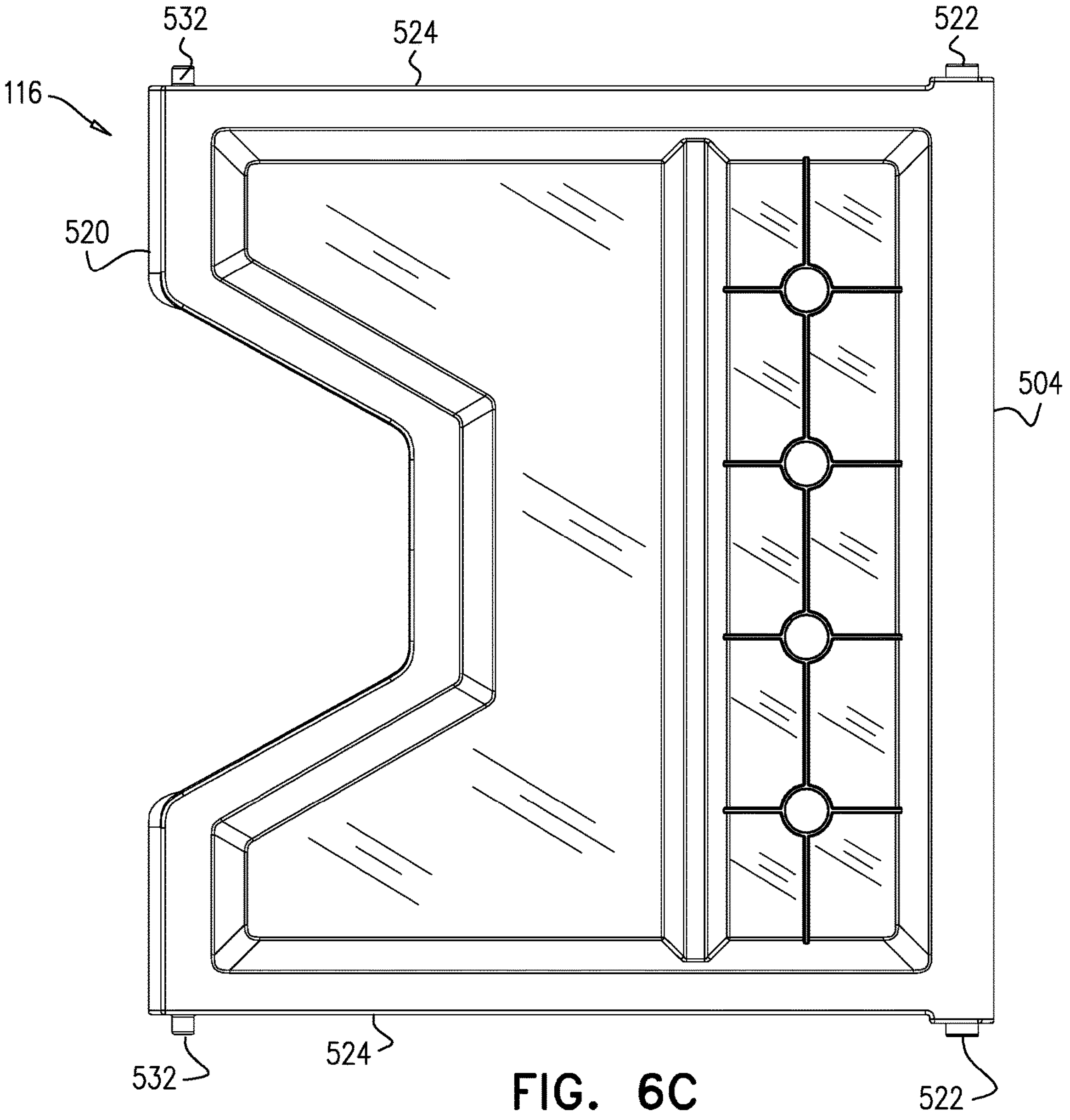
Figure 6D:
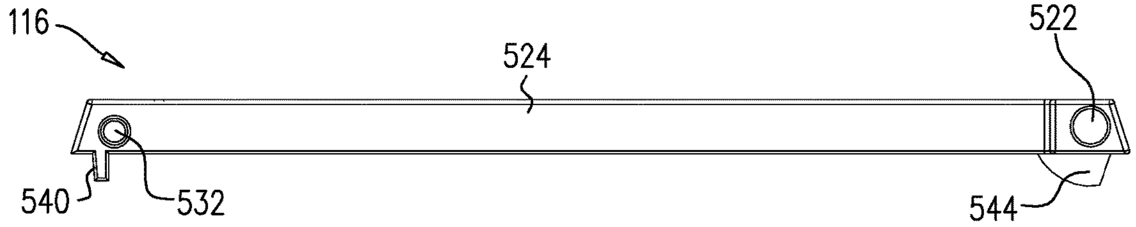

As seen particularly in FIGS. 3A and 3E, worktable surface defining element 120 is preferably formed with an elongate side notch 228, to facilitate secure placement therein of elongate round objects, such as pipes.

As seen most clearly in FIGS. 3B and 3D, worktable surface defining element 120 is formed on an underside thereof with a pair of parallel roller engagement tracks 230 which are arranged to ride on roller elements 180 as the worktable surface defining element 120 is moved between the storage operative orientation and the worktable usage operative orientation, as will be described hereinbelow. Roller engagement tracks 230 each terminate at a respective stop surface 240, which limits relative linear displacement between the worktable surface defining element 120 and the roller elements 180 and thus defines the orientation of the worktable surface defining element 120 relative to the sawhorse assembly 110 in the worktable usage operative orientation.

Worktable surface defining element 120 is preferably formed with a manually engageable button accommodating aperture 246. As seen particularly in FIGS. 3B and 3D, worktable surface defining element 120 is preferably formed on an underside thereof with a rectangular protrusion 248 surrounding manually engageable button accommodating aperture 246. As seen particularly in FIGS. 3B and 3D, worktable surface defining element 120 is preferably formed on an underside thereof with two pairs of locking element pivotable mounting brackets 250, each pair of which are formed with mutually facing apertures 252 for receiving transverse retaining pin 174. As also seen particularly in FIGS. 3B and 3D, worktable surface defining element 120 is preferably formed on an underside thereof with a pair of leg locking element mounting slots 260, for receiving and retaining leg locking elements 190.

Reference is now made to FIGS. 4A, 4B, 4C and 4D, which are simplified respective first and second pictorial, and inward-facing planar and side planar views of first sawhorse element 112, forming part of the convertible sawhorse and worktable assembly of FIGS. 1A-2B. As seen in FIGS. 4A-4D, first sawhorse element 112 is preferably a unitary element, molded of plastic and includes first and second leg portions 310, which are generally mirror images of each other, a top cross piece portion 312 and a bottom cross piece portion 314.

Each of leg portions 310 is preferably formed at an outer-facing edge 320 thereof with a pair of respectively upward-facing and downward-facing protruding hook portions 322 and 324. Each of leg portions 310 is also preferably formed at an inner-facing edge 330 thereof with an aperture 332 for pivot mounting of tray element 116 along a pivot axis 334.

Each of leg portions 310 is preferably additionally formed at a top-facing edge 340 thereof with a pair 342 of upward-facing pivotable mounting brackets 344 and 346, which are separated by a downwardly extending recess 348.

Top cross piece portion 312 is preferably formed with a linear array of pivot axle receiving protrusions 350, on an inner facing surface thereof, which are interdigitated with similar protrusions on the second sawhorse element 114 and receive pivot axle 118 (FIG. 2A) for providing selectable articulation of the first and second sawhorse elements 112 and 114. Top cross piece portion 312 is also preferably formed with a pair of locking protrusion receiving apertures 360 for selectably receiving locking protrusions 226 of worktable surface defining element 120 for securely locking worktable surface defining element 120 in a worktable usage operative orientation as described hereinbelow with reference to FIGS. 24A-25C.

Bottom cross piece portion 314 is preferably formed with a pair of tray engagement recesses 362, which receive tray element 116 when sawhorse assembly 110 is in an open orientation.

Reference is now made to FIGS. 5A, 5B, 5C and 5D, which are simplified respective first and second pictorial, and inward-facing planar and side planar views of second sawhorse element 114, forming part of the convertible sawhorse and worktable assembly of FIGS. 1A-2B. As seen in FIGS. 5A-5D, second sawhorse element 114 is preferably a unitary element, molded of plastic and includes first and second leg portions 410, which are generally mirror images of each other, a top cross piece portion 412 and a bottom cross piece portion 414.

Each of leg portions 410 is preferably formed at an outer-facing edge 420 thereof with a pair of respectively upward-facing and downward-facing protruding hook portions 422 and 424. Each of leg portions 410 is also preferably formed at an inner-facing edge 430 thereof with an elongate recess 432 for slidable engagement and mounting of tray element 116.

Each of leg portions 410 is preferably additionally formed at a top-facing edge 440 thereof with a pair 442 of upward-facing pivotable mounting brackets 444 and 446, which are separated by a recess 448.

Top cross piece portion 412 is preferably formed with a pair of apertured locking element receiving protrusions 450, which are insertable into locking protrusion receiving apertures 360 together with locking protrusions 226 of worktable surface defining element 120 when the first and second sawhorse elements are in a storage operative orientation. Top cross piece portion 412 is also preferably formed with a linear array of pivot axle receiving protrusions 452, on an inner facing surface thereof, which are interdigitated with pivot axle receiving protrusions 350 on first sawhorse element 112 and receive pivot axle 118 (FIG. 2A) for providing selectable articulation of the first and second sawhorse elements 112 and 114.

Each of leg portions 410 is preferably additionally formed at an outward-facing bottom edge 460 thereof with apertured foot 149 which includes a pair 462 of outward-facing pivotable mounting brackets 464 and 466, which are separated by a recess 468. Each pair of brackets 464 and 468 serves for pivotable mounting of a leg element 140 of worktable auxiliary support assembly 130.

Bottom cross piece portion 414 is preferably formed with a pair of tray engagement recesses 472.

Reference is now made to FIGS. 6A, 6B, 6C and 6D, which are simplified respective top and bottom pictorial, and top planar and side planar views of tray element 116, forming part of the convertible sawhorse and worktable assembly of FIGS. 1A-2B. As seen in FIGS. 6A-6D, tray element 116 is preferably is preferably a unitary element, molded of plastic and includes a straight edge 502 at a first end 504 thereof and a cut out edge 510 at a second end 520 thereof. A pivot mounting pin 522 is located on each side edge surface 524 of tray element 116 adjacent the first end 504 thereof and is configured for pivotable mounting engagement with pivot mounting aperture 332 of each leg element 310 of first sawhorse element 112 along pivot axis 334, as seen in FIG. 14C. A sliding pin 532 is located on each side edge surface 524 of tray element 116 adjacent second end 520 thereof and is configured for slidable engagement with elongate recess 432 on each leg element 410 of second sawhorse element 114 for slidable engagement and mounting of tray element 116 thereon.

A pair of tray engagement protrusions 540 are located at the underside of tray element 116 adjacent cut out edge 510 for selectable engagement with tray engagement recesses 472 of sawhorse element 114. A pair of tray engagement protrusions 544 are located at the underside of tray element 116 adjacent straight edge 502 for selectable engagement with tray engagement recesses 352 of sawhorse element 112. The above-described engagements provide stable selectable mounting of tray element 116 onto sawhorse elements 112 and 114 when the sawhorse assembly 110 is in a fully opened operative orientation.

Figure 7A:
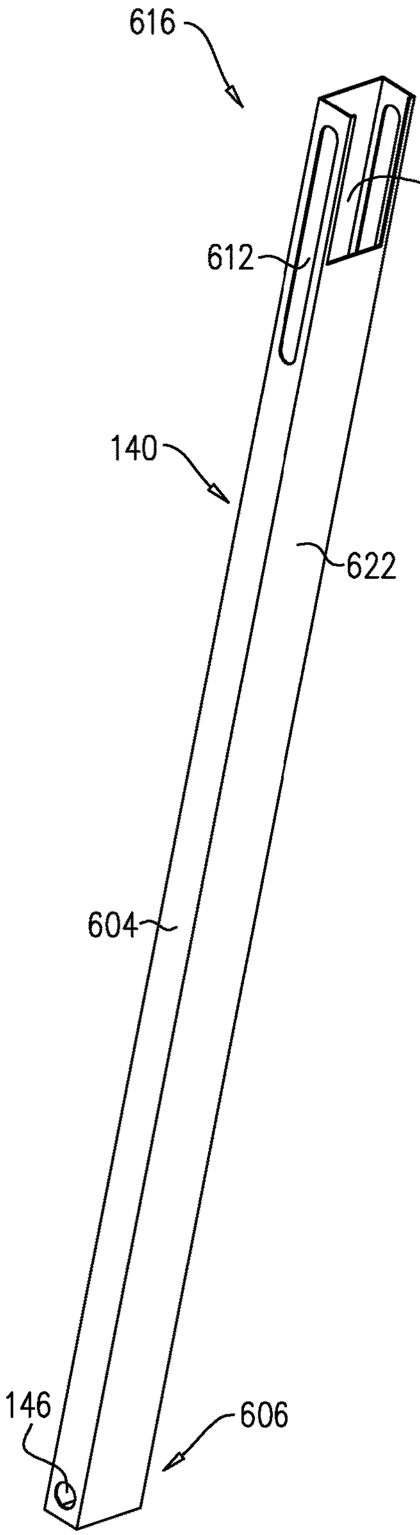
FIGS. 7A, 7B and 7C are simplified respective first and second pictorial and side view illustrations of a leg element, forming part of a worktable auxiliary support assembly, which in turn forms part of the convertible sawhorse and worktable assembly of FIGS. 1A-2B.
Figure 7B:
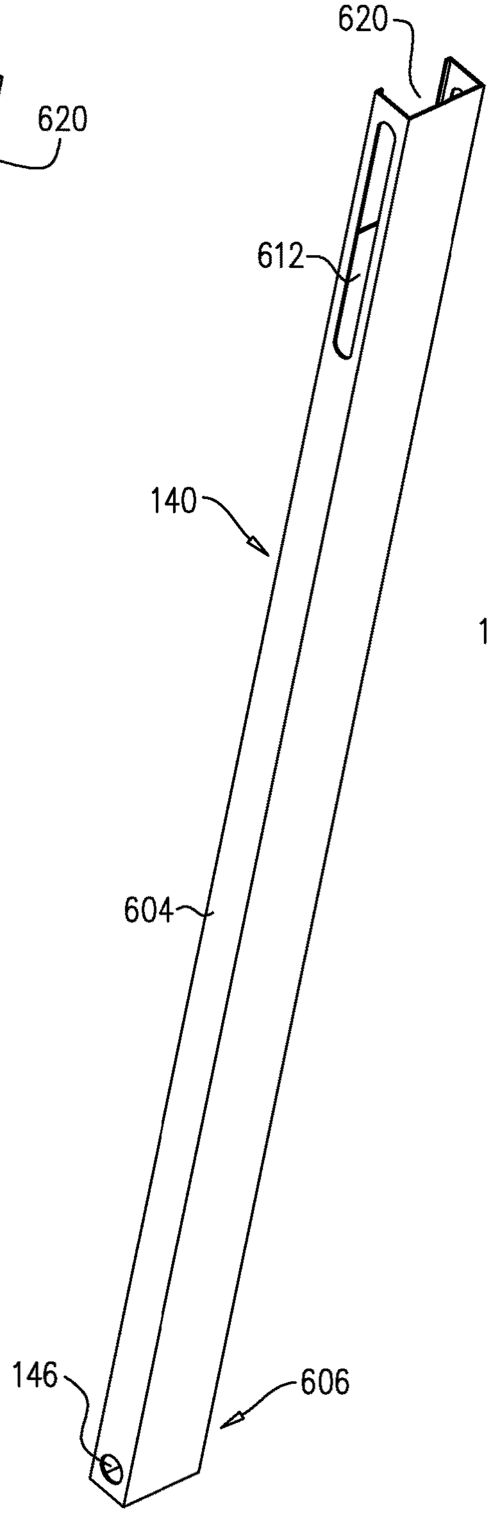
Figure 7C:
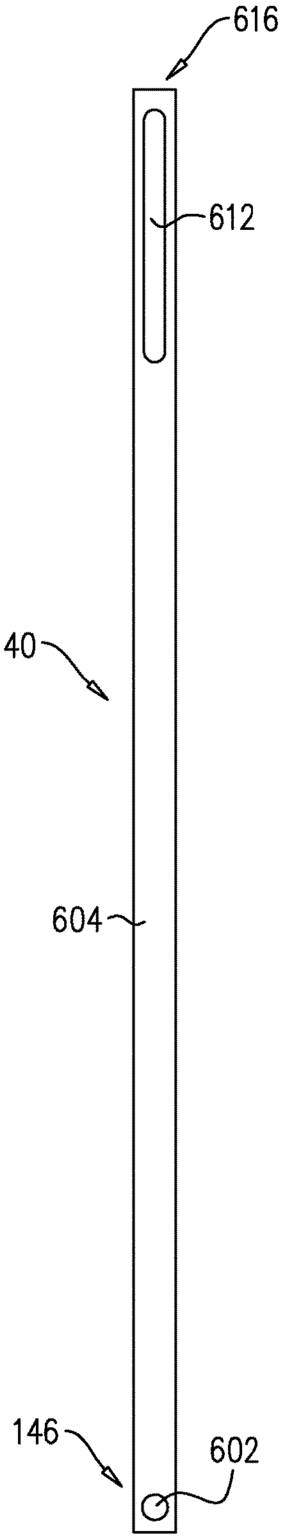
Figure 8A:
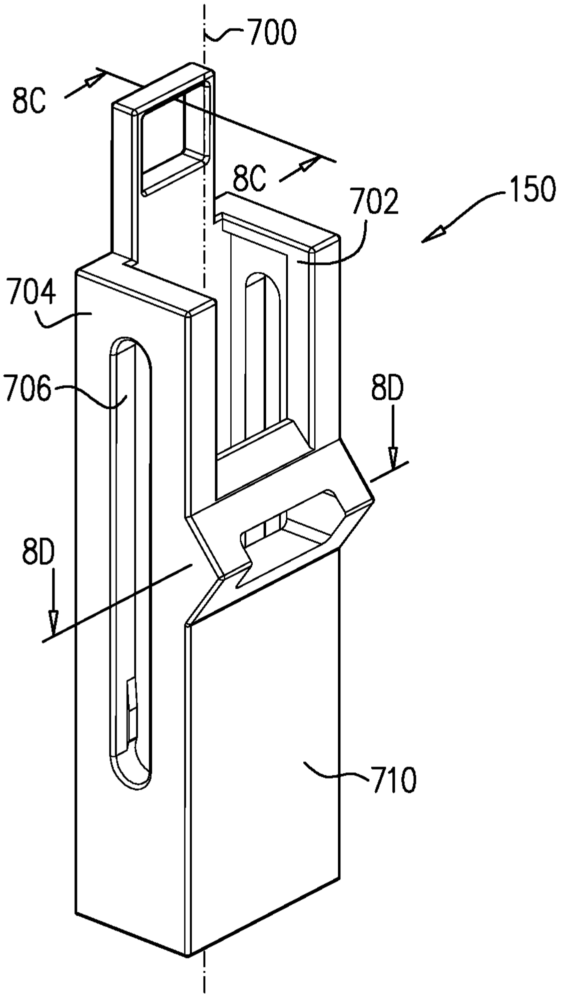
FIGS. 8A, 8B, 8C, 8D and 8E are simplified respective first and second pictorial, first and second sectional and side view illustrations of a leg articulation element, forming part of the worktable auxiliary support assembly, which in turn forms part of the convertible sawhorse and worktable assembly of FIGS. 1A-2B, FIGS. 8C and 8D being taken along respective lines 8C-8C and 8D-8D in FIG. 8A.
Figure 8B:
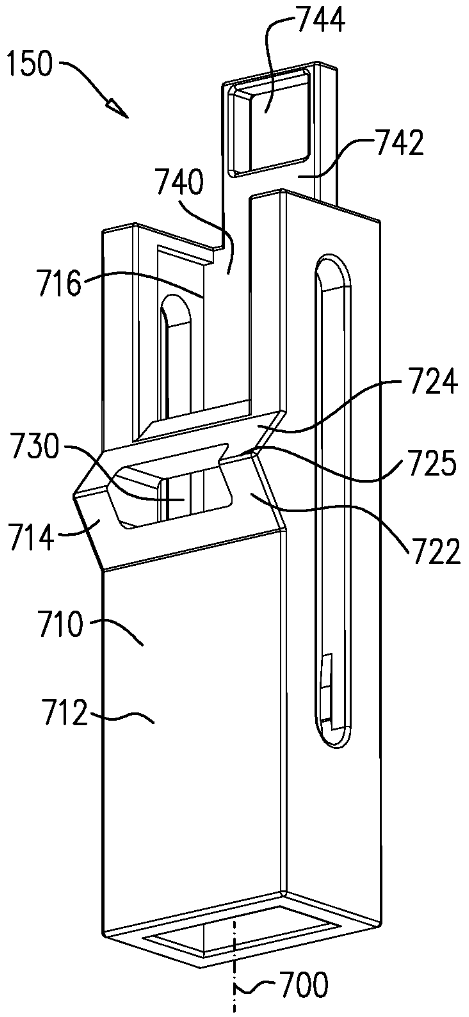
Figure 8C:
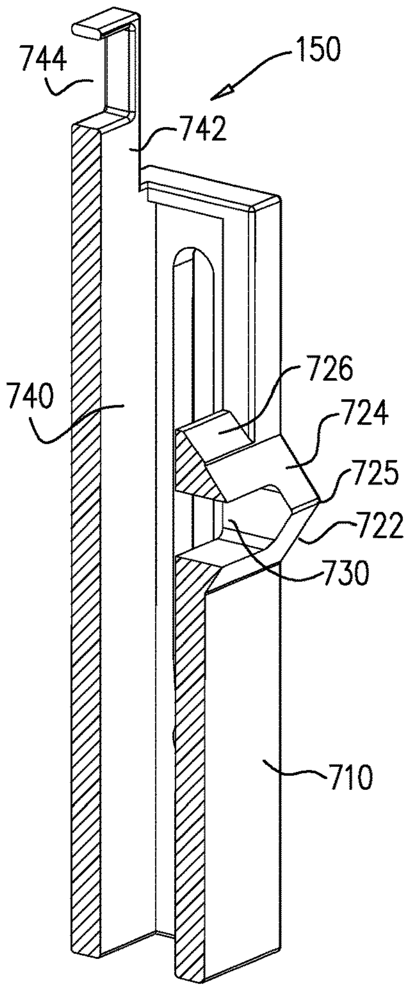
Figure 8D:
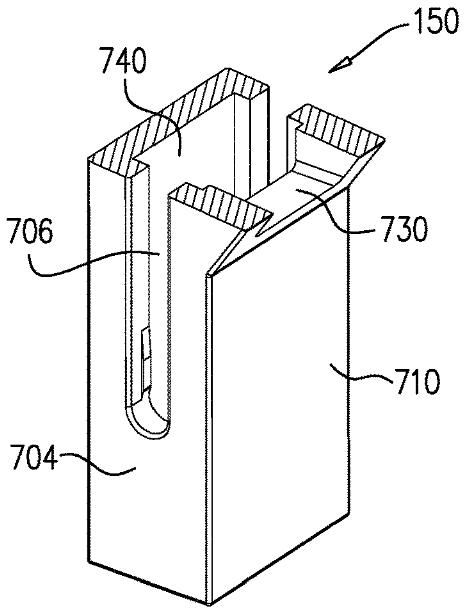
Figure 8E:
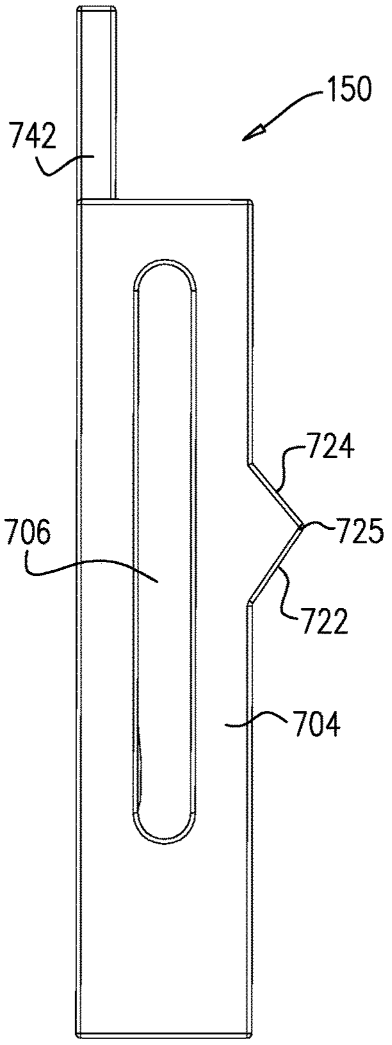
Figure 9A:
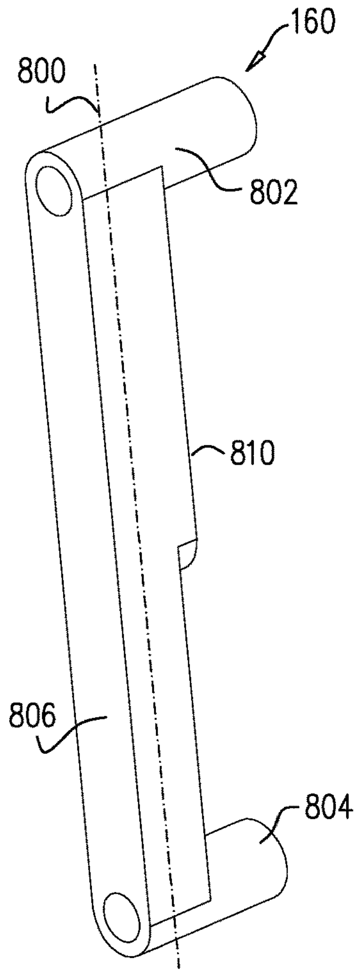
FIGS. 9A, 9B, 9C and 9D are simplified respective first and second pictorial, side view and sectional view illustrations of a linkage element, forming part of the worktable auxiliary support assembly, which in turn forms part of the convertible sawhorse and worktable assembly of FIGS. 1A-2B, FIG. 9D being taken along lines 9D-9D in FIG. 9C.
Figure 9B:
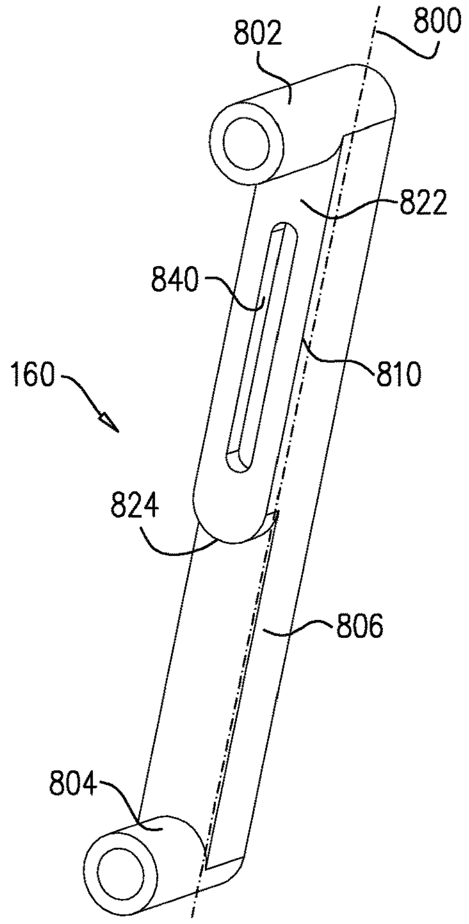
Figure 9C:
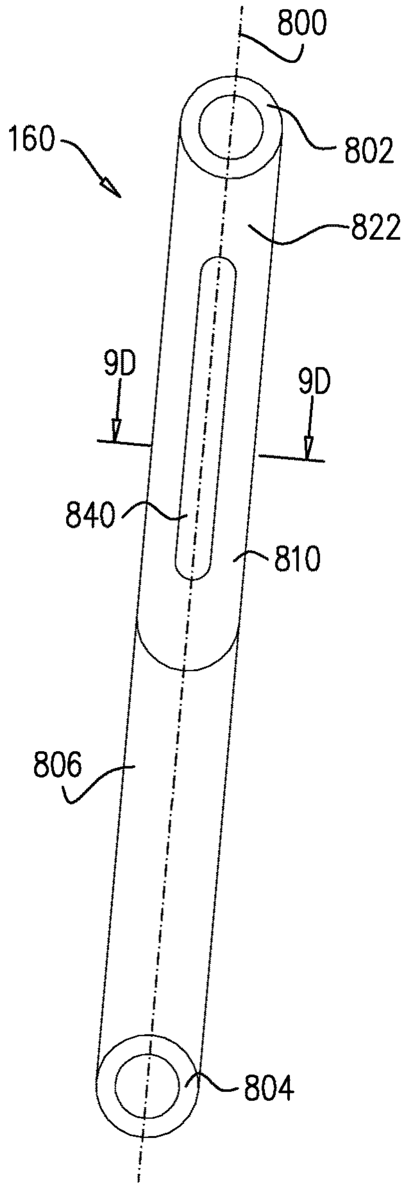
Figure 9D:
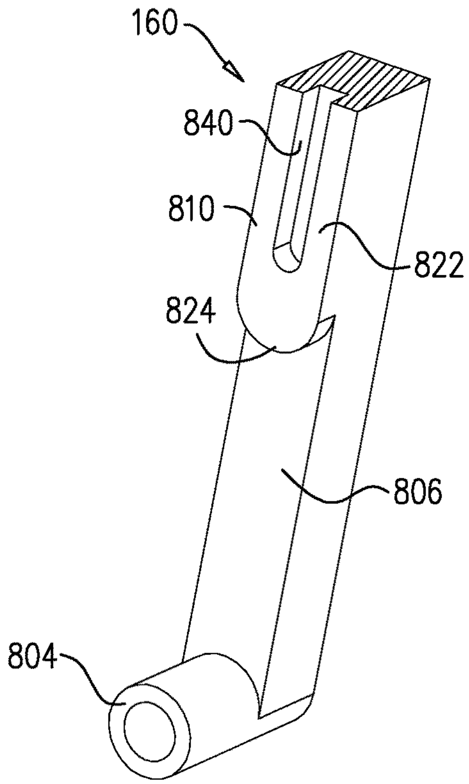

Reference is now made to FIGS. 7A, 7B and 7C, which are simplified respective first and second pictorial and side view illustrations of leg element 140, forming part of worktable auxiliary support assembly 130, which in turn forms part of the convertible sawhorse and worktable assembly 100 of FIGS. 1A-2B.

As seen in FIGS. 7A-7C, leg element 140 is preferably an elongate hollow, side to side symmetric element, preferably formed of aluminum and having a uniform rectangular cross section.

Pivot mounting aperture 146 is preferably formed in each edge surface 604 adjacent a lower end 606 of each leg element 140.

An elongate slidable engagement aperture 612 is preferably formed in each edge surface 604 adjacent an upper end 616 of each leg element 140.

A rectangular cut out 620 is preferably formed on one planar surface 622 adjacent an upper end 616 of each leg element 140.

Reference is now made to FIGS. 8A, 8B, 8C, 8D and 8E, which are simplified respective first and second pictorial, first and second sectional and side view illustrations of leg articulation element 150, forming part of the worktable auxiliary support assembly 130. As seen in FIGS. 8A-8E, leg articulation element 150 is a unitary elongate hollow element having a uniform rectangular cross section over most of its extent and is side-to-side symmetric about an elongate axis 700.

Leg articulation element 150 preferably includes a pair of mutually oppositely aligned side walls 702 and 704, which are formed with mutually aligned elongate slots 706. Extending between side walls 702 and 704 is a front wall 710 including a closed generally planar portion 712 which terminates upwardly in a thickened outwardly-protruding portion 714 having an overall triangular cross section, which terminates upwardly in a cut out 716.

Thickened outwardly-protruding portion 714 defines a downward-facing outer surface 722 and an upward-facing outer surface 724, which are joined along a line 725, as well as a slightly recessed additional upward-facing surface 726, which is recessed with respect to surfaces 722 and 724 and extends between edge walls 702 and 704. A transverse bore 730 extends perpendicular to axis 700 from the interior of leg articulation element 150 to the exterior thereof and intersects surfaces 722 and 724 at the junction 725 thereof.

Also extending between side walls 702 and 704 is a back wall 740, which includes an upper portion 742 extending upwardly beyond side walls 702 and 704 and defining a locking aperture 744.

Reference is now made to FIGS. 9A, 9B, 9C and 9D, which are simplified respective first and second pictorial, side view and sectional view illustrations of linkage element 160, forming part of the worktable auxiliary support assembly 130. As seen in FIGS. 9A-9D, linkage element 160 preferably is a unitary elongate element extending along an axis 800 and including first and second hollow cylindrical portions 802 and 804 which are joined by an elongate portion 806.

First and second hollow cylindrical portions 802 and 804 extend along mutually parallel axes, which are perpendicular to axis 800. Elongate portion 806 has an overall uniform rectangular cross section with the addition of a thickened portion 810. Thickened portion 810 is located over part of cylindrical portion 802 and defines a planar surface 822 and a curved surface 824. Thickened portion 810 extends from cylindrical portion 802 partially towards cylindrical portion 804 and has formed therein a generally elongate recess 840.

Figure 10A:
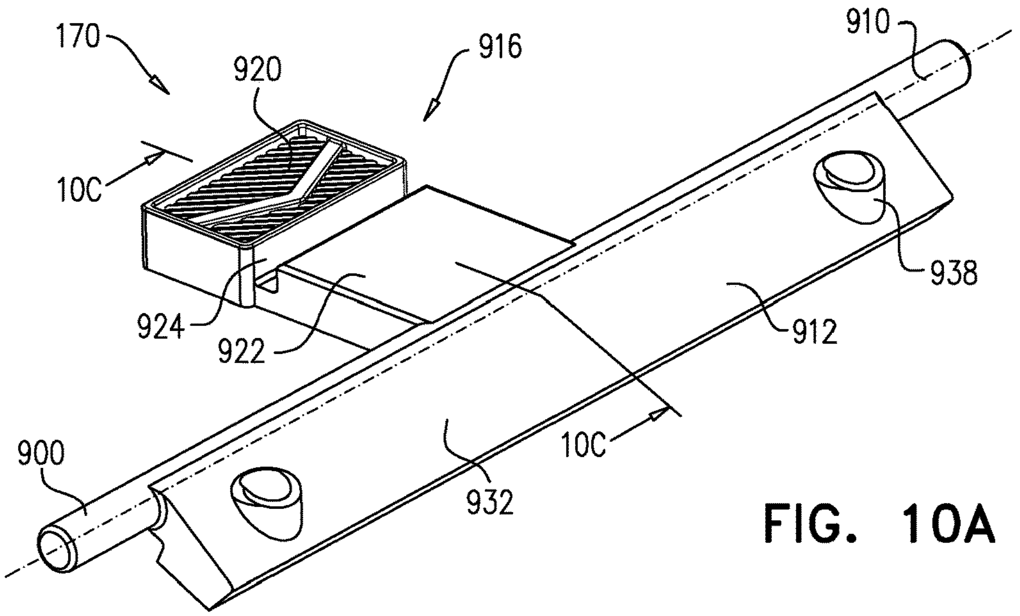
FIGS. 10A, 10B and 10C are simplified respective top pictorial, bottom pictorial and sectional views of a table locking element forming part of the convertible sawhorse and worktable assembly of FIGS. 1A-2B, FIG. 10C being taken along respective lines 10C-10C in FIG. 10A.
Figure 10B:
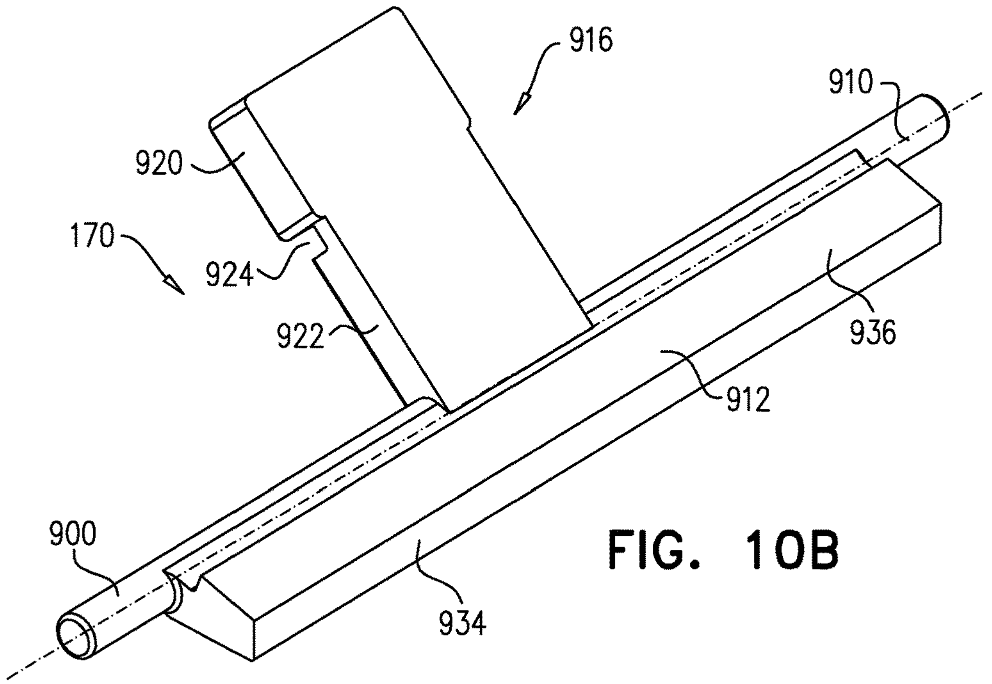
Figure 10C:
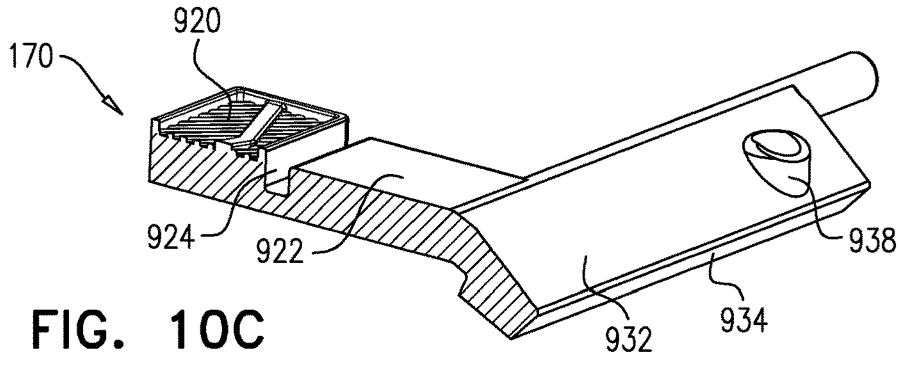

Reference is now made to FIGS. 10A, 10B and 10C, which are simplified respective top pictorial, bottom pictorial and sectional views of table locking element 170, forming part of the convertible sawhorse and worktable assembly of FIGS. 1A-2B. As seen in FIGS. 10A-10C, locking element 170 is preferably a unitary element and includes an elongate generally circular cylindrical portion 900 extending along an axis 910, an adjacent elongate portion 912 extending alongside cylindrical portion 900 and a manually engageable actuation portion 916, extending outwardly and perpendicularly from cylindrical portion 900.

Manually engagable actuation portion 916 incudes a manually engageable button portion 920, which is configured to extend through manually engageable button accommodating aperture 246 of worktable defining element 120, and a linkage portion 922, separated from button portion 920 by a recess 924.

Adjacent elongate portion 912 extends only partially along the length of cylindrical portion 900 and defines a top-facing surface 932, an edge surface 934 and a bottom facing surface 936. A pair of generally circular protrusions 938 extend upwardly from top-facing surface 932 and define spring seats for compression springs 172 (FIG. 2A).

Figure 17A:
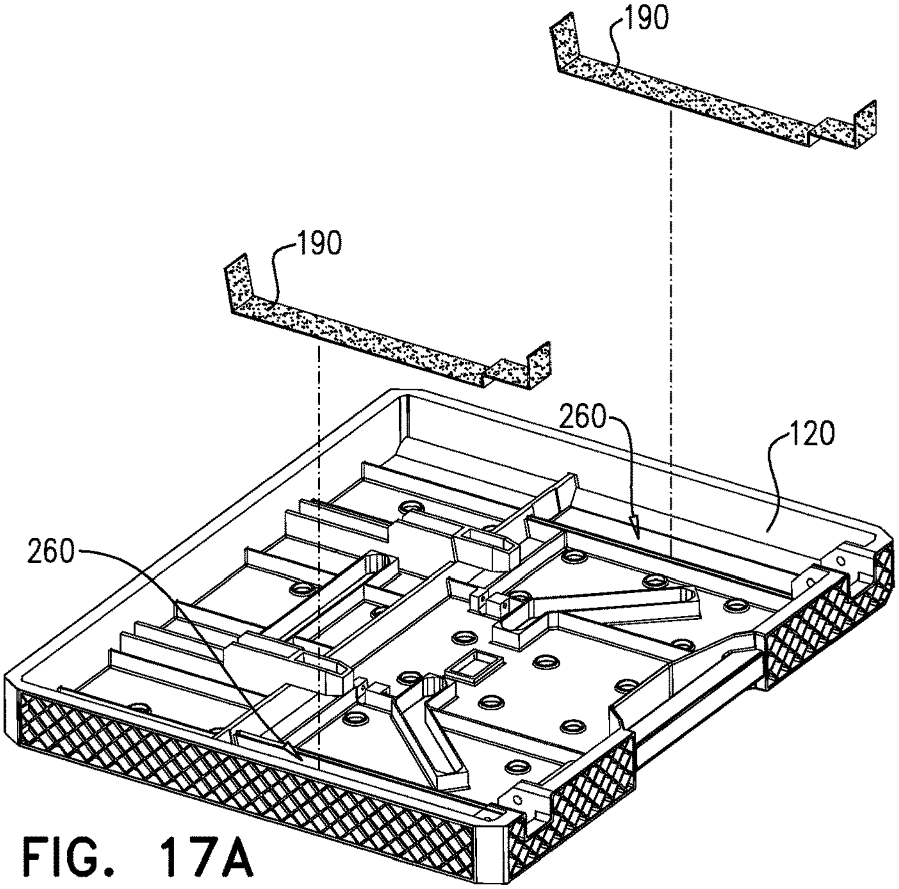
FIGS. 17A, 17B, 17C and 17D are simplified respective first and second pictorial exploded view illustrations and first and second pictorial assembled view illustrations showing mounting of the table locking element and the leg locking element onto the worktable surface defining element.
Figure 17B:
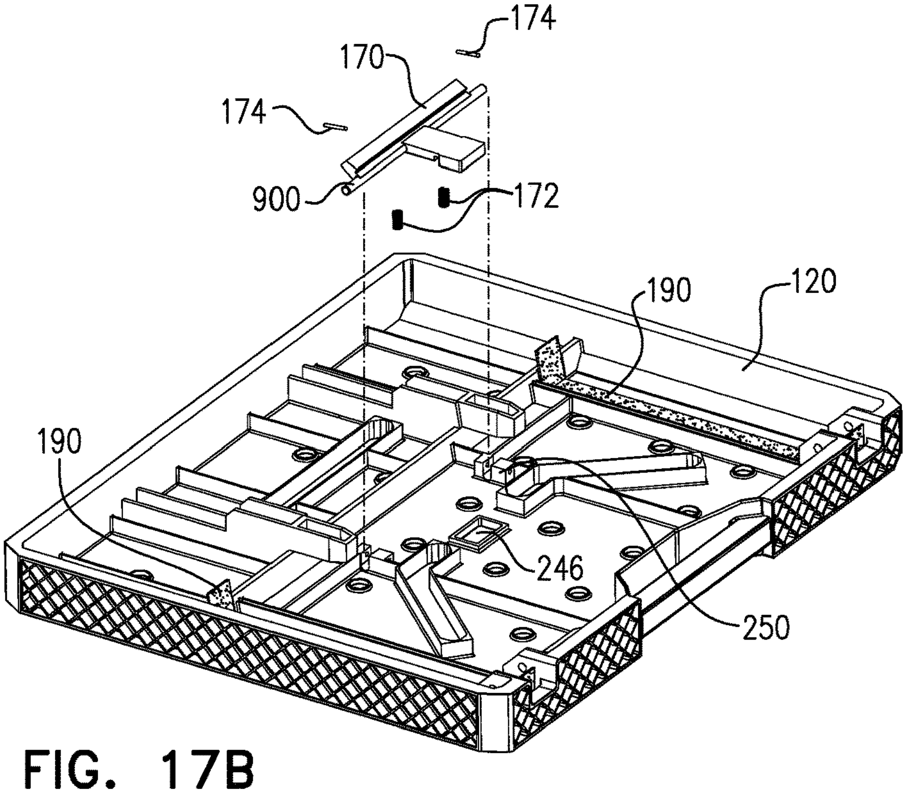
Figure 17C:
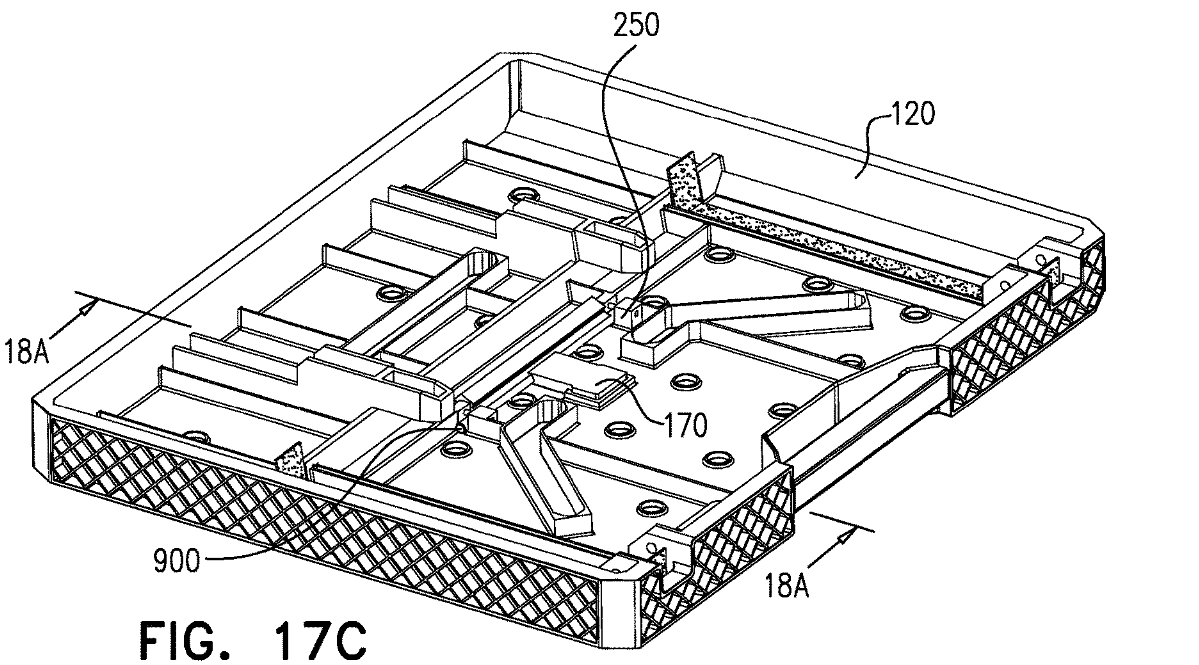
Figure 18A:
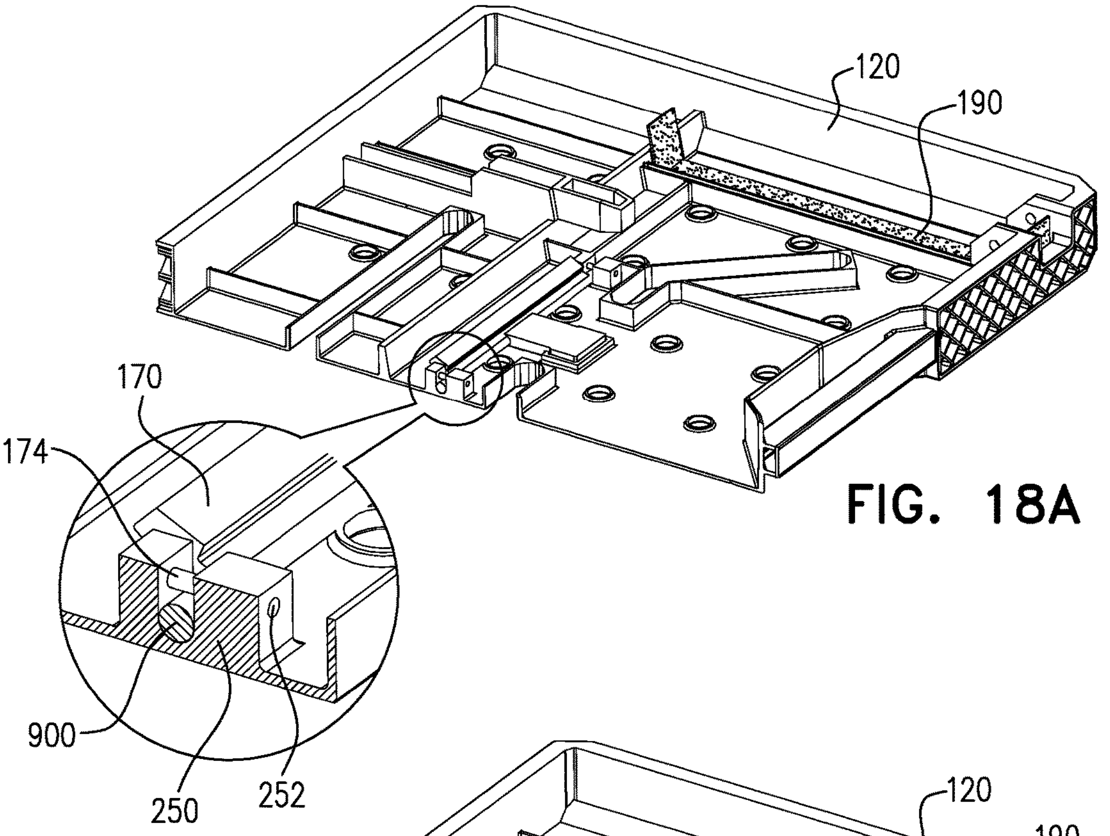
FIGS. 18A and 18B are simplified pictorial sectional illustrations, taken along lines 18A-18A and 18B-18B, respectively showing details of the mounting of the table locking element and the leg locking element onto the worktable surface defining element.

Table locking element 170 is pivotably mounted onto worktable surface defining element 120, as seen clearly in FIGS. 17B, 17C and 18A, with each end of cylindrical portion 900 being retained between a pair of locking element pivotable mounting brackets 250 by transverse retaining pin 174, which is seated in mutually facing apertures 252.

Figure 11A:
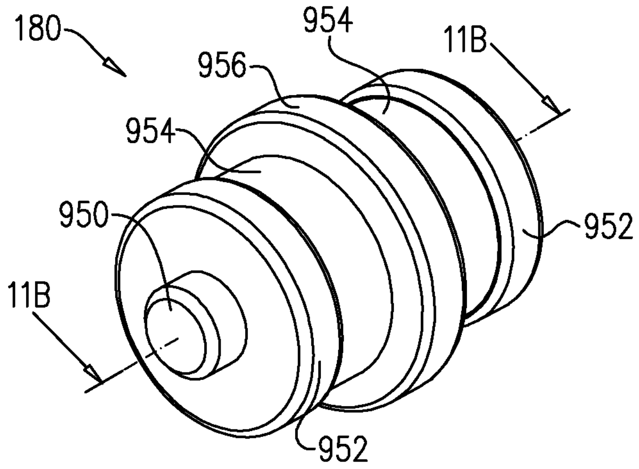
FIGS. 11A and 11B are simplified respective pictorial and sectional views of a roller element forming part of the convertible sawhorse and worktable assembly of FIGS. 1A-2B, FIG. 11B being taken along respective lines 11B-11B in FIG. 11A.
Figure 11B:
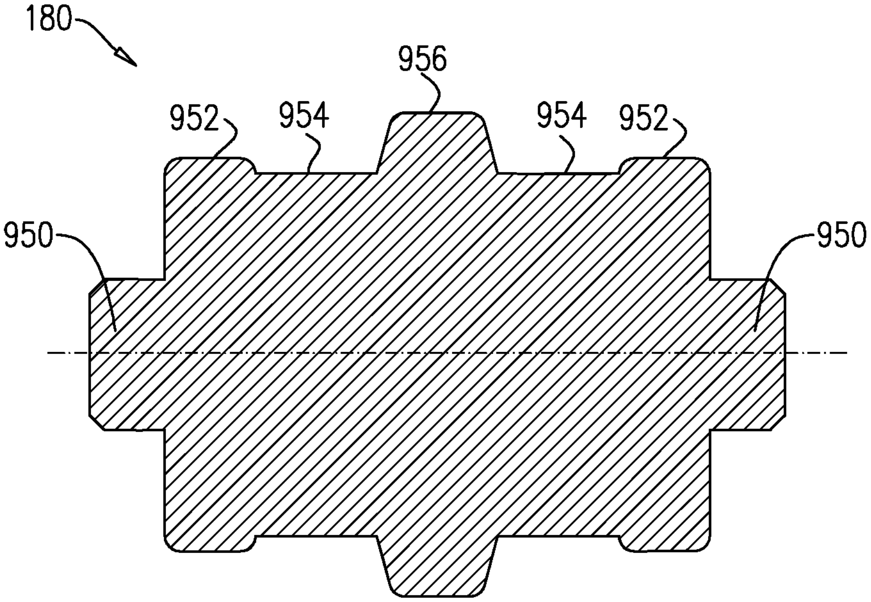

Reference is now made to FIGS. 11A and 11B, which are simplified respective pictorial and sectional views of roller element 180, forming part of the convertible sawhorse and worktable assembly of FIGS. 1A-2B, FIG. 11B being taken along respective lines 11B-11B in FIG. 11A.

As seen in FIGS. 11A & 11B it is seen that roller element 180 is a unitary, circularly and side-to-side symmetric element having a pair of end protrusions 950 of generally circular cross section, which terminate inwardly in a pair of end flanges 952. Inwardly of end flanges 952 are a pair of annular recesses 954, which terminate at respective outer sides of a central flange 956. Roller elements 180 are thus particularly configured for rolling engagement with roller engagement tracks 230 of worktable surface defining element 120 (FIG. 3B).

Figure 12A:
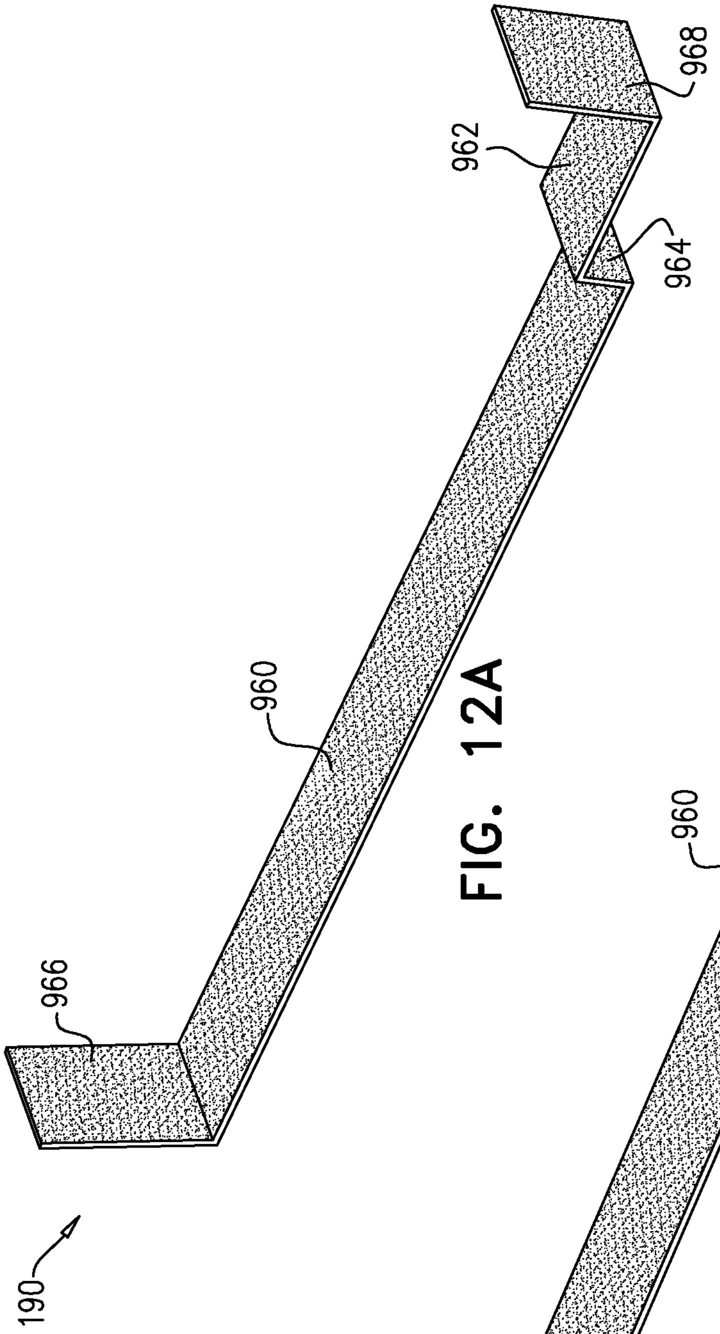
FIGS. 12A and 12B are simplified, mutually oppositely-facing pictorial illustrations of leg locking elements forming part of the convertible sawhorse and worktable assembly of FIGS. 1A-2B.
Figure 12B:
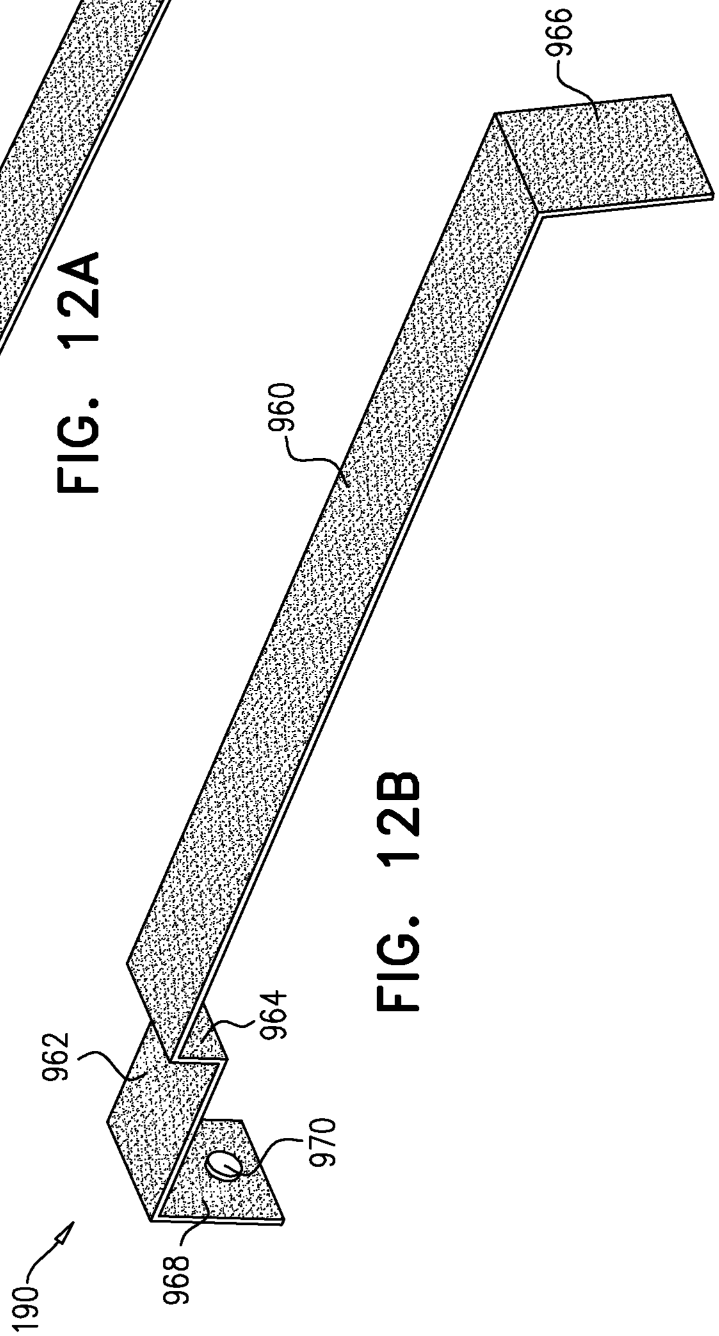

Reference is now made to FIGS. 12A and 12B, which are simplified, mutually oppositely-facing pictorial illustrations of leg locking elements 190. As seen in FIGS. 12A & 12B, leg locking elements 190 are generally elongate elements including a main elongate flat portion 960 and a secondary elongate flat portion 962, which is connected to main elongate flat portion 960 via an intermediate upstanding portion 964. Main elongate flat portion 960 terminates in an angled end portion 966 and secondary elongate flat portion 962 terminates in an upstanding end portion 968 having an inwardly facing protrusion 970 which engages locking aperture 744 of leg articulation element 150 when convertible sawhorse and worktable assembly 100 is in an open and locked operative orientation.

Figure 17D:
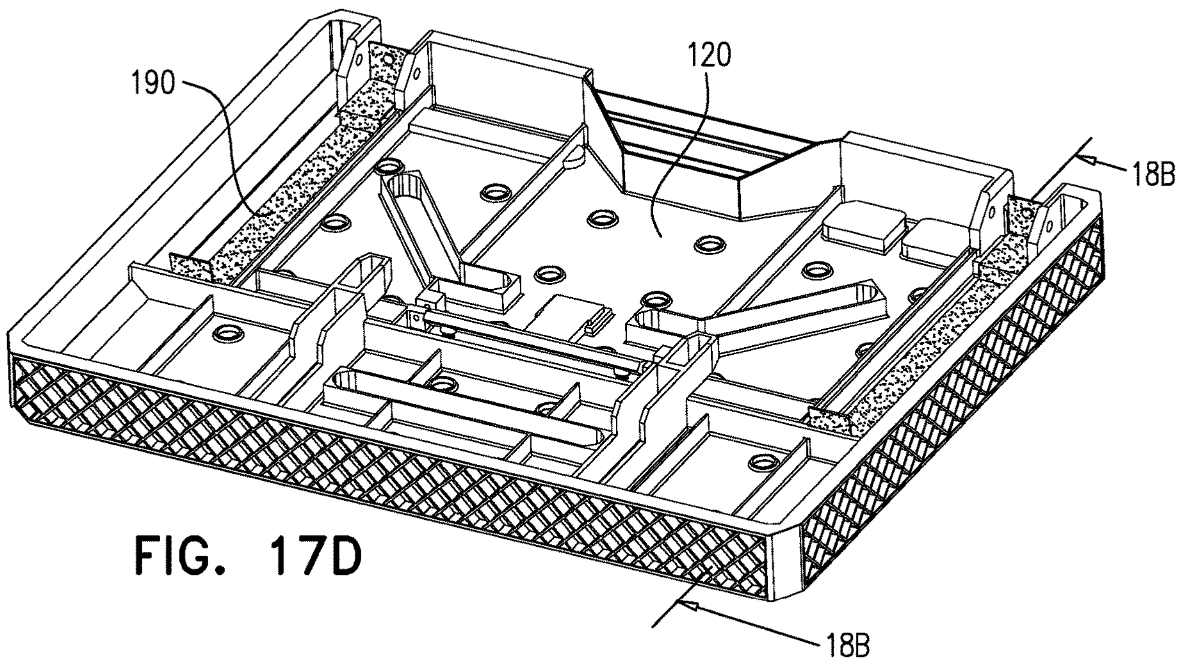
Figure 18B:
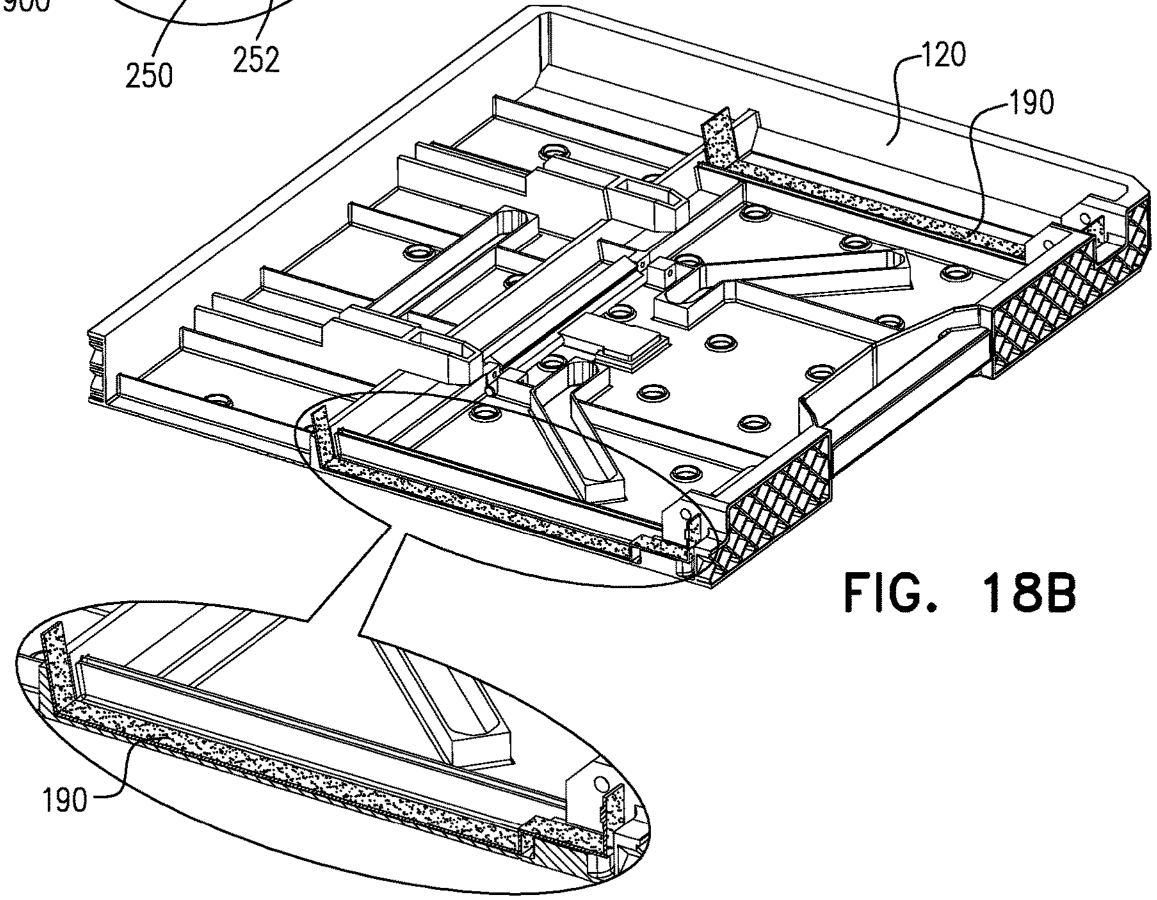

Leg locking elements 190 are mounted onto worktable surface defining element 120 at leg locking element mounting slots 260 as seen clearly in FIGS. 17A, 17D and 18B.

Figure 13A:
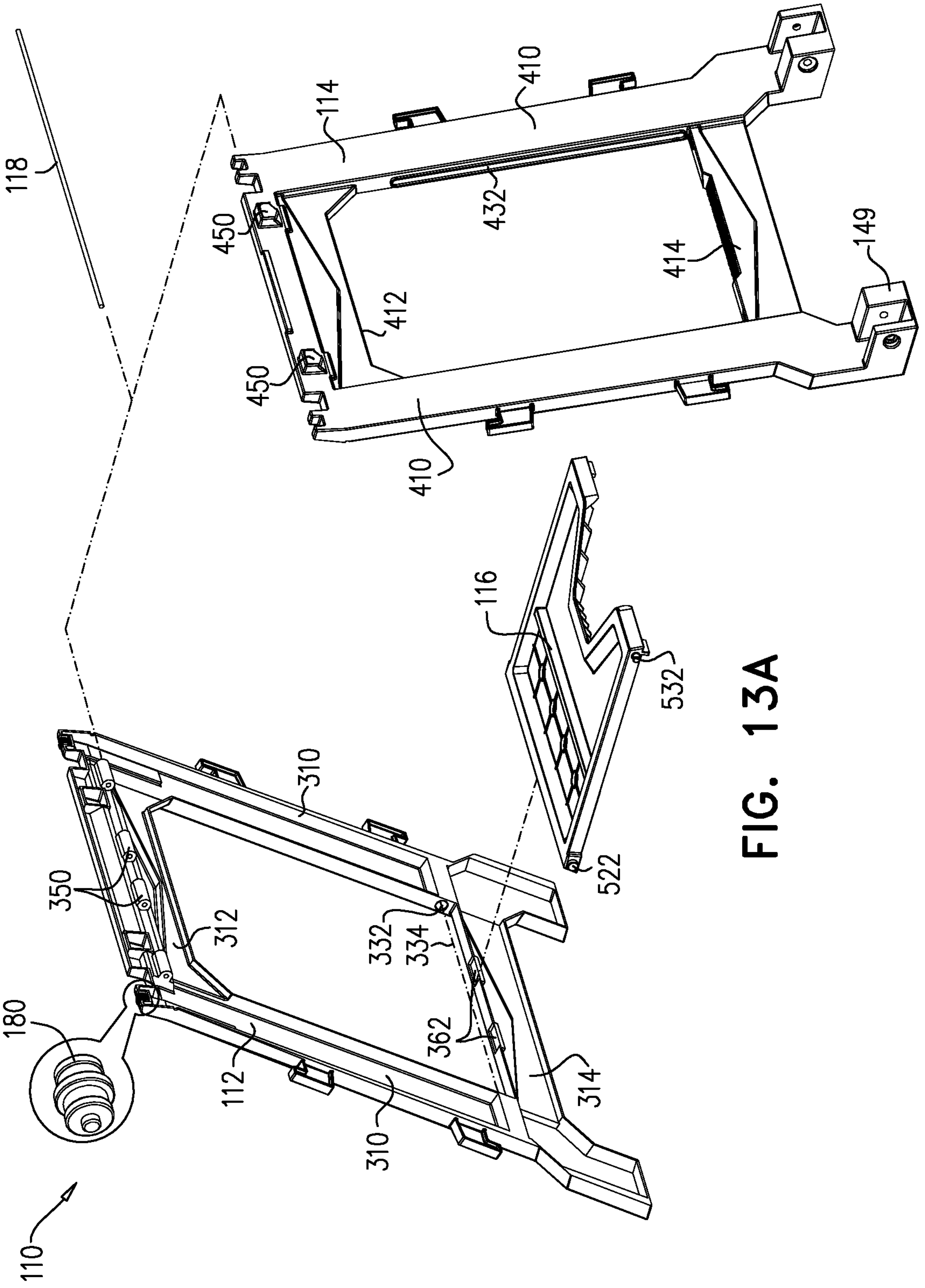
FIGS. 13A and 13B are simplified respective exploded view and assembled view pictorial illustrations illustrating the assembly of first and second sawhorse elements forming part of the convertible sawhorse and worktable assembly of FIGS. 1A-2B.
Figure 13B:
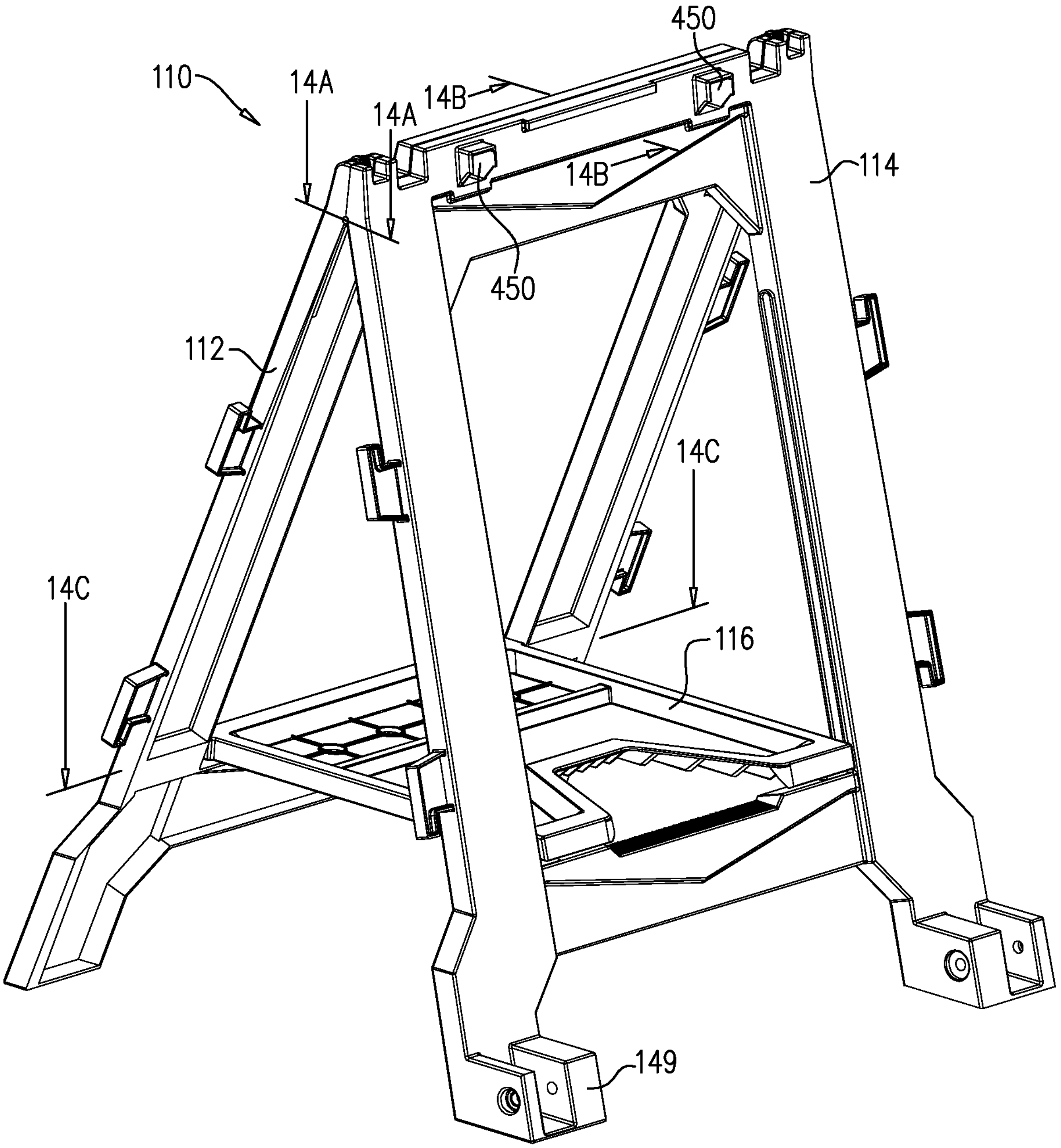
Figure 14A:
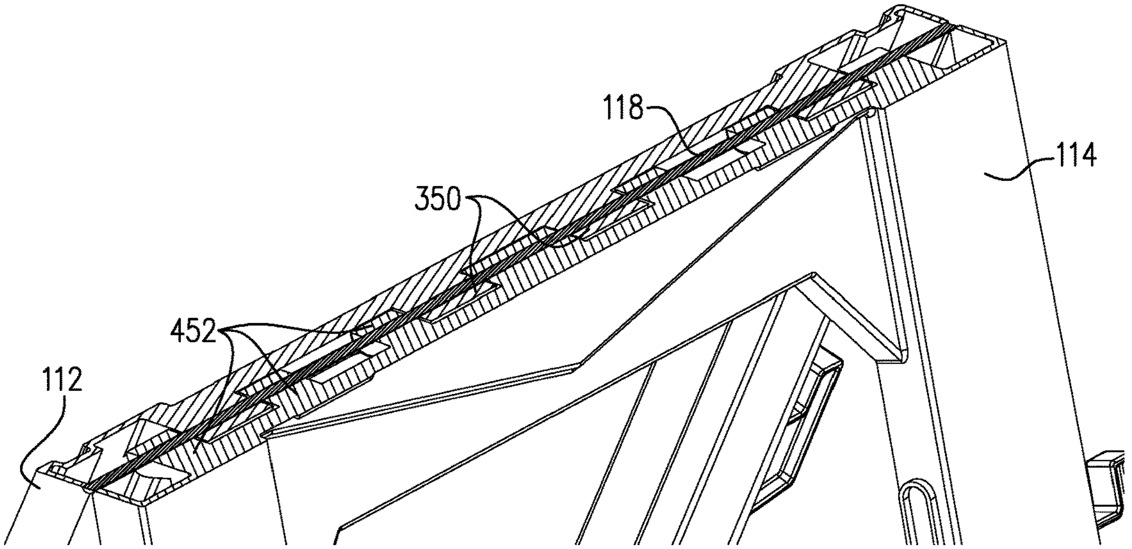
FIGS. 14A, 14B and 14C are simplified sectional illustrations, taken along respective lines 14A-14A, 14B-14B and 14C-14C in FIG. 13B, illustrating details of the assembly of the first and second sawhorse elements forming part of the convertible sawhorse and worktable assembly of FIGS. 1A-2B.
Figure 14B:
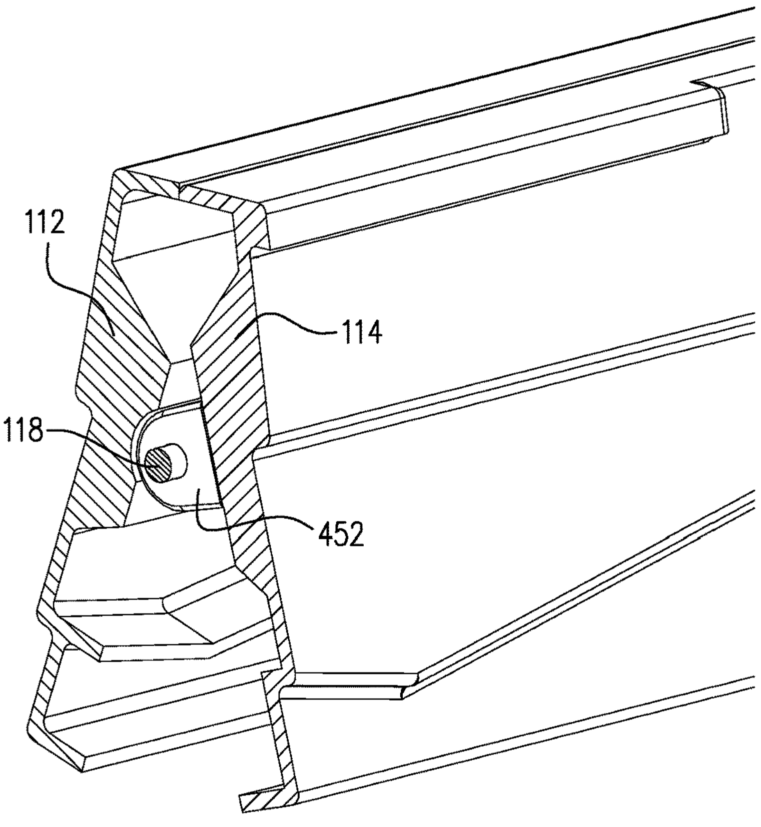
Figure 14C:
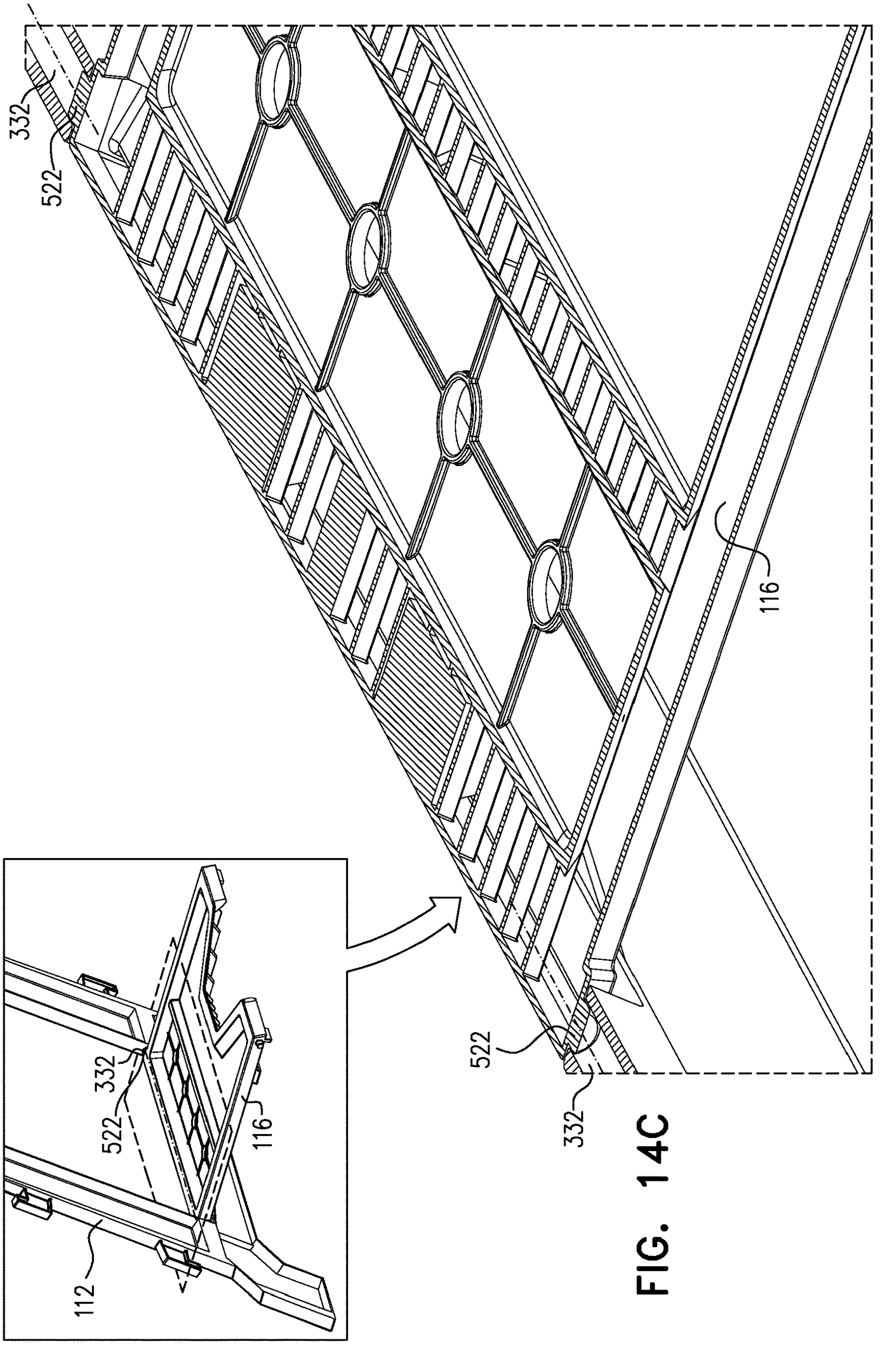
Figure 15A:
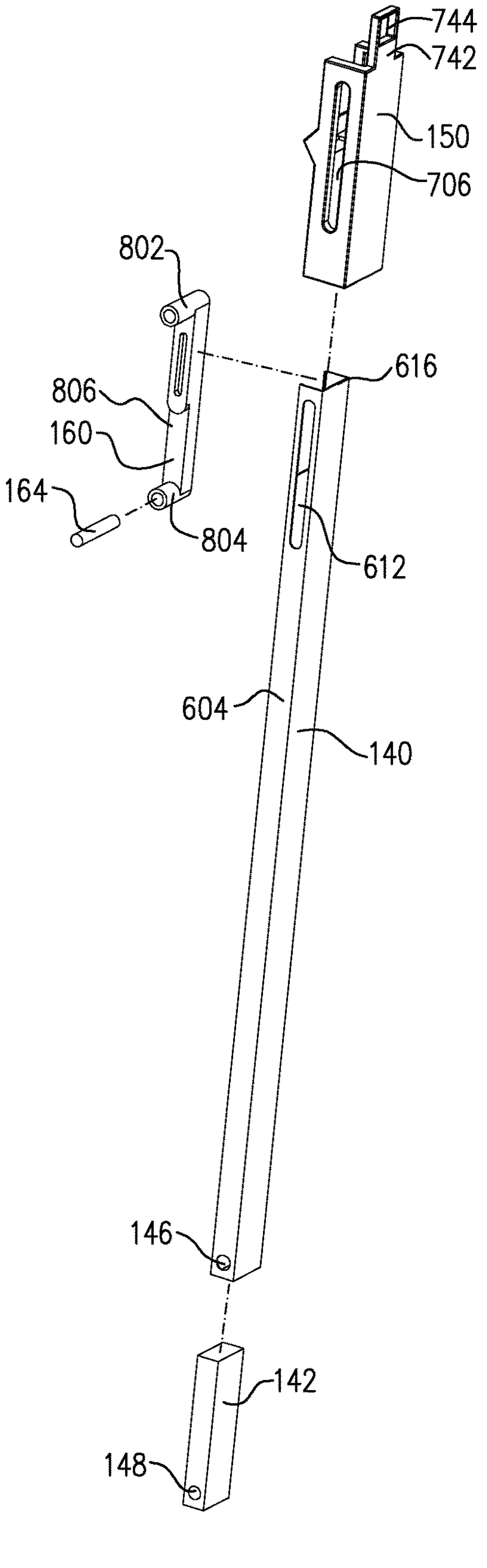
FIGS. 15A, 15B, 15C and 15D are simplified respective first and second pictorial exploded views, a pictorial assembled view and a pictorial sectional view of one side of a worktable auxiliary support assembly forming part of the convertible sawhorse and worktable assembly of FIGS. 1A-2B.
Figure 15B:
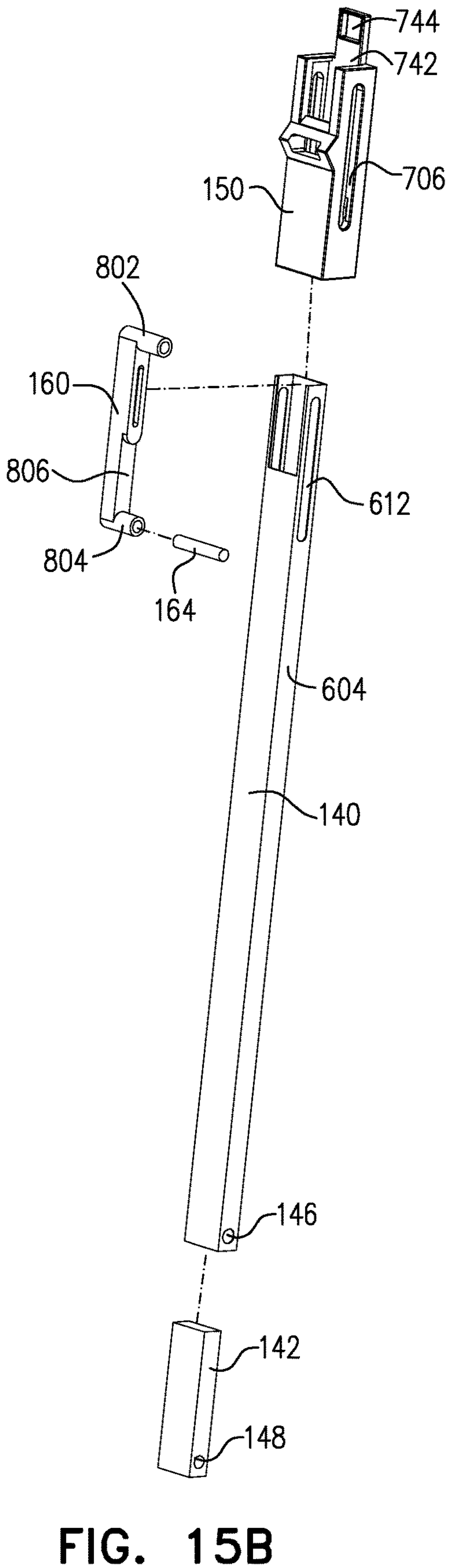
Figure 15C:
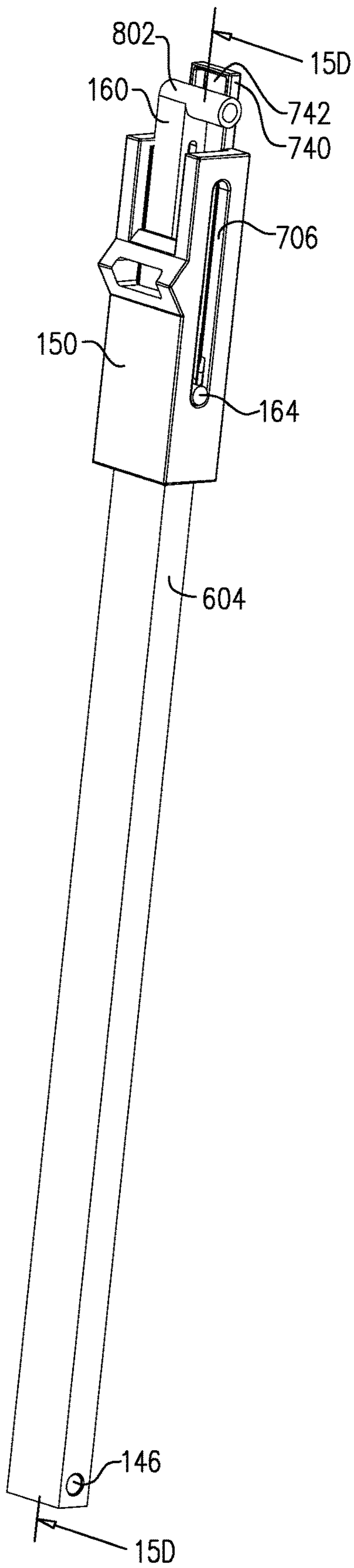
Figure 15D:
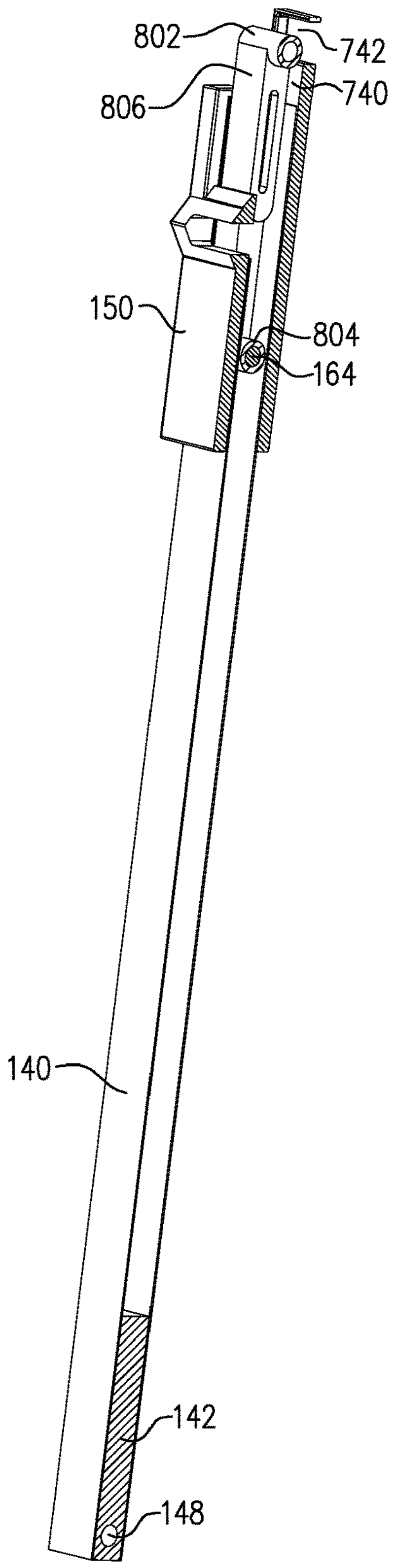

Reference is now made to FIGS. 13A and 13B, which are simplified respective exploded view and assembled view pictorial illustrations illustrating the assembly of first and second sawhorse elements forming part of the convertible sawhorse and worktable assembly of FIGS. 1A-2B, and to FIGS. 14A, 14B and 14C, which are simplified sectional illustrations, taken along respective lines 14A-14A, 14B-14B and 14C-14C in FIG. 13B, illustrating details of the assembly of the first and second sawhorse elements forming part of the convertible sawhorse and worktable assembly of FIGS. 1A-2B. These drawings show details of the assembly of the sawhorse assembly 110 as described in detail hereinabove.

It is seen that pivot axle 118 extends through interdigitated pivot axle receiving protrusions 452 on second sawhorse element 114, which are interdigitated with pivot axle receiving protrusions 350 on first sawhorse element 112 for providing selectable articulation of the first and second sawhorse elements 112 and 114. It is also seen that tray element 116 is pivotably mounted onto first sawhorse element 112 via pivot mounting pins 522 about pivot axis 334 for selectable stable slidable engagement with second sawhorse element 114 via sliding pins 532, which engage respective elongate slots 432 in second sawhorse element 114.

Reference is now made to FIGS. 15A, 15B, 15C and 15D, which are simplified respective first and second pictorial exploded views, a pictorial assembled view and a pictorial sectional view of one side of a worktable auxiliary support assembly forming part of the convertible sawhorse and worktable assembly of FIGS. 1A-2B.

As seen in FIGS. 15A-15D, each linkage element 160 is partially seated within a corresponding leg element 140, between edge surfaces 604 thereof, adjacent an upper end 616 of each leg element 140. The second hollow cylindrical portion 804 of each linkage element is located between elongate slidable engagement apertures 612 of each leg element 140 and a pivotable and slidable engagement pin 164 extends through the second hollow cylindrical portion 804 and into engagement with both of the elongate slidable engagement apertures 612 of each leg element. Part of elongate portion 806 and the first hollow cylindrical portion 802 of each linkage element 160 extends above the upper end 616 of each leg element 140.

A selectably lockable leg articulation element 150 is fixed to the upper end 616 of each leg element 140 and axially aligned therewith such that mutually aligned elongate slots 706 of the selectably lockable leg articulation element 150 are preferably aligned with corresponding elongate slidable engagement apertures 612 of each leg element and upper portion 742 of back wall 740, extends above the upper end of each leg element 140.

It is appreciated that FIGS. 15A-15D show linkage element 160 in a relatively lowered position in which it is axially aligned with leg element 140 and with selectably lockable leg articulation element 150. As will be described hereinbelow in greater detail, linkage element 160, when not locked, is above to slide upwardly relative to leg element 140 and to selectably lockable leg articulation element 150 and to pivot relative thereto about a pivot axis defined by a pivotable and slidable engagement pin 164.

Figure 19B:
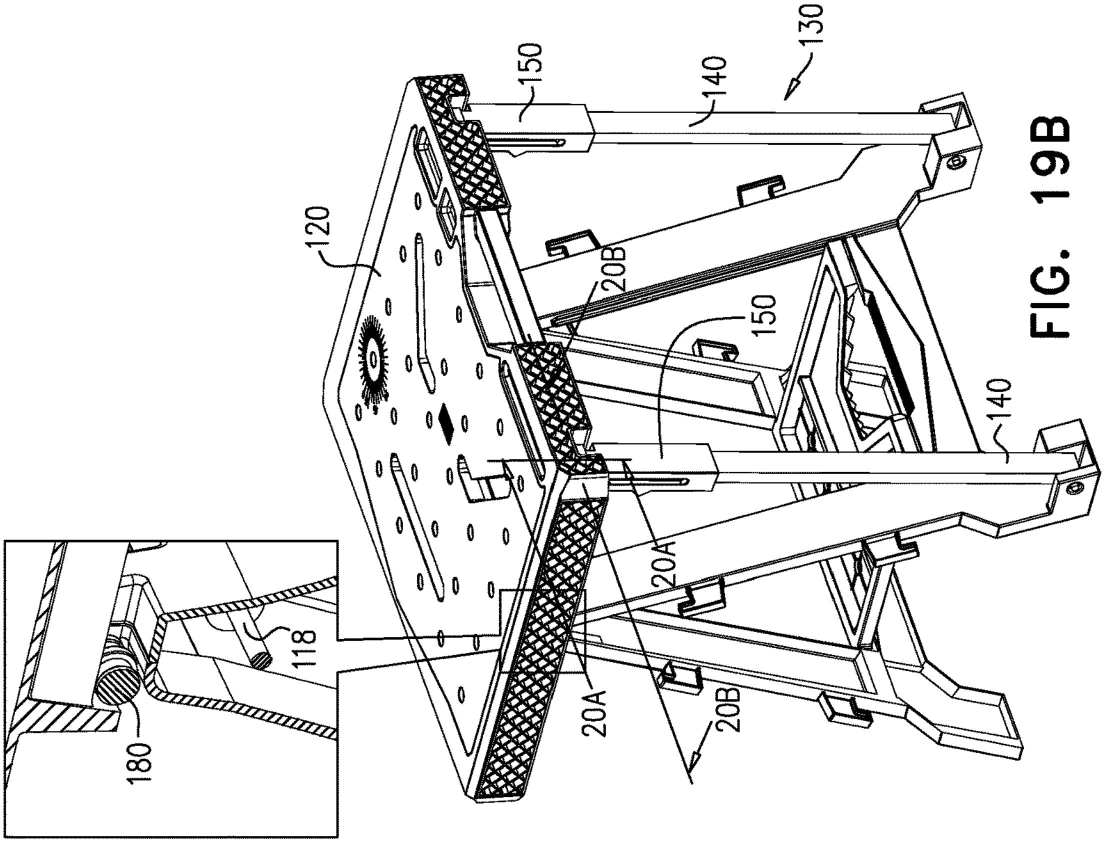
FIGS. 19A and 19B are simplified respective exploded view and assembled view illustrations showing pivotable mounting of worktable auxiliary support assembly onto the worktable surface defining element.
Figure 19A:
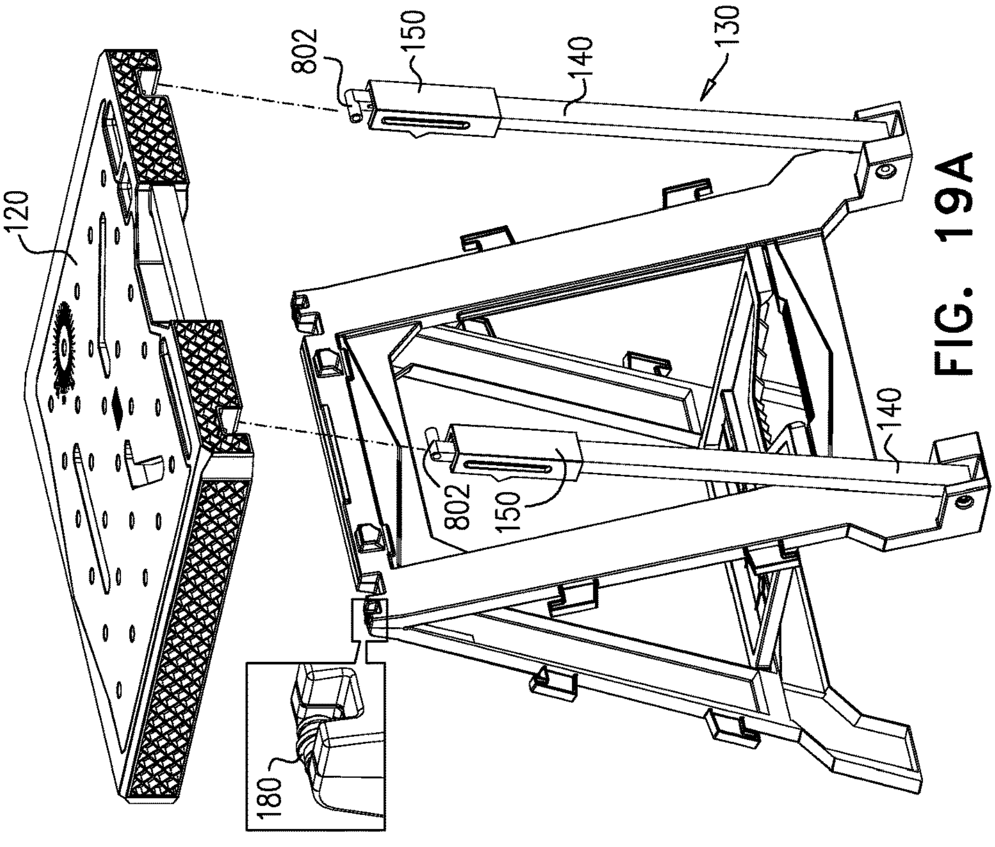
Figure 20B:
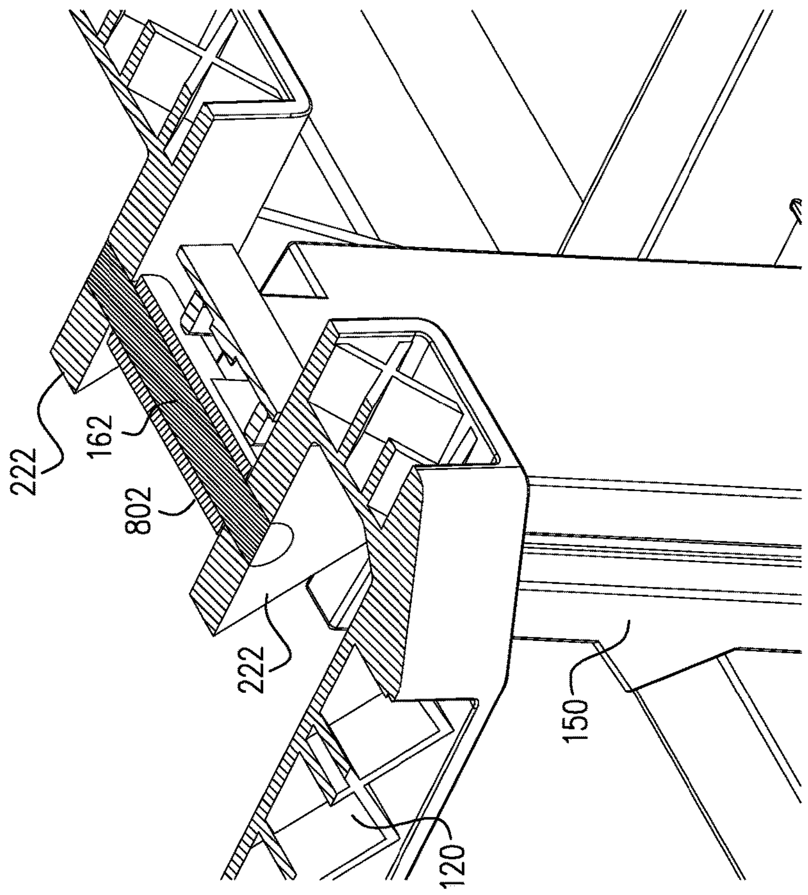
FIGS. 20A and 20B are sectional illustrations taken along respective lines 20A-20A and 20B-20B in FIG. 19B.
Figure 20A:
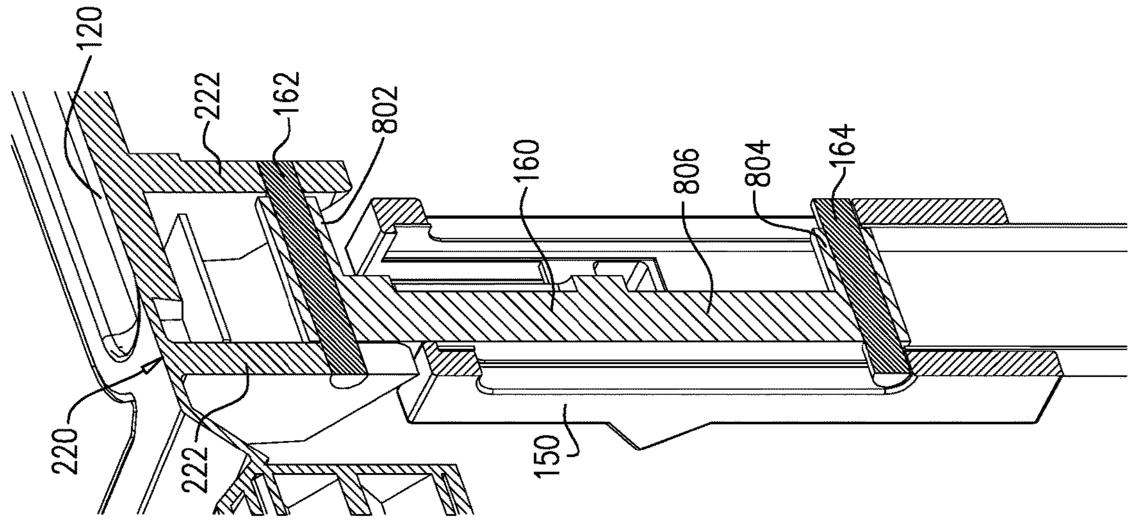

Reference is now made to FIGS. 19A and 19B, which are simplified respective exploded view and assembled view illustrations showing pivotable mounting of worktable auxiliary support assembly 130 onto the worktable surface defining element 120, and to FIGS. 20A and 20B, which are sectional illustrations taken along respective lines 20A-20A and 20B-20B in FIG. 19B.

It is seen that pivotable engagement pin 162, which extends through first cylindrical portion 802 of linkage element 160 engages and is retained between apertured pivotable mounting brackets 222.

Reference is now made to FIGS. 21A-25C, which illustrate various stages in the operation of convertible sawhorse and worktable assembly 100 of FIGS. 1A-20B.

Figure 21A:
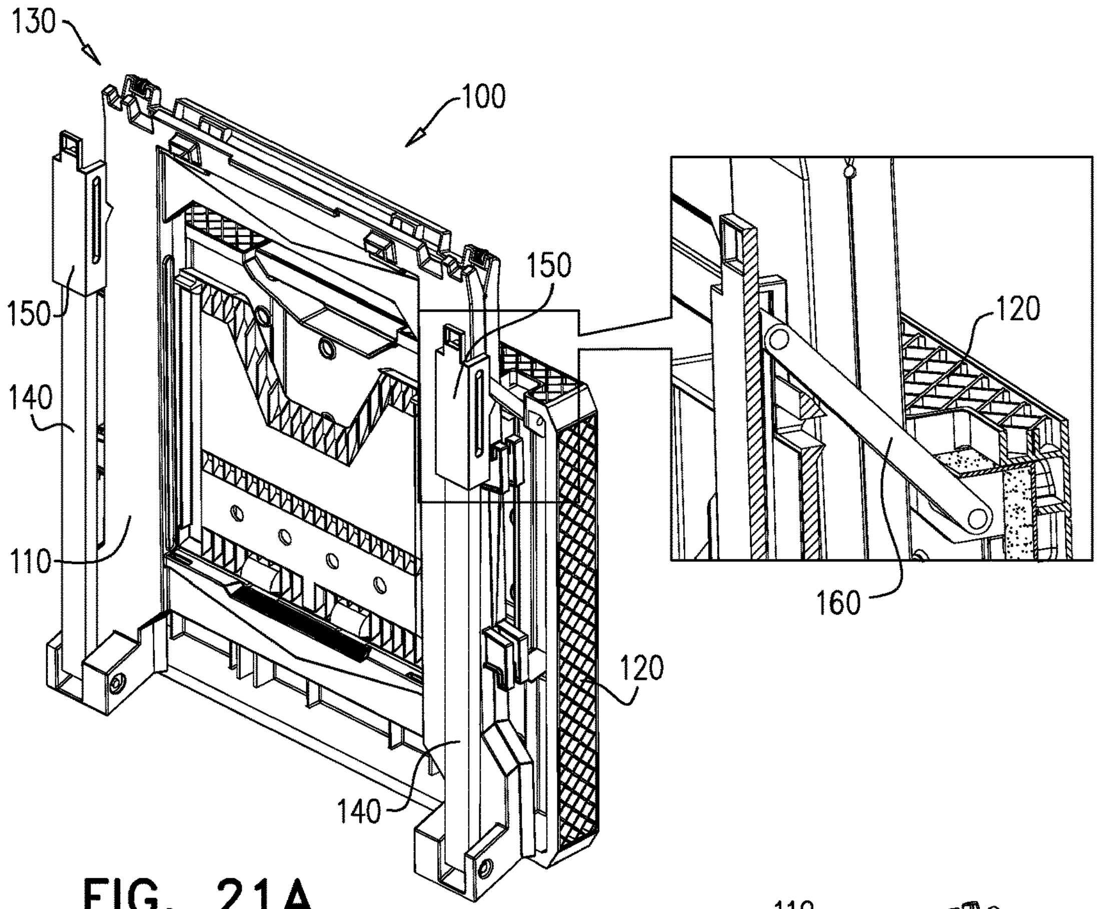
FIGS. 21A, 21B and 21C are simplified first and second pictorial and planar side view illustrations of the convertible sawhorse and worktable assembly of FIGS. 1A-20B in a storage operative orientation.
Figure 21B:
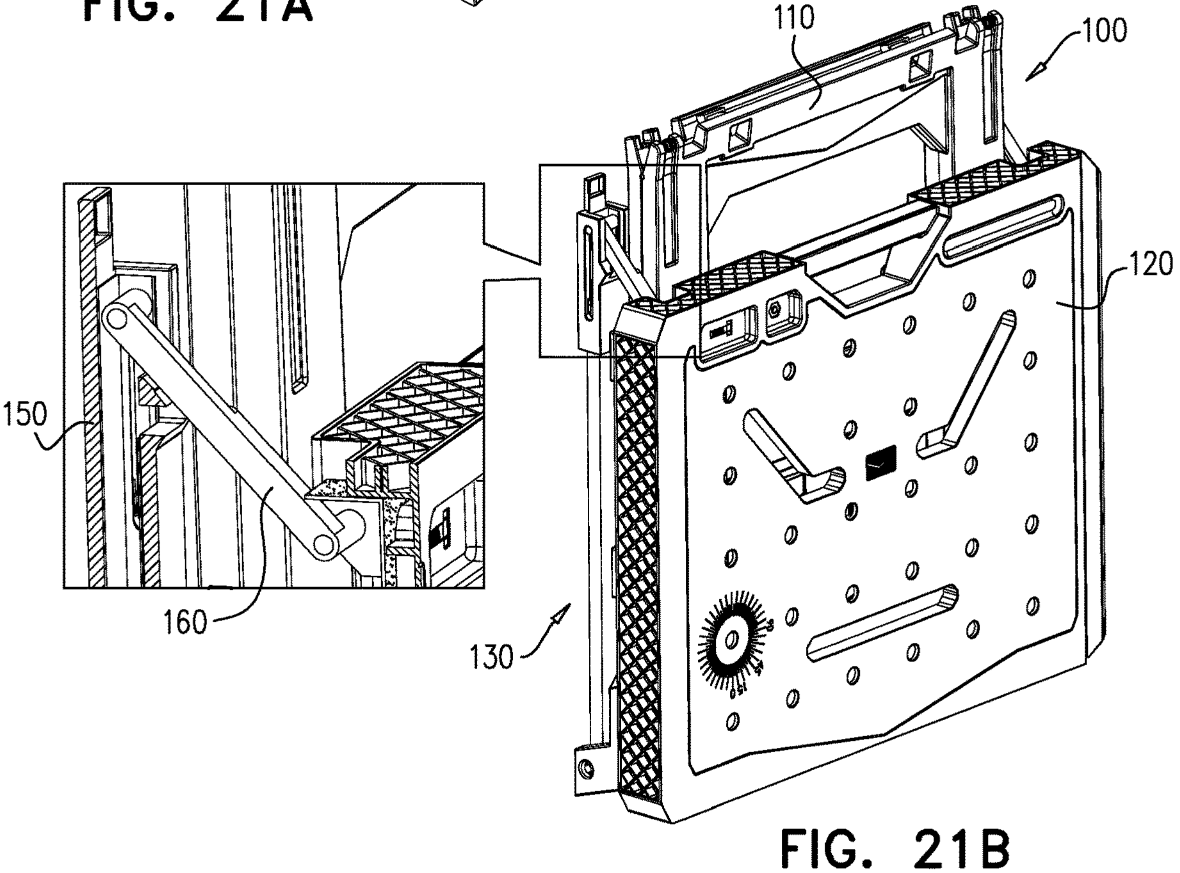
Figure 21C:
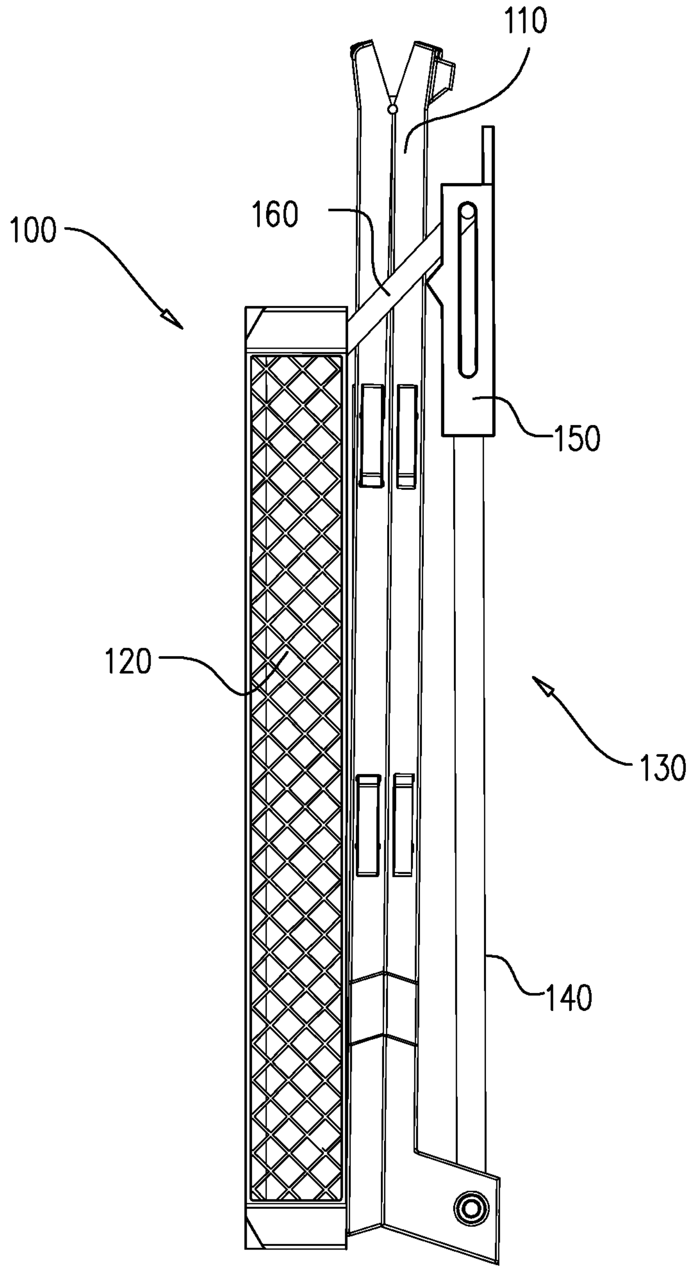

Referring specifically to FIGS. 21A-21C, it is seen that in a storage operative orientation, the convertible sawhorse and worktable assembly 100 of FIGS. 1A-20B is in a compact state with the sawhorse assembly 110 being in a closed, generally flat, state, the worktable surface defining element 120 being located generally parallel to the sawhorse assembly 110 on a first side thereof and the worktable auxiliary support assembly 130 being located generally parallel to the sawhorse assembly 110 on a second side thereof and being joined to the worktable surface defining element 120 by linkage elements 160.

Figure 22A:
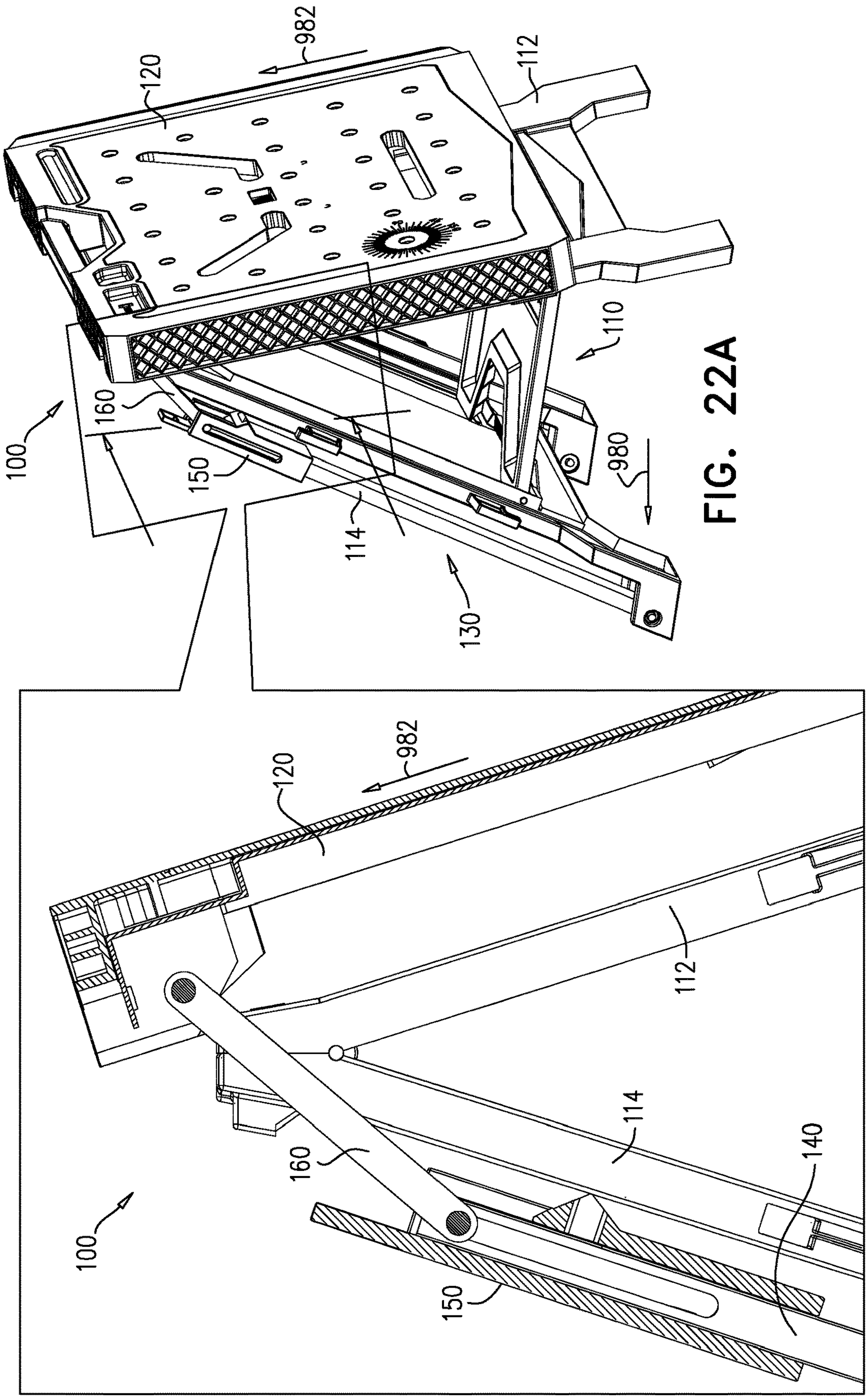
FIGS. 22A, 22B and 22C are simplified first and second pictorial and planar side view illustrations of the convertible sawhorse and worktable assembly of FIGS. 1A-20B in a first intermediate operative orientation wherein the sawhorse assembly is in an open operative orientation and the worktable surface defining element is in a fully lowered orientation.
Figure 22B:
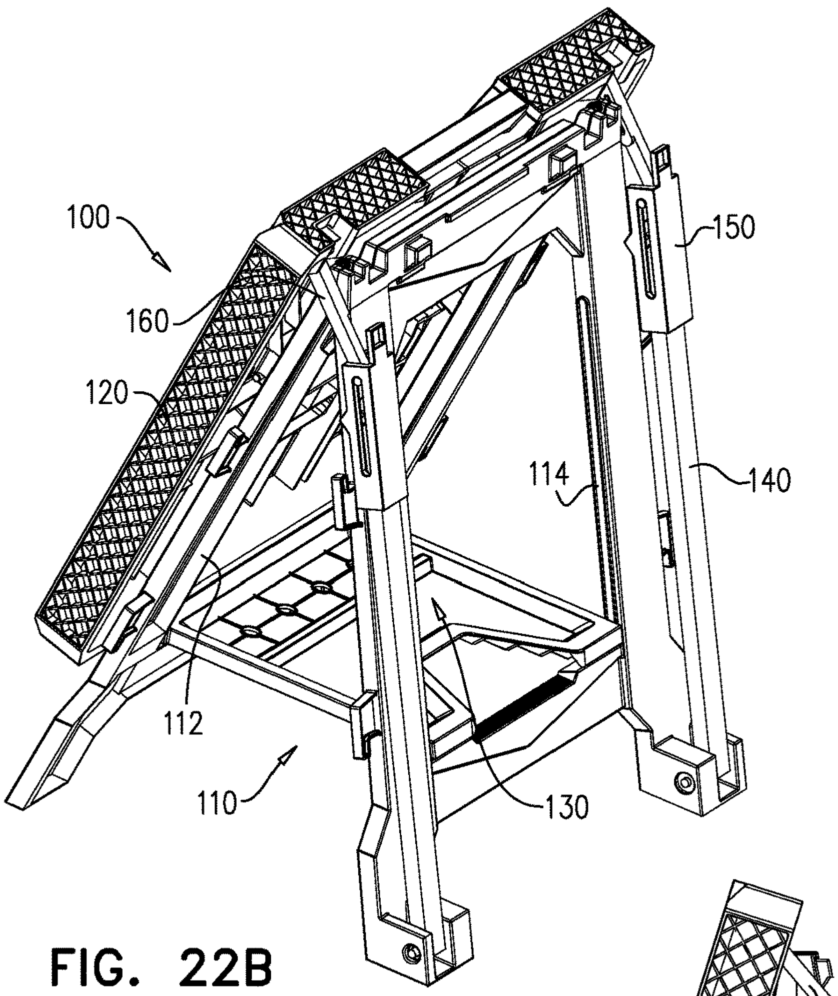
Figure 22C:
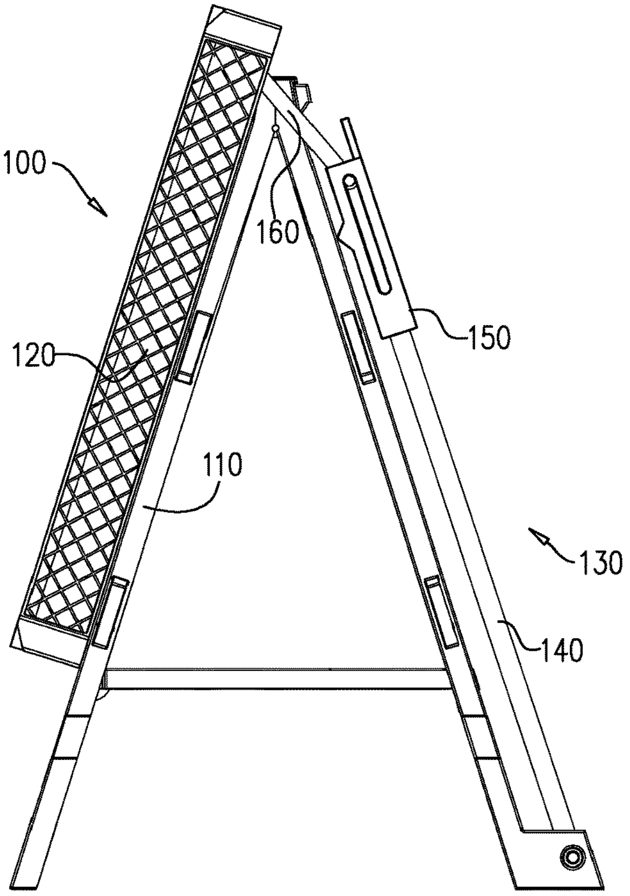

Referring now specifically to FIGS. 22A, 22B and 22C, it is seen that in a first intermediate operative orientation, the sawhorse assembly 110 is in an open, inverted V-shaped, operative orientation and the worktable surface defining element 120 is located generally parallel to first sawhorse element 112 of the sawhorse assembly 110 on a first side thereof and the worktable auxiliary support assembly 130 is located generally parallel to second sawhorse element 114 of the sawhorse assembly 110 on a second side thereof and is joined to the worktable surface defining element 120 by linkage elements 160. As seen in FIGS. 22A-22C, opening of the sawhorse assembly 110 moves second sawhorse element 114 relative to sawhorse element 112, as indicated by an arrow 980, causing worktable surface defining element 120 to move upwardly relative to first sawhorse element 112 while remaining generally parallel to first sawhorse element 112, as indicated by an arrow 982.

Figure 23A:
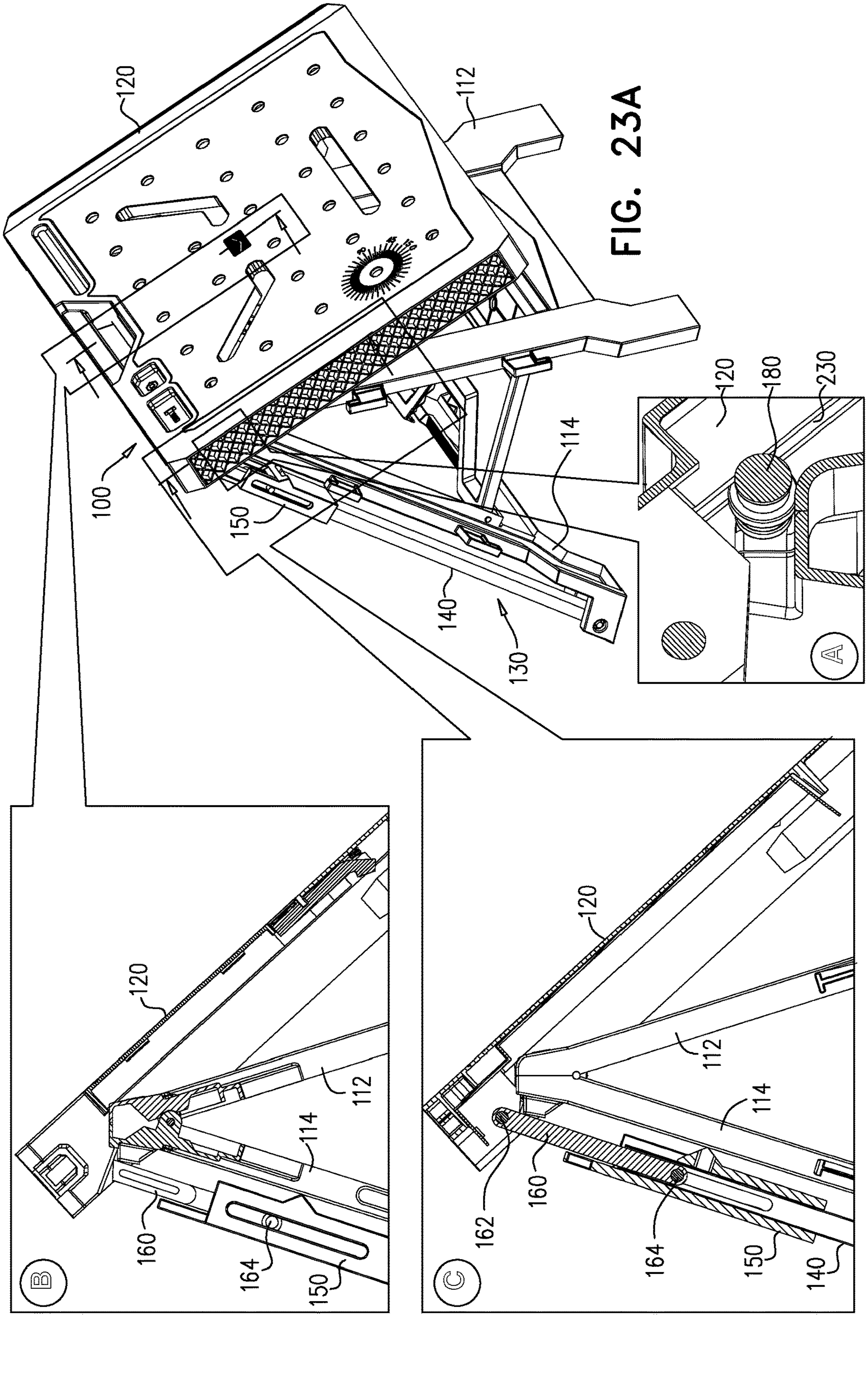
FIGS. 23A, 23B and 23C are simplified first and second pictorial and planar side view illustrations of the convertible sawhorse and worktable assembly of FIGS. 1A-20B in a second intermediate operative orientation wherein the sawhorse assembly is in an open operative orientation and the worktable surface defining element is in a partially raised orientation.
Figure 23B:
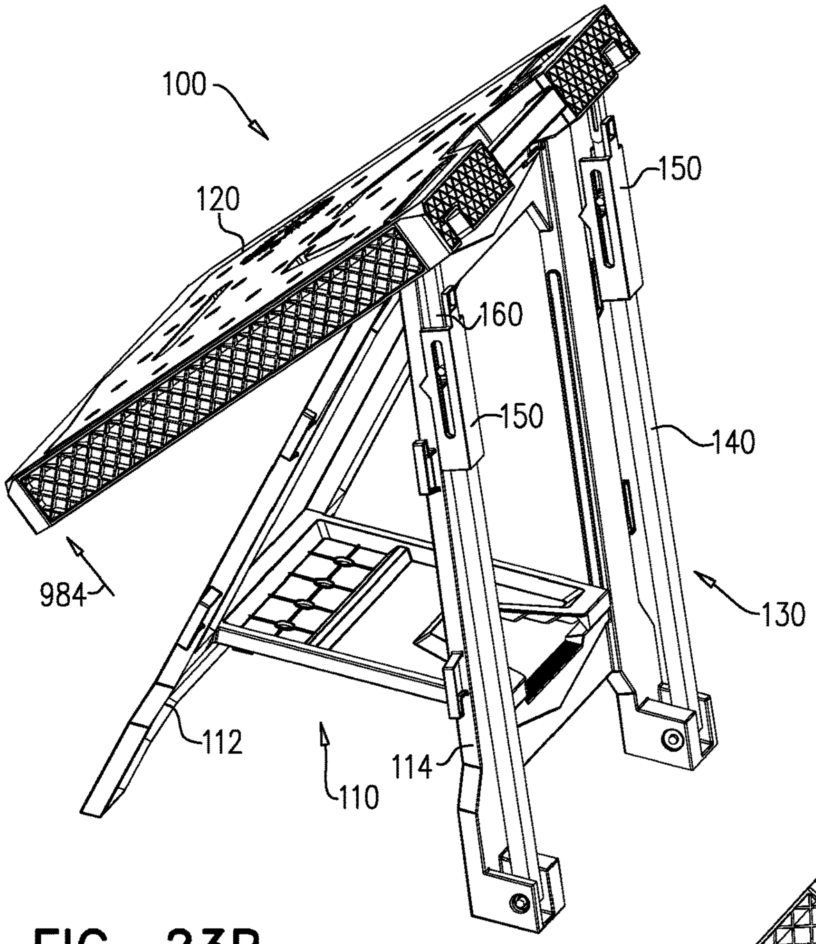
Figure 23C:
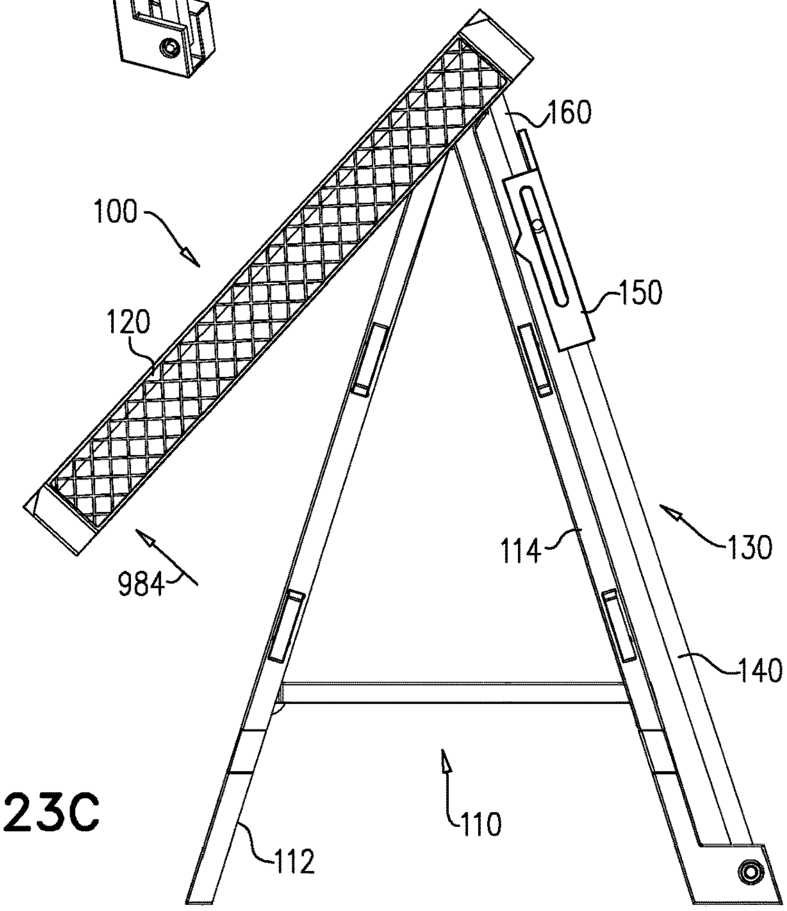

Referring now specifically to FIGS. 23A, 23B and 23C, it is seen that in a second intermediate operative orientation, the sawhorse assembly 110 is in an open operative orientation and the worktable surface defining element 120 is no longer located generally parallel to the sawhorse assembly 110 and is beginning to be raised and pivoted relative to the sawhorse assembly 110, as indicated by an arrow 984, by engagement of parallel roller engagement tracks 230 of the worktable surface defining element 120 with rollers 180 of the sawhorse assembly 110.

Figure 24A:
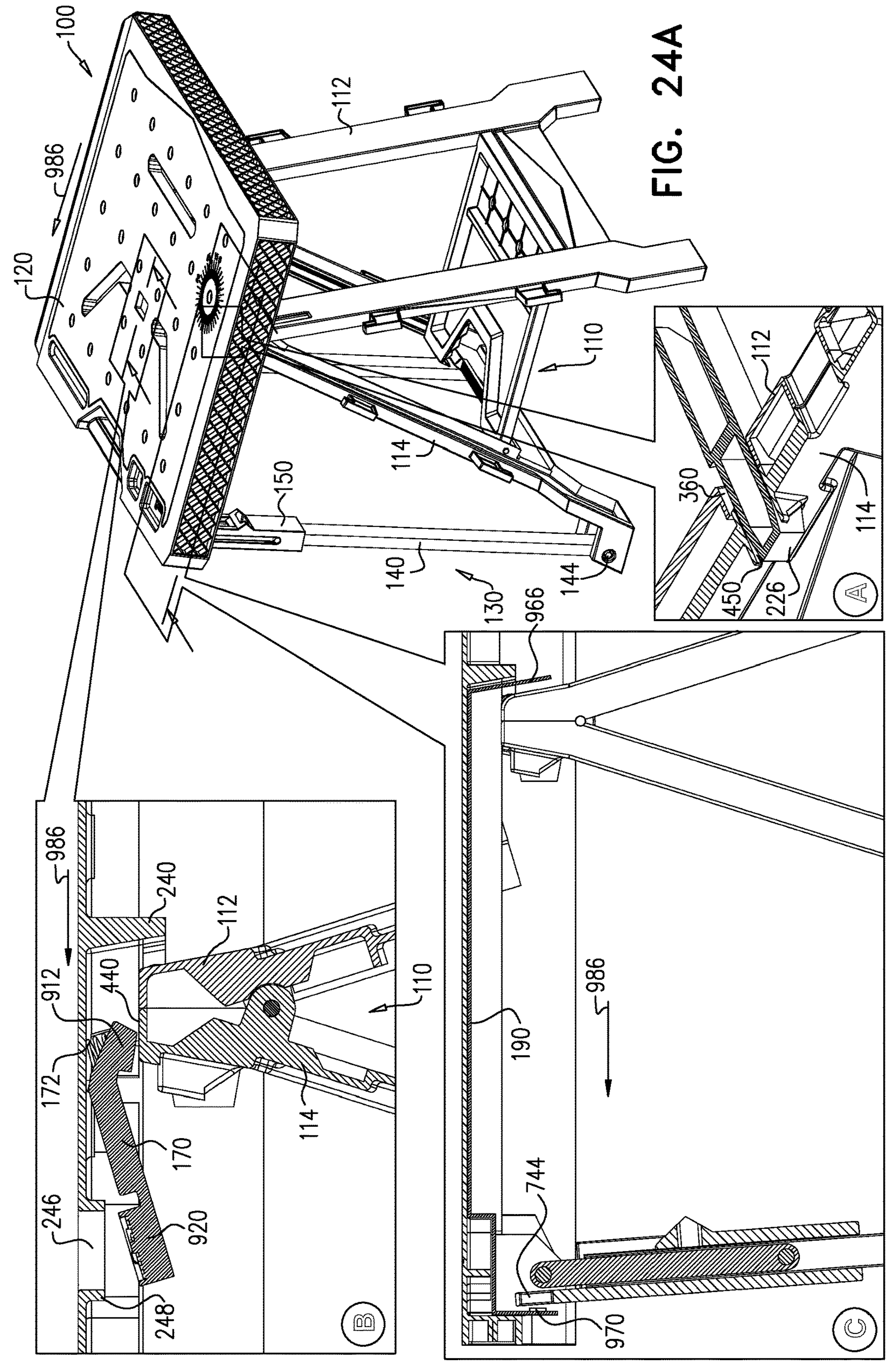
FIGS. 24A, 24B and 24C are simplified first and second pictorial and planar side view illustrations of the convertible sawhorse and worktable assembly of FIGS. 1A-20B in a third intermediate operative orientation wherein the sawhorse assembly is in an open operative orientation and the worktable surface defining element is in a fully raised and unlocked orientation.
Figure 24B:
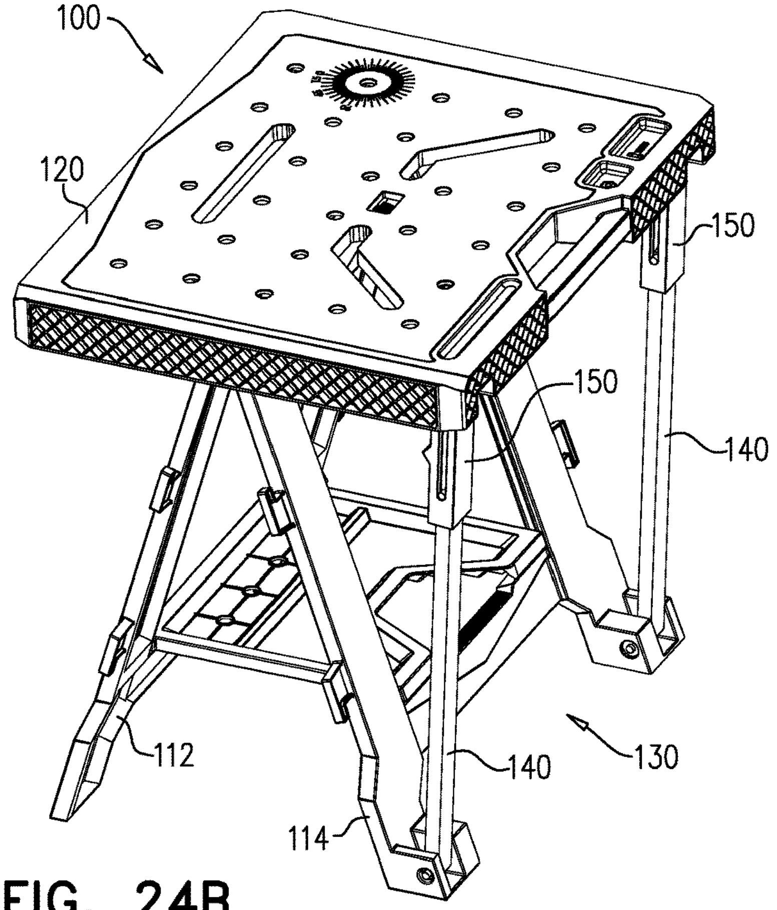
Figure 24C:
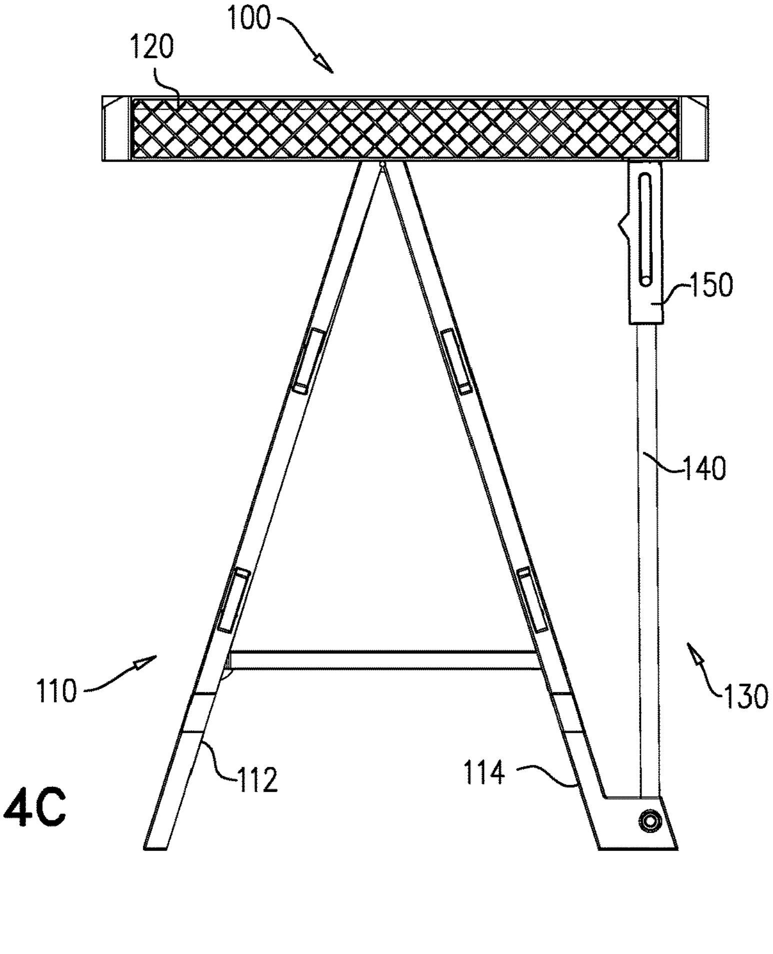

Referring now specifically to FIGS. 24A, 24B and 24C, it is seen that in a third intermediate operative orientation, the sawhorse assembly 110 is in an open operative orientation and the worktable surface defining element 120 is generally horizontal and is supported on the sawhorse assembly 110 but is not yet locked in place. As seen particularly in enlargement A of FIG. 24A, in this operative orientation locking protrusions 226 of worktable surface defining assembly 120 have partially engaged locking protrusion receiving apertures 360 of first sawhorse element 112 of sawhorse assembly 110 and apertured locking element receiving protrusions 450 of second sawhorse element 114 of the sawhorse assembly 110.

In the operative orientation shown in FIGS. 24A-24C, as seen particularly in enlargement B of FIG. 24A, manual engageable button portion 920 of manually operable table locking element 170 is prevented from engaging manually engageable button accommodating aperture 246, against urging of compression springs 172 seated on engagement portion 912 of manually operable table locking element 170, by engagement of elongate portion 912 of manually operable table locking element 170 with top facing edge 440 of second sawhorse element 114 of sawhorse assembly 110.

As seen particularly in enlargement C of FIG. 24A, locking aperture 744 of leg articulation element 150 is aligned with, but not yet engaged with, inwardly facing protrusion 970 of leg locking element 190. Additionally, as seen particularly in enlargement C of FIG. 24A, a top of sawhorse assembly 110 is aligned with, but not yet engaged with, angled end portion 966 of leg locking element 190.

Locking of worktable surface defining assembly 120 is achieved by moving worktable surface defining assembly 120 forwardly relative to sawhorse assembly 110, in a direction indicated by an arrow 986 in FIG. 24A, thereby allowing elongate portion 912 of manually operable table locking element 170 to clear top facing edge 440 of second sawhorse element 114 of sawhorse assembly 110 and causing engagement of engageable button portion 920 of manually operable table locking element 170 with manually engageable button accommodating aperture 246, under the urging of compression springs 172, seated on engagement portion 912 of manually operable table locking element 170.

Additionally, engagement of angled end portion 966 of leg locking element 190 with first sawhorse element 112 of sawhorse assembly 110 together with rotation of leg elements 140 of worktable auxiliary support assembly 130 relative to second sawhorse element 114 about mounting pins 144 moves locking aperture 744 of leg articulation element 150 of worktable auxiliary support assembly 130 and inwardly facing protrusion 970 of leg locking element 190 into mutual locking engagement. Locking protrusions 226 of worktable surface defining assembly 120 fully engage locking protrusion receiving apertures 360 of first sawhorse element 112 of sawhorse assembly 110 and apertured locking element receiving protrusions 450 of second sawhorse element 114 of the sawhorse assembly 110.

A worktable usage operative orientation of convertible sawhorse and worktable assembly 100 of FIGS. 1A-20B, in which sawhorse assembly 110 is open and worktable surface defining assembly 120 is locked relative thereto, is described below with specific reference to FIGS. 25A, 25B and 25C. It is seen that, in the worktable usage operative orientation, the sawhorse assembly 110 is in an open operative orientation and the worktable surface defining element 120 is generally horizontal and is supported on the sawhorse assembly 110 and is shifted slightly forward from the orientation shown in FIGS. 24A-24C, in a direction indicated by an arrow 988, relative to the sawhorse assembly 110 and is locked in place.

Figure 25A:
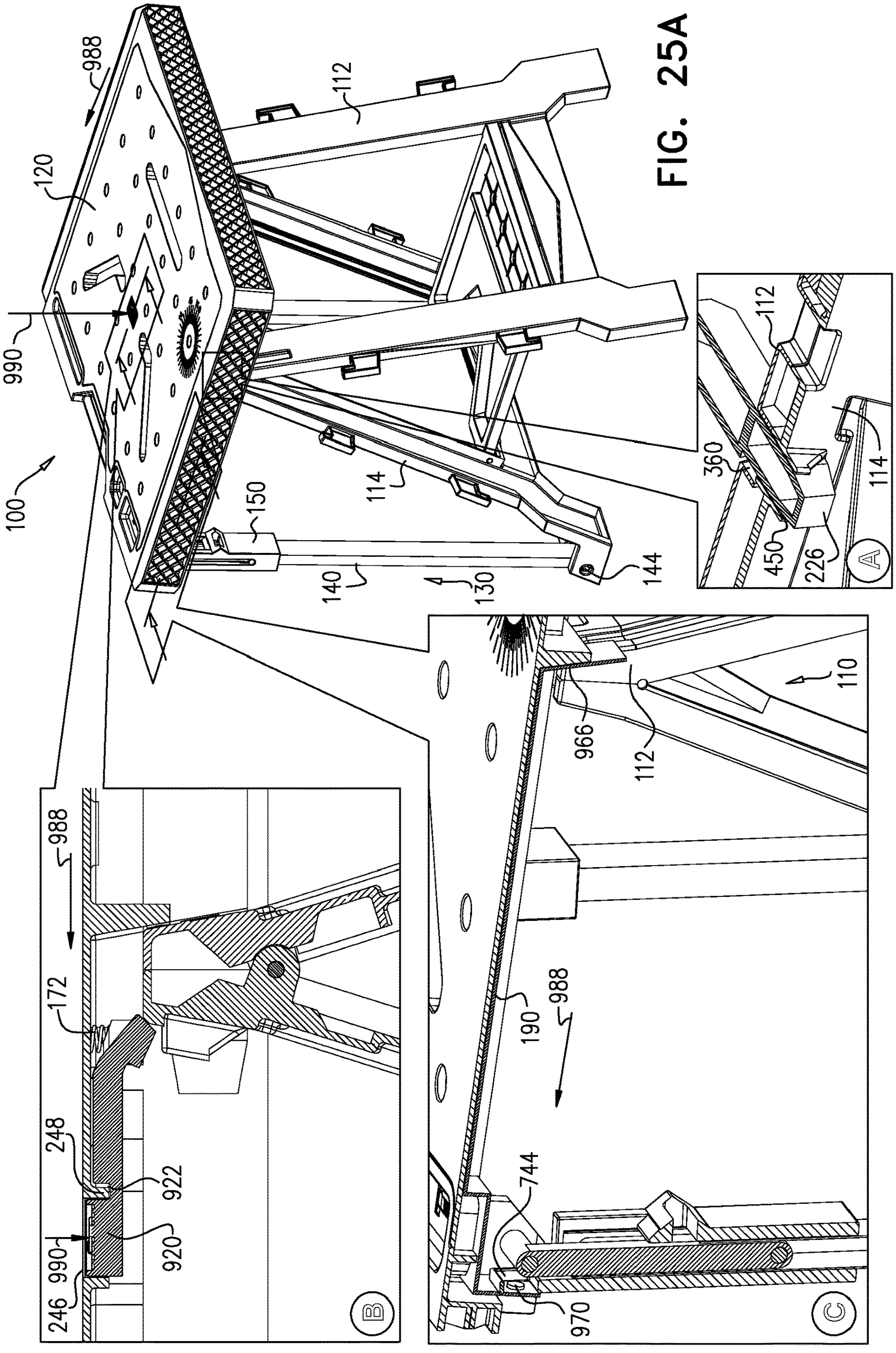
FIGS. 25A, 25B and 25C are simplified first and second pictorial and planar side view illustrations of the convertible sawhorse and worktable assembly of FIGS. 1A-20B in a worktable usage operative orientation wherein the sawhorse assembly is in an open operative orientation and the worktable surface defining element is in a fully raised and locked orientation.

As seen particularly in enlargement A of FIG. 25A, in this operative orientation locking protrusions 226 of worktable surface defining assembly 120 fully engage locking protrusion receiving apertures 360 of first sawhorse element 112 of sawhorse assembly 110 and apertured locking element receiving protrusions 450 of second sawhorse element 114 of sawhorse assembly 110. The locking engagement of locking protrusions 226 of worktable surface defining assembly 120 with locking protrusion receiving apertures 360 and apertured locking element receiving protrusions 450 of sawhorse assembly 110 prevents vertical movement of worktable surface defining assembly 120 relative to sawhorse assembly 110.

Figure 25B:
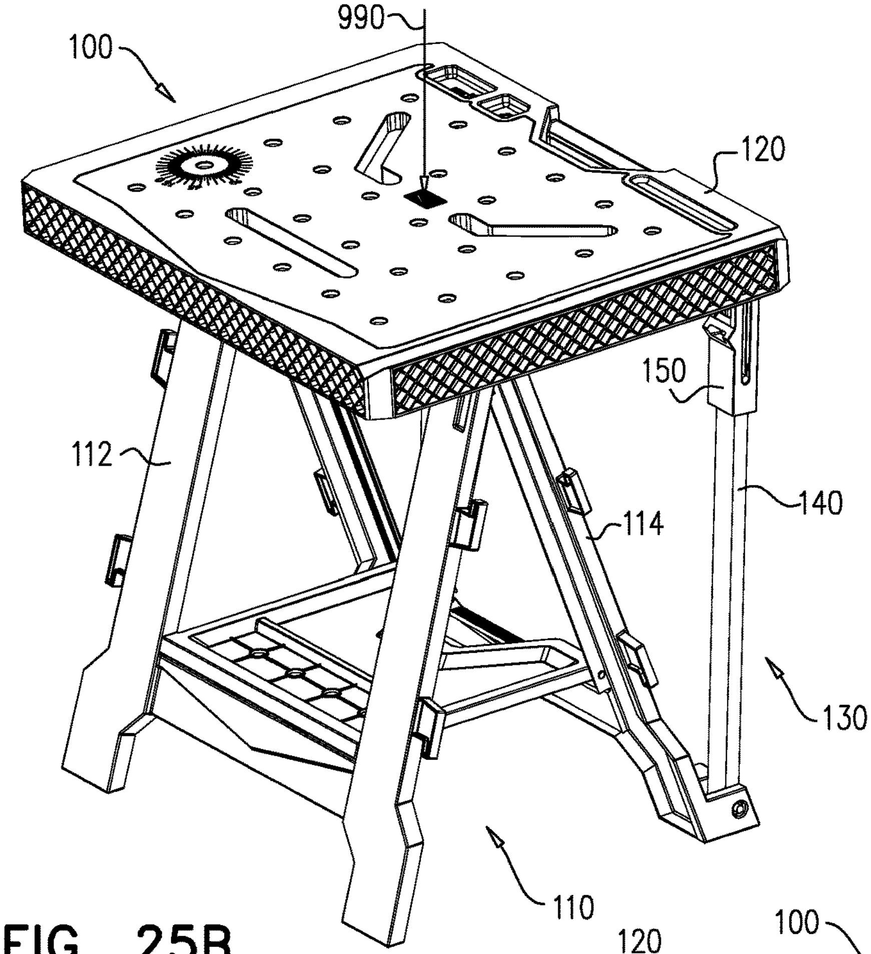
Figure 25C:
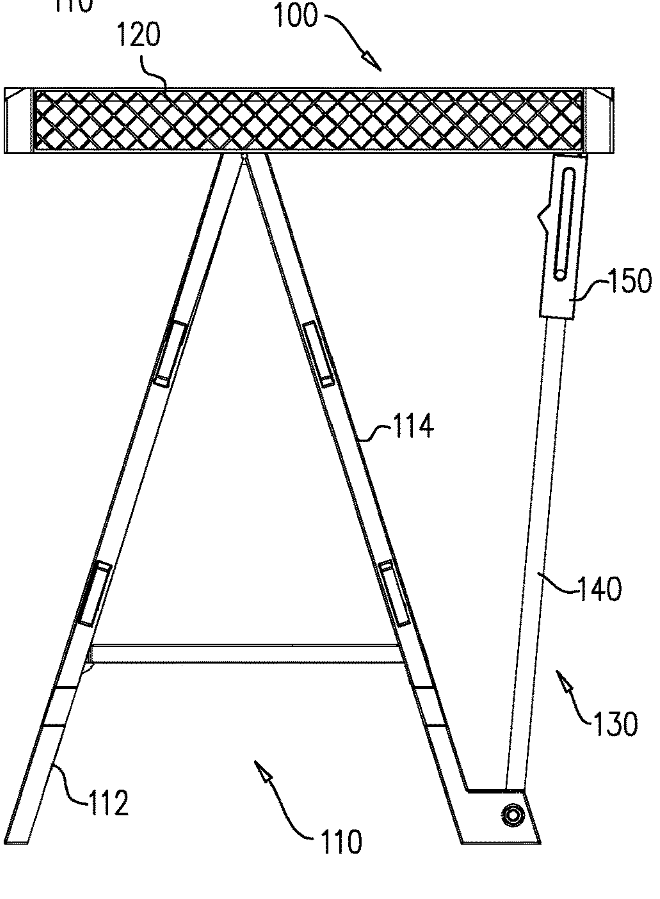

As seen particularly in enlargement B of FIG. 25A, in the operative orientation shown in FIGS. 25A-25C, engageable button portion 920 of manually operable table locking element 170 is in engagement with manually engageable button accommodating aperture 246, under urging of compression springs 172 seated on engagement portion 912 of manually operable table locking element 170. Additionally, a portion of rectangular protrusion 248 of worktable surface defining element 120 engages linkage portion 922 of manually operable table locking element 170. The locking engagement of engageable button portion 920 with manually engageable button accommodating aperture 246 and locking engagement of portion of rectangular protrusion 248 of worktable surface defining element 120 with linkage portion 922 of manually operable table locking element 170 prevents horizontal movement of worktable surface defining element 120 relative to sawhorse assembly 110.

As seen particularly in enlargement C of FIG. 25A, locking aperture 744 of leg articulation element 150 is engaged with inwardly facing protrusion 970 of leg locking element 190. The locking engagement of locking aperture 744 of leg articulation element 150 with inwardly facing protrusion 970 of leg locking element 190 prevents worktable surface defining assembly 120 from tilting relative to sawhorse element 110.

Further, as seen particularly in enlargement C of FIG. 25A, a top of sawhorse assembly 110 engages angled end portion 966 of leg locking element 190, thereby preventing worktable surface defining assembly 120 from advancing further in the direction of arrow 986 (FIG. 24A).

Unlocking of the convertible sawhorse and worktable assembly of FIGS. 1A-20B from the worktable usage operative orientation is achieved by manually depressing button portion 920 of table locking element 170 as indicated by an arrow 990 in FIGS. 25A and 25B. This depression disengages engageable button portion 920 of table locking element 170 from manually engageable button accommodating aperture 246 of the worktable surface defining element 120 and allows displacement of the worktable surface defining element 120 relative to sawhorse assembly 110 to any of the operative orientations described hereinabove with reference to FIGS. 21A-24C.

Figure 26A:
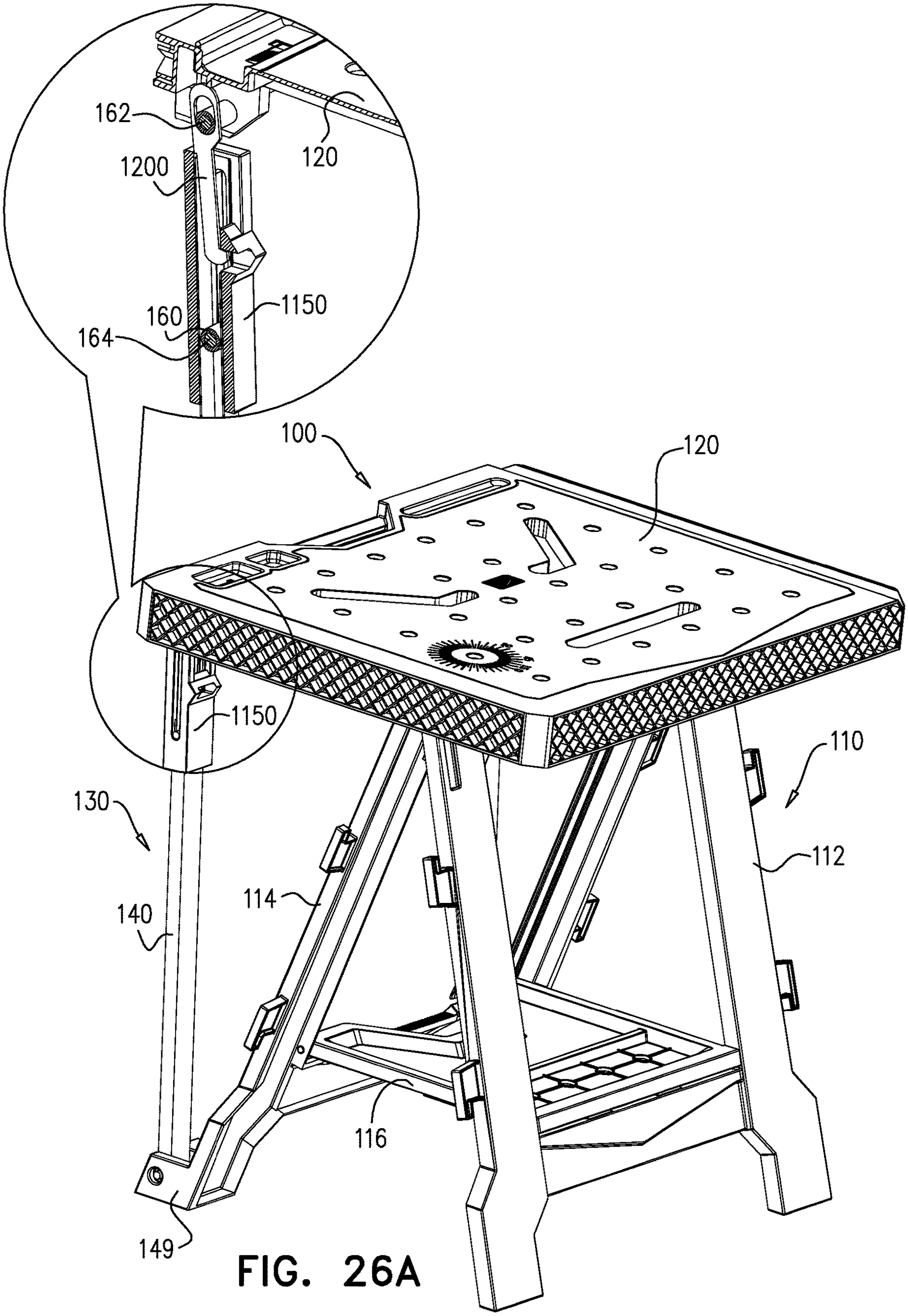
FIGS. 26A, 26B and 26C are three simplified pictorial view illustrations, taken from different angles, of a convertible sawhorse and worktable assembly constructed and operative in accordance with another preferred embodiment of the invention, in a worktable usage operative orientation.
Figure 26B:
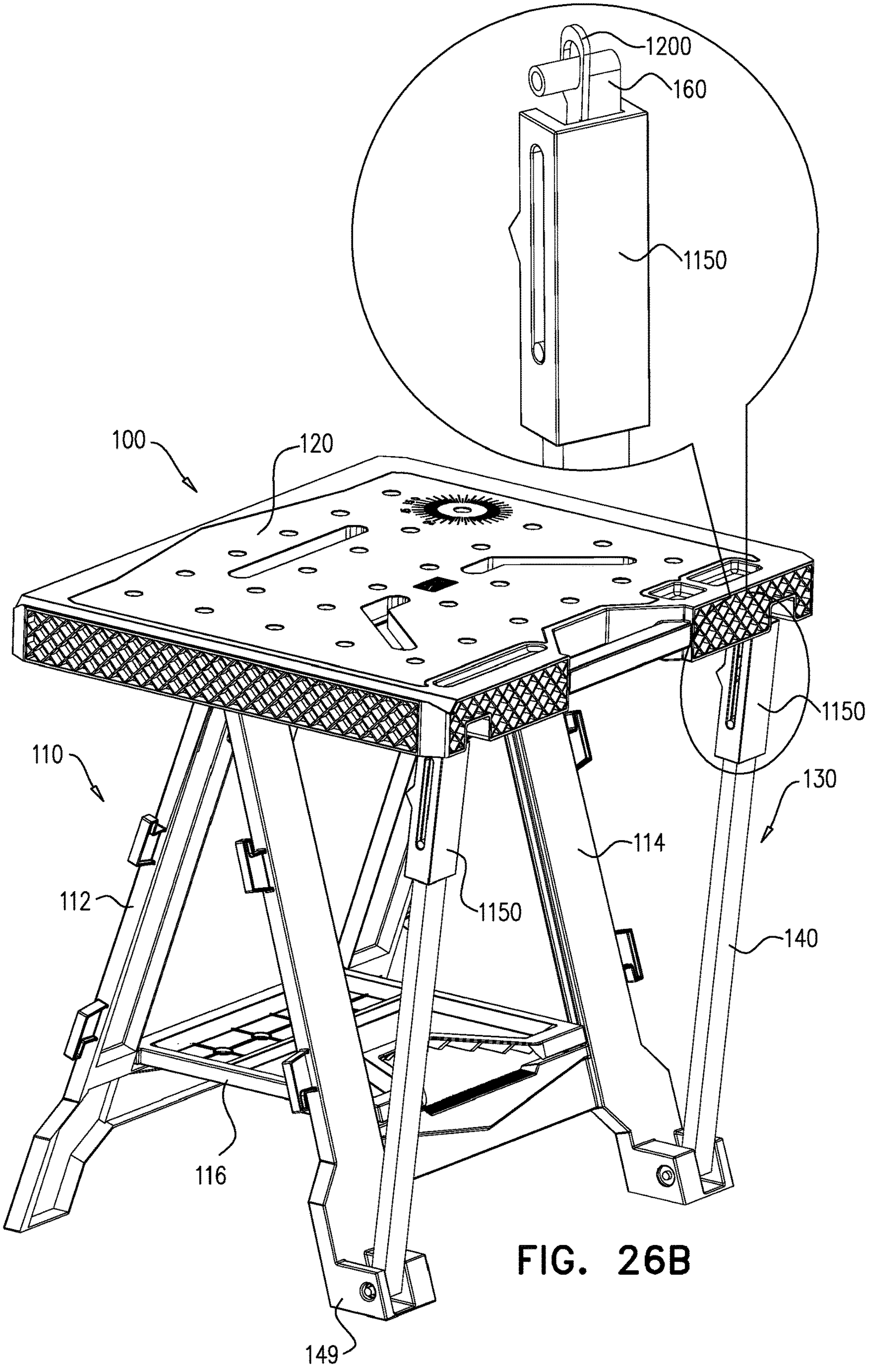
Figure 26C:
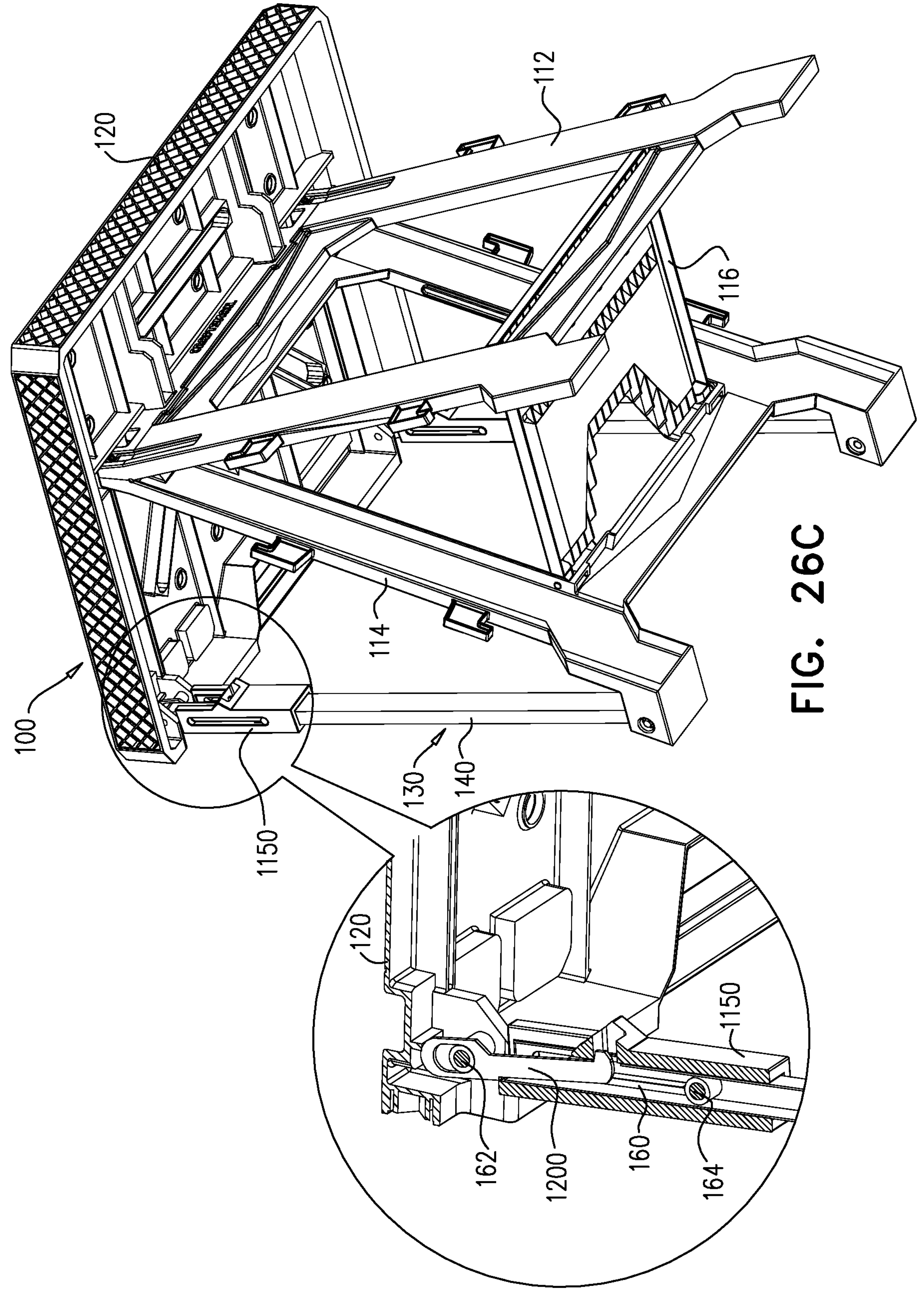
Figure 27A:
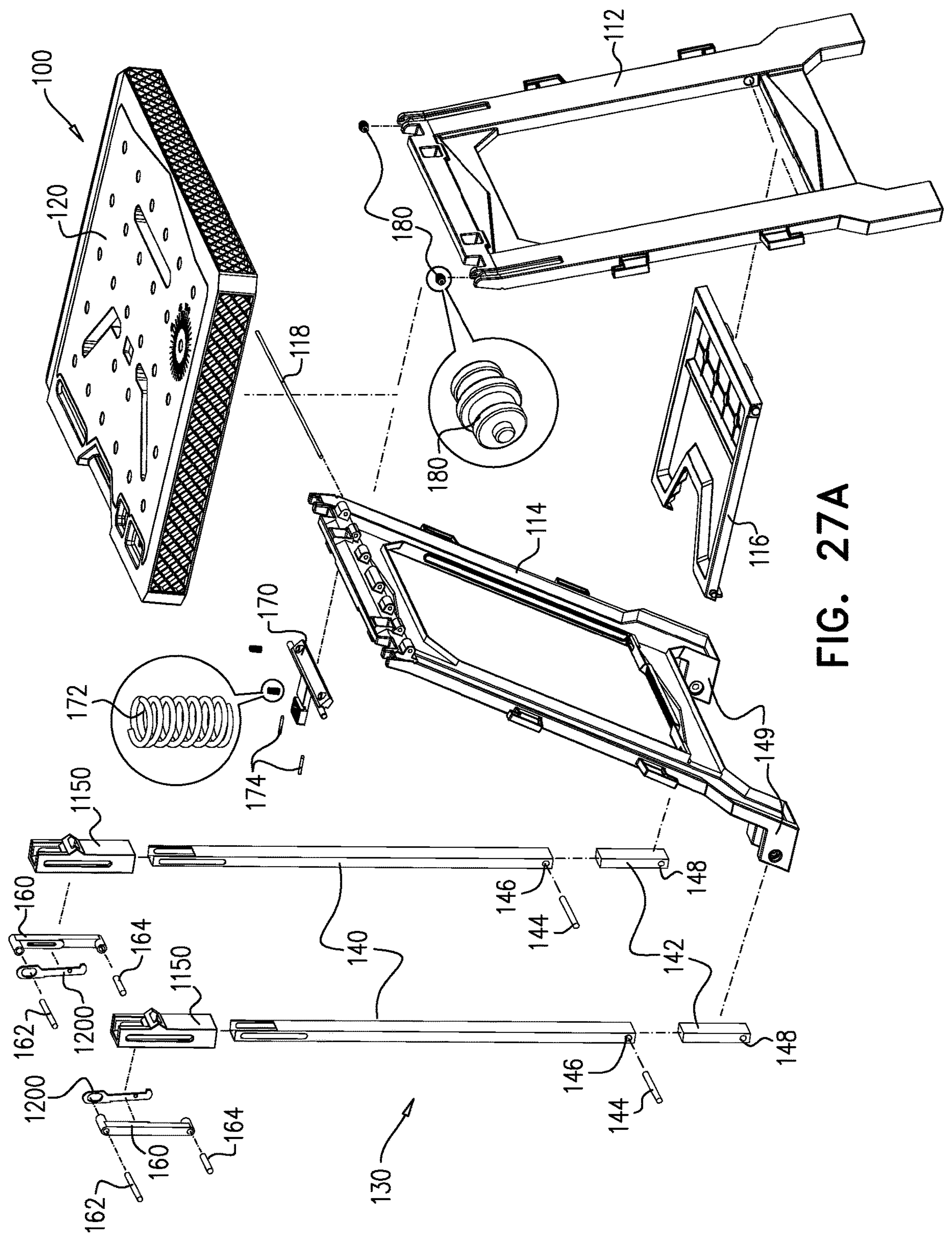
FIGS. 27A and 27B are simplified fully and partially exploded view illustrations of the convertible sawhorse and worktable assembly of FIGS. 26A-26C.
Figure 27B:
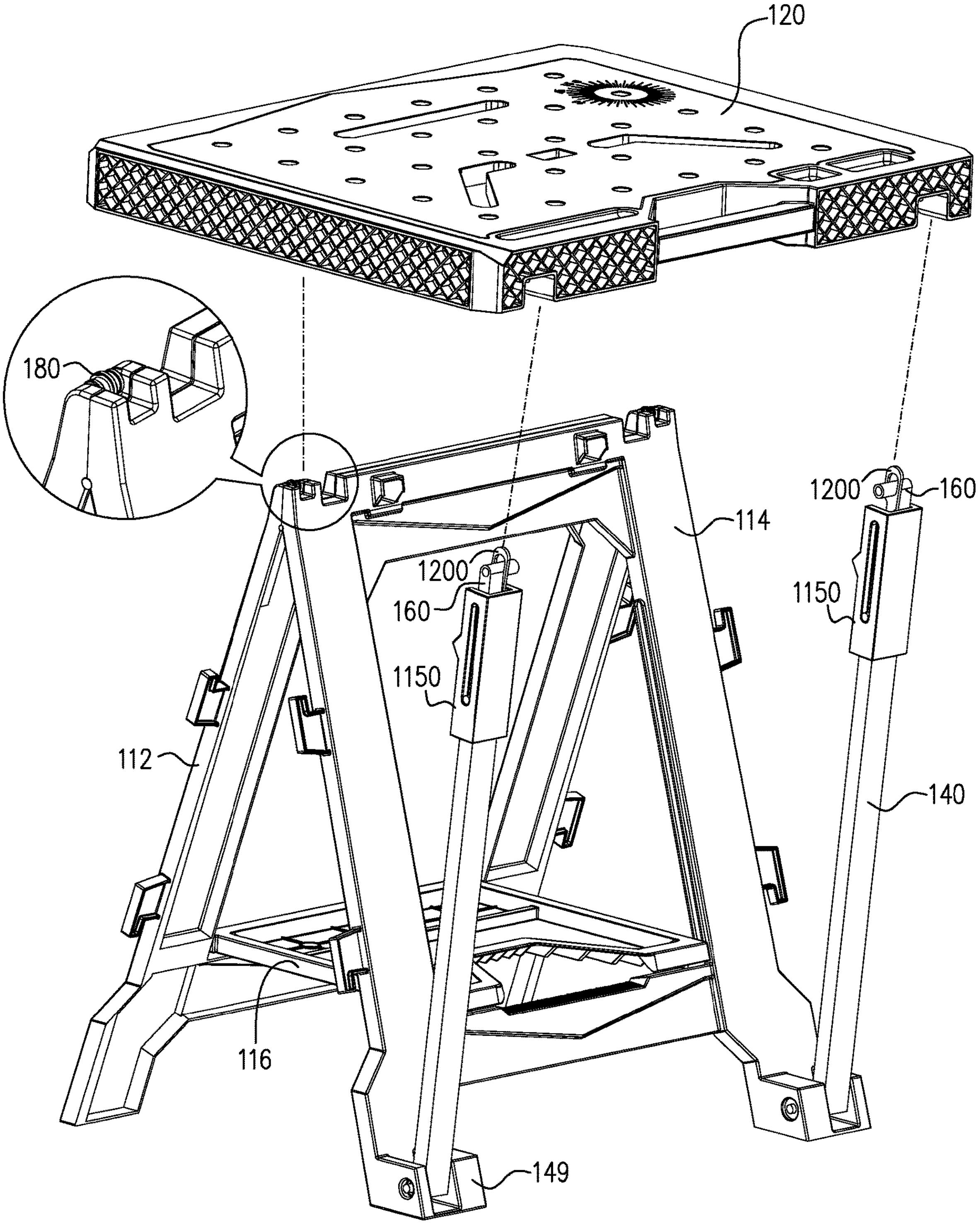

Reference is now made to FIGS. 26A, 26B and 26C, which are three simplified pictorial view illustrations, taken from different angles, of a convertible sawhorse and worktable assembly constructed and operative in accordance with another preferred embodiment of the invention, in a worktable usage operative orientation, and to FIGS. 27A and 27B, which are simplified fully and partially exploded view illustrations of the convertible sawhorse and worktable assembly of FIGS. 26A-26C.

The convertible sawhorse and worktable assembly of FIGS. 26A-27B is similar to the convertible sawhorse and worktable assembly of FIGS. 1A-2B other than as specifically described hereinbelow and similar elements in the embodiment of FIGS. 26A-27B are identified by the same reference numerals used in the above description of the corresponding elements in the embodiment of FIGS. 1A-2B.

As seen in FIGS. 26A-27B, the convertible sawhorse and worktable assembly 100 comprises a sawhorse assembly 110, including first and second mutually articulated sawhorse elements 112 and 114 and a tray element 116, which is pivotably mounted onto first sawhorse element 112 for selectable stable engagement with second sawhorse element 114. First and second mutually articulated sawhorse elements 112 and 114 are described hereinabove with reference to FIGS. 4A-5D and are mutually pivotable about a pivot axle 118, as described above with reference to FIGS. 13A-14B. The tray element 116 is described hereinabove with reference to FIGS. 6A-6D. The structure and assembly of the sawhorse assembly 110 is described hereinabove and shown in detail in FIGS. 4A-6D and FIGS. 13A-14C.

Selectably and convertibly positioned onto the sawhorse assembly 110 is a worktable surface defining element 120, which, when in a worktable usage operative orientation, is supported by the sawhorse assembly 110 and also supported by a worktable auxiliary support assembly 130. Worktable surface defining element 120 is described hereinabove with reference to FIGS. 3A-3G.

Figure 31:
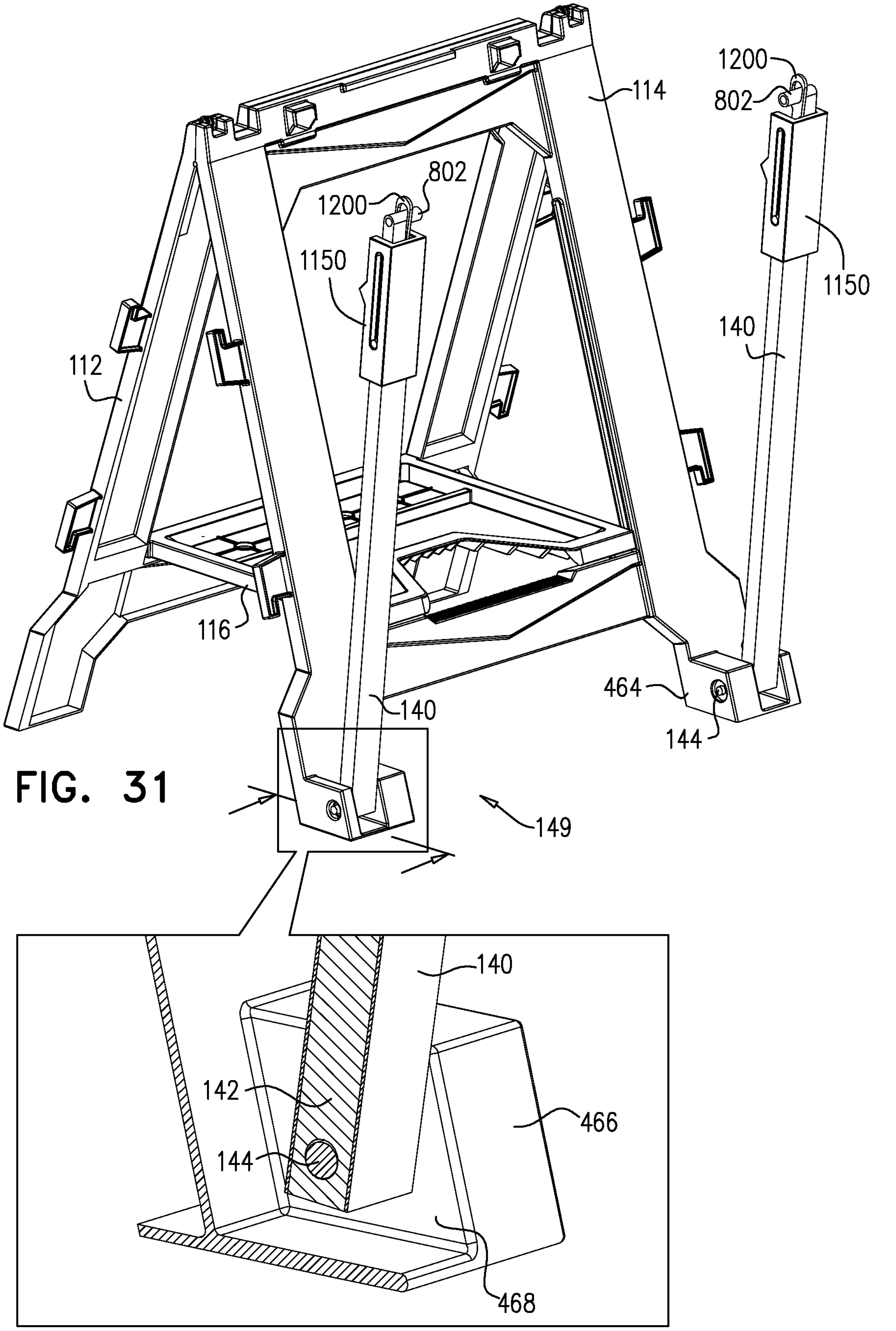
FIG. 31 is a simplified pictorial illustration of the pivotable mounting of worktable auxiliary support assembly onto the sawhorse assembly in the embodiment of FIGS. 26A-27B.

Worktable auxiliary support assembly 130 preferably comprises a pair of leg elements 140, which are described hereinabove in greater detail with reference to FIGS. 7A-7C. Associated with each of leg elements 140 is a leg bottom reinforcing and mounting element 142, which is inserted in the bottom of each leg element 140 and a mounting pin 144, which extends through mutually corresponding pivot mounting apertures 146 and 148 in each leg element 140 and each leg bottom reinforcing and mounting element 142. Each leg element 140 and corresponding leg bottom reinforcing and mounting element 142 is pivotably mounted via mounting pin 144 onto a correspondingly apertured foot 149 of second sawhorse element 114, as seen clearly in FIG. 31.

Associated with each leg element 140 at a top portion thereof is a corresponding selectably lockable leg articulation element 1150, which is described hereinbelow in greater detail with reference to FIGS. 28A-28E and which differs from selectably lockable leg articulation element 150. Each leg articulation element 1150 cooperates with a corresponding linkage element 160, which is described hereinabove in greater detail with reference to FIGS. 9A-9D. Linkage elements 160 slidably and pivotably engage worktable surface defining element 120 and, together with leg articulation elements 1150, enable worktable surface defining element 120 to be displaced from a storage operative orientation to a worktable usage operative orientation and vice versa with relative ease. Each of linkage elements 160 is associated with a worktable surface defining element pivotable engagement pin 162 and an articulation element pivotable and slidable engagement pin 164.

As distinct from the embodiment of FIGS. 1A-2B, in the embodiment of 26A-27B, each leg articulation element 1150 also cooperates with a corresponding locking element 1200, which is described hereinbelow in greater detail with reference to FIGS. 29A & 29B. Locking element 1200 is slidably and pivotably mounted onto worktable surface defining element 120 via cylindrical portion 802 of linkage element 160 and pin 162, extending therethrough, and, depending on the angular orientation of the leg element 140 relative to the worktable surface defining element 120, lockingly engages leg articulation element 1150.

Convertible sawhorse and worktable assembly 100 also comprises a mechanism for selectable locking of the worktable surface defining element 120 in the worktable usage operative orientation and which includes a manually operable table locking element 170, which is described hereinabove in greater detail with reference to FIGS. 10A-10C and which is associated with compression springs 172. Manually operable locking element is pivotably mounted onto worktable surface defining element 120 as is described hereinabove in greater detail and retained in position by a pair of transverse retaining pins 174.

A pair of roller elements 180, each of which is described hereinabove in greater detail with reference to FIGS. 11A & 11B, facilitates displacement of worktable surface defining element 120 from the storage operative orientation to the worktable usage operative orientation.

Leg locking elements 190 are obviated in the embodiment of FIGS. 26A-27B.

Figure 28A:
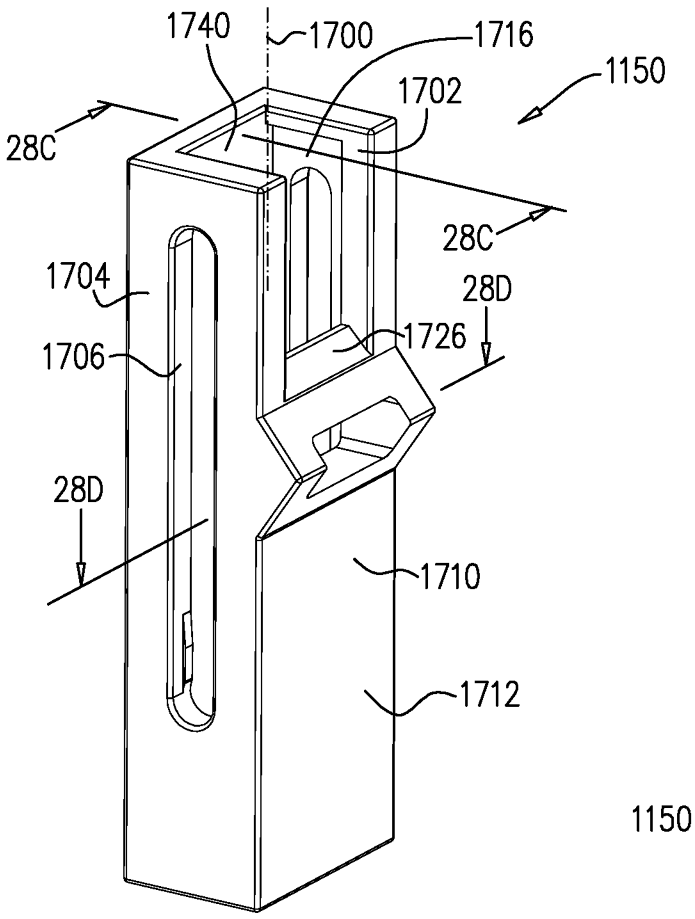
FIGS. 28A, 28B, 28C, 28D and 28E are simplified respective first and second pictorial, first and second sectional and side view illustrations of a leg articulation element, forming part of the worktable auxiliary support assembly, which in turn forms part of the convertible sawhorse and worktable assembly of FIGS. 26A-27B, FIGS. 28C and 28D being taken along respective lines 28C-28C and 28D-28D in FIG. 28A.
Figure 28B:
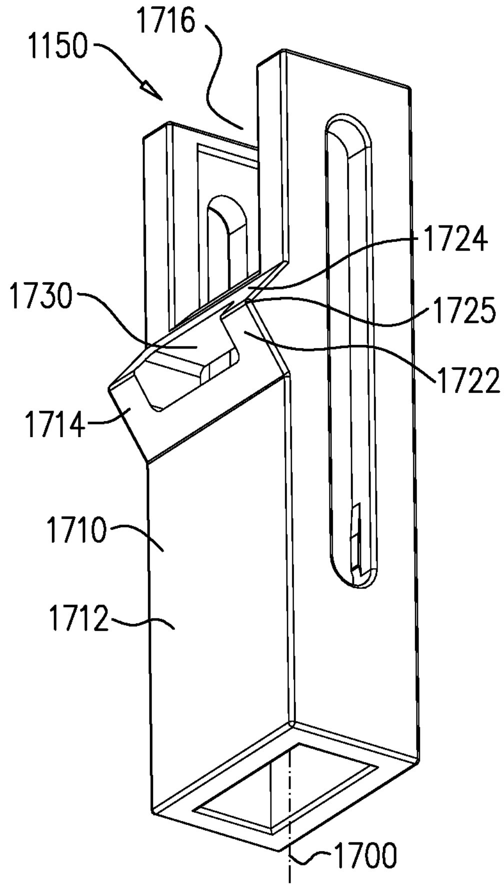
Figure 28C:
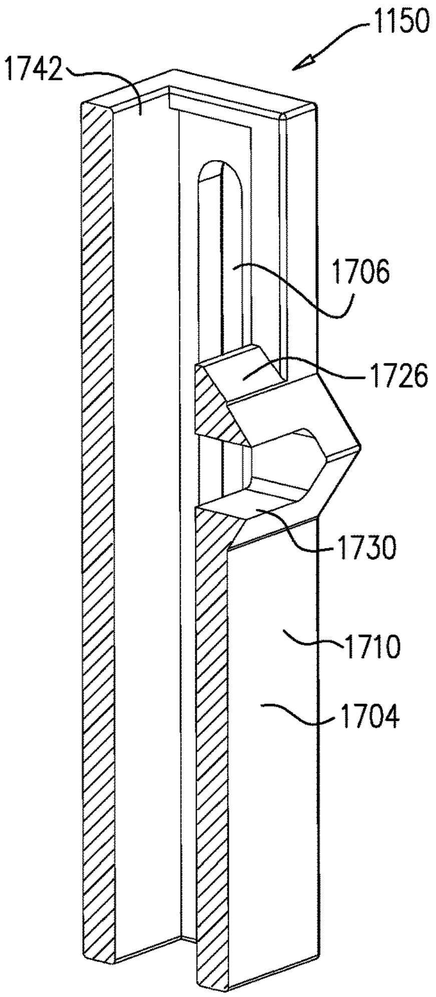
Figure 28D:
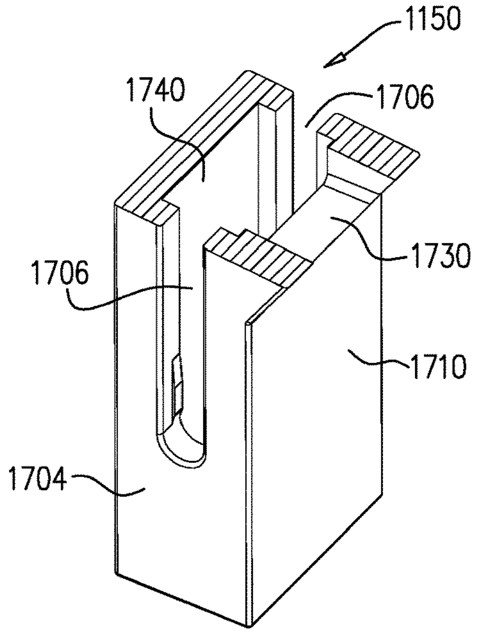
Figure 28E:
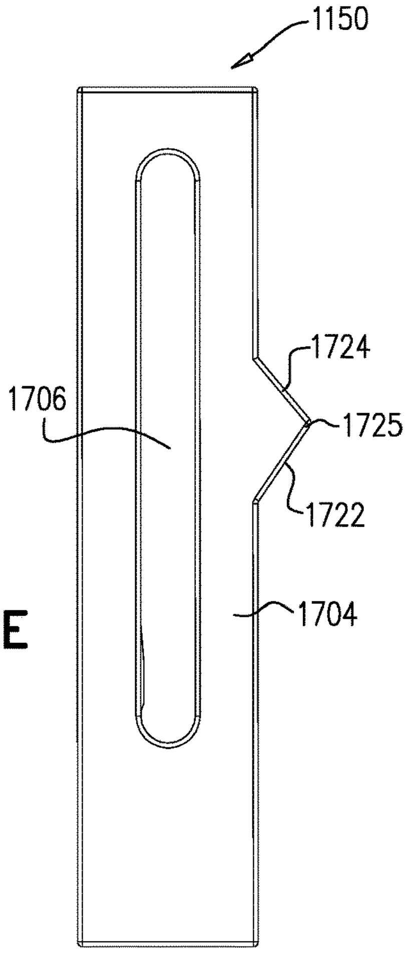

Reference is now made to FIGS. 28A, 28B, 28C, 28D and 28E, which are simplified respective first and second pictorial, first and second sectional and side view illustrations of leg articulation element 1150, forming part of the worktable auxiliary support assembly, which in turn forms part of the convertible sawhorse and worktable assembly of FIGS. 26A-27B, FIGS. 28C and 28D being taken along respective lines 28C-28C and 28D-28D in FIG. 28A.

As noted above, leg articulation element 1150 is distinct from leg articulation element 150.

As seen in FIGS. 28A-28E, leg articulation element 1150 is a unitary elongate hollow element having a uniform rectangular cross section over most of its extent and is side-to-side symmetric about an elongate axis 1700.

Leg articulation element 1150 preferably includes a pair of mutually oppositely aligned side walls 1702 and 1704, which are formed with mutually aligned elongate slots 1706. Extending between side walls 1702 and 1704 is a front wall 1710 including a closed generally planar portion 1712 which terminates upwardly in a thickened outwardly-protruding portion 1714 having an overall triangular cross section, which terminates upwardly in a cut out 1716.

Thickened outwardly-protruding portion 1714 defines a downward-facing outer surface 1722 and an upward-facing outer surface 1724, which are joined along a line 1725, as well as a slightly recessed additional upward-facing surface 1726, which is recessed with respect to surfaces 1722 and 1724 and extends between edge walls 1702 and 1704. A transverse bore 1730 extends perpendicular to axis 1700 from the interior of leg articulation element 1150 to the exterior thereof and intersects surfaces 1722 and 1724 at the junction 1725 thereof.

Also extending between side walls 1702 and 1704 is a back wall 1740, which, in contrast to leg articulation element 150, does not include an upper portion or a locking aperture.

Figure 29A:
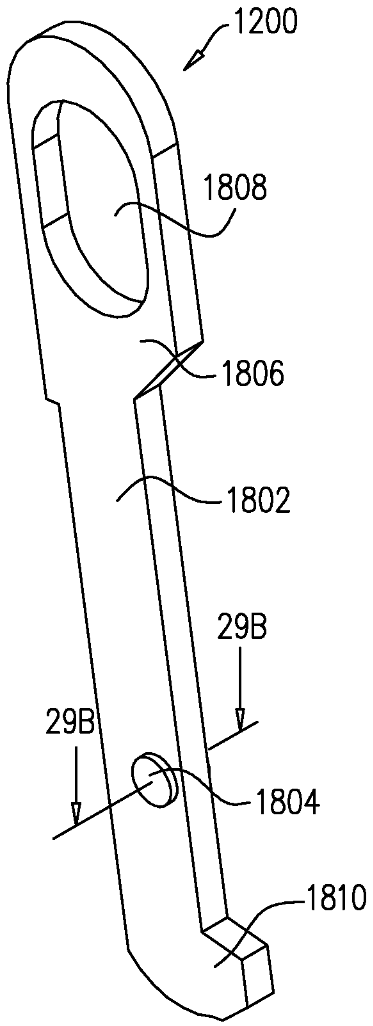
FIGS. 29A and 29B are simplified respective pictorial and sectional illustrations of a leg locking element forming part of the worktable auxiliary support assembly, which in turn forms part of the convertible sawhorse and worktable assembly of FIGS. 26A-27B, FIG. 29B being taken along respective lines 29B-29B in FIG. 29A.
Figure 29B:
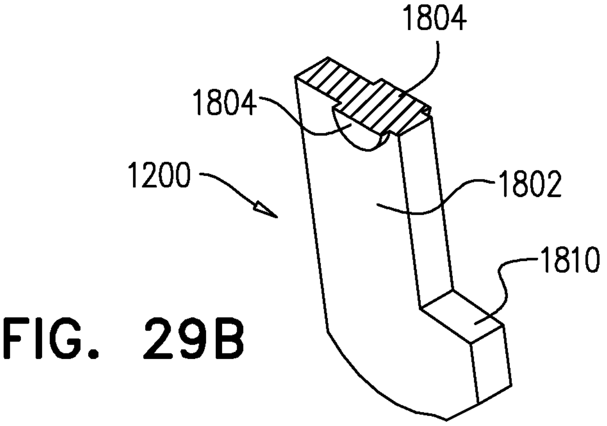
Figure 30A:
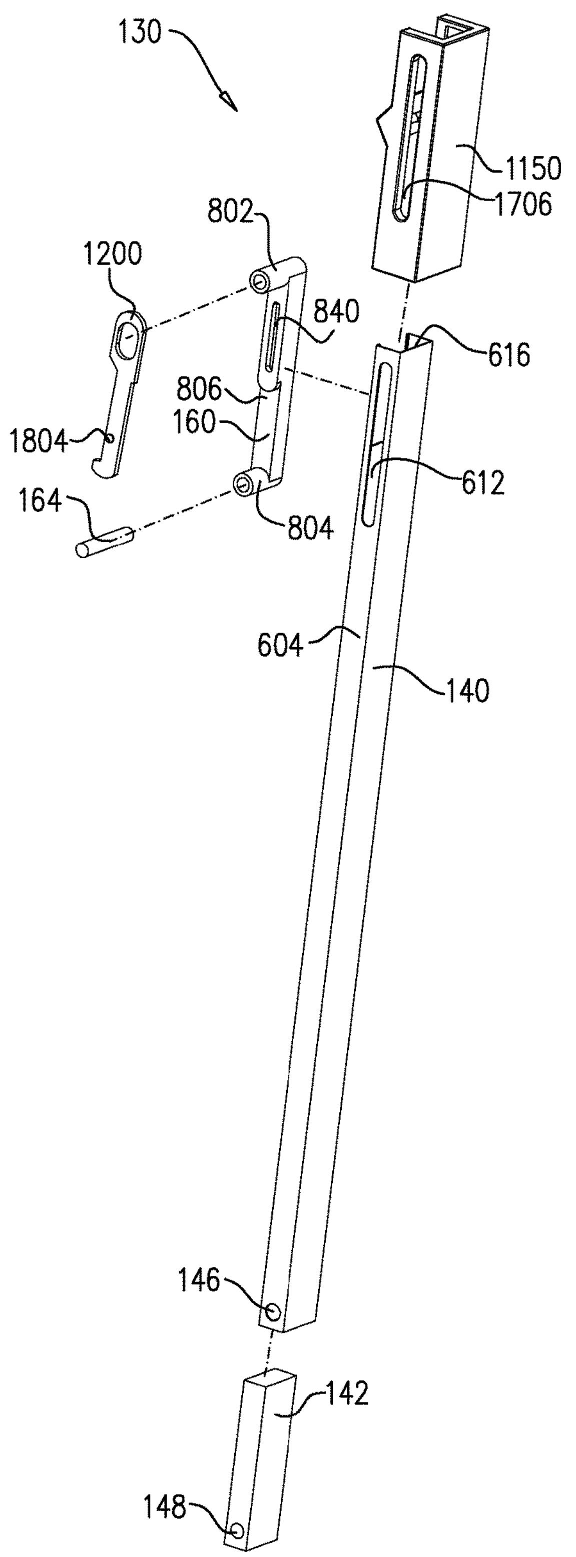
FIGS. 30A, 30B, 30C and 30D are simplified respective first and second pictorial exploded views, a pictorial assembled view and a pictorial sectional view of one side of a worktable auxiliary support assembly forming part of the convertible sawhorse and worktable assembly of FIGS. 26A-27B.
Figure 30B:
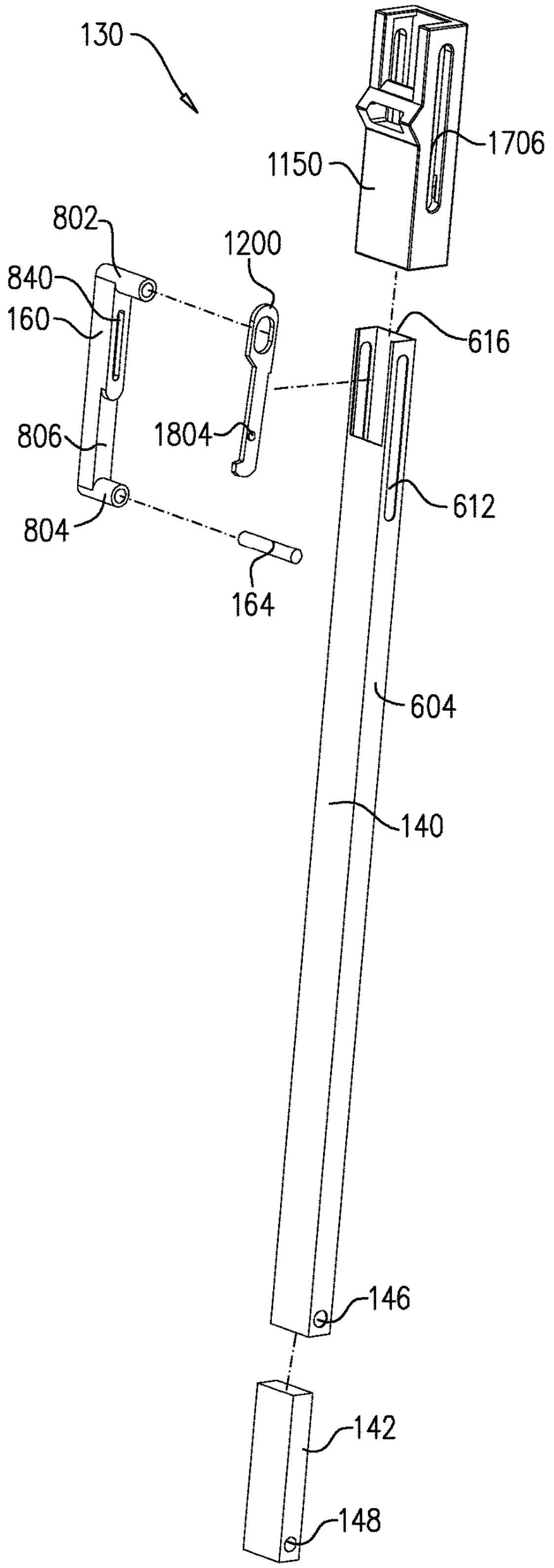
Figure 30C:
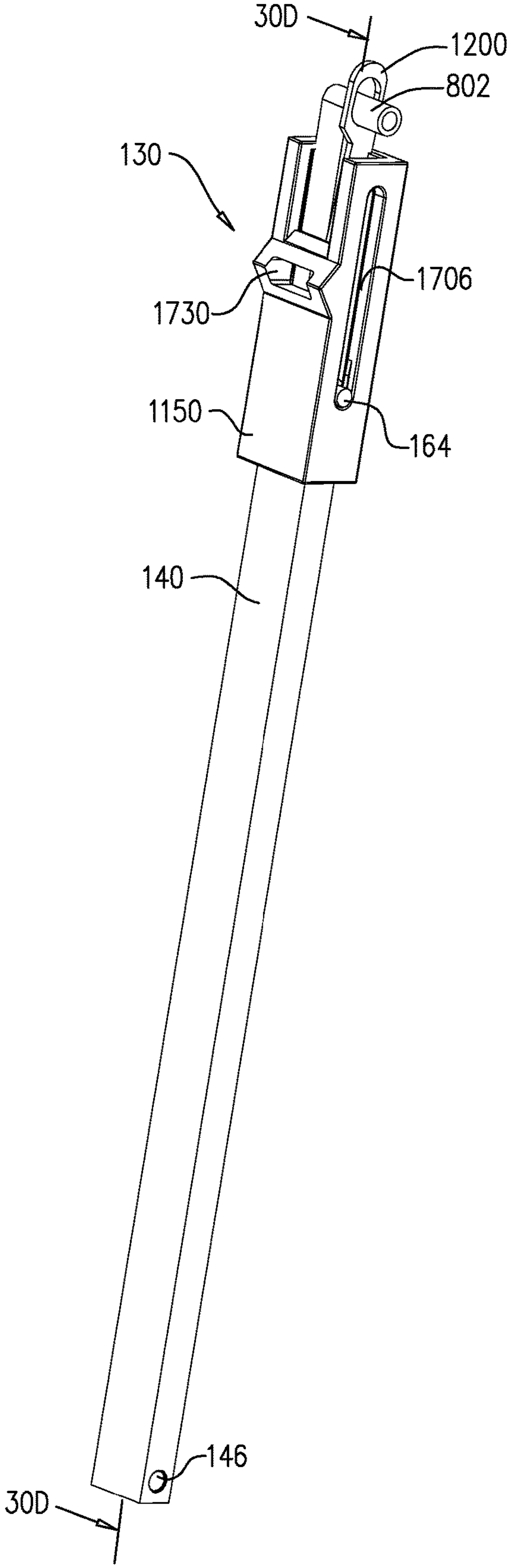
Figure 30D:
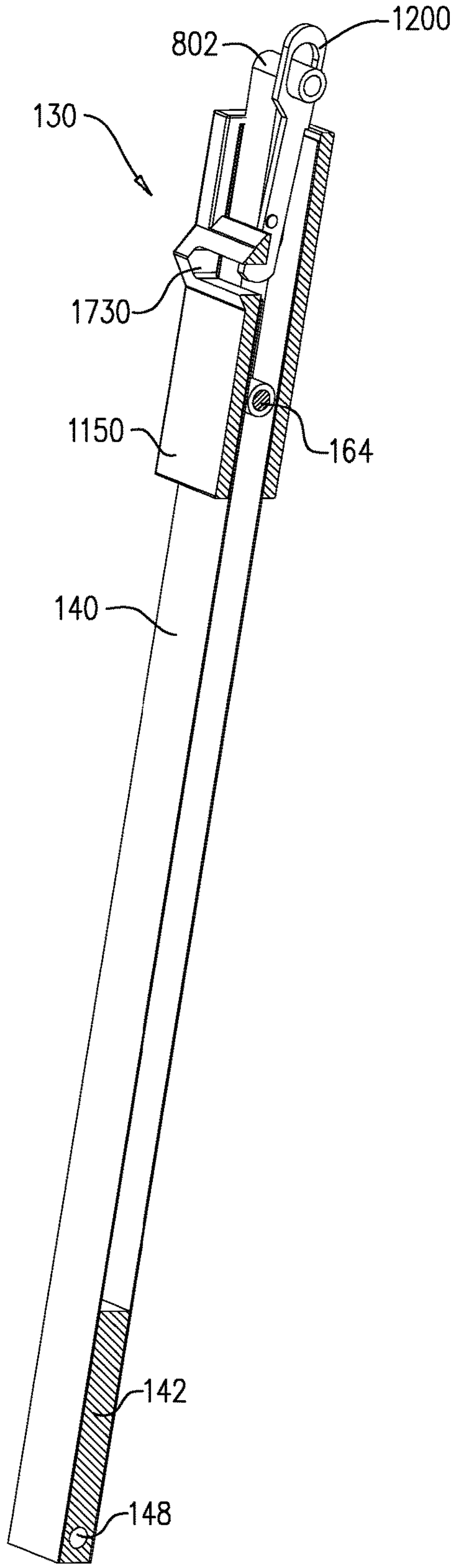

Reference is now made to FIGS. 29A and 29B, which are simplified respective pictorial and sectional illustrations of leg locking element 1200 forming part of the worktable auxiliary support assembly 130, which in turn forms part of the convertible sawhorse and worktable assembly 100 of FIGS. 26A-27B, FIG. 29B being taken along respective lines 29B-29B in FIG. 29A. As seen in FIGS. 29A & 29B, leg locking element 1200 is a generally planar element, and includes a relatively narrow shank portion 1802, having a pair of circular side protrusions 1804 formed on opposite surfaces thereof.

Above shank portion 1802, leg locking element 1200 includes a relatively wide portion 1806 having formed therein an elongate slot 1808. Below shank portion 1802, leg locking element includes a hook portion 1810.

Reference is now made to FIGS. 30A, 30B, 30C and 30D, which are simplified respective first and second pictorial exploded views, a pictorial assembled view and a pictorial sectional view of one side of a worktable auxiliary support assembly 130 forming part of the convertible sawhorse and worktable assembly of FIGS. 26A-27B.

As seen in FIGS. 30A-30D, each linkage element 160 is partially seated within a corresponding leg element 140 between edge surfaces 604 thereof adjacent upper end 616 of each leg element 140. The second hollow cylindrical portion 804 of each linkage element is located between elongate slidable engagement apertures 612 of each leg element and a pivotable and slidable engagement pin 164 extends through the second hollow cylindrical portion 804 and into engagement with both of the elongate slidable engagement apertures 612 of each leg element. Part of elongate portion 806 and the first hollow cylindrical portion 802 of each linkage element 160 extends above the upper end of each leg element 140.

A selectably lockable leg articulation element 1150 is fixed to the upper end 616 of each leg element 140 and axially aligned therewith such that mutually aligned elongate slots 1706 of the selectably lockable leg articulation element 1150 are preferably aligned with corresponding elongate slidable engagement apertures 612 of each leg element.

As noted above with reference to FIG. 26C, locking element 1200 is slidably and pivotably mounted onto cylindrical portion 802 of linkage element 160 and, depending on the angular orientation of the leg element 140 relative to the worktable surface defining element 120, lockingly engages leg articulation element 1150 at transverse bore 1730. It is noted that circular side protrusion 1804 of locking element 1200 slidably engages generally elongate recess 840 of linkage element 160 for restricting relative mutual displacement thereof.

It is appreciated that FIGS. 30A-30D show linkage element 160 in a relatively lowered position in which it is axially aligned with leg element 140 and with selectably lockable leg articulation element 1150 and show locking element 1200 in locking engagement with leg articulation element 1150 at transverse bore 1730 thereof. As will be described hereinbelow in greater detail, linkage element 160, when not locked by locking element 1200, is able to slide upwardly relative to leg element 140 and to selectably lockable leg articulation element 1150 and to pivot relative thereto about the pivot axis defined by pivotable and slidable engagement pin 164.

Figure 32B:
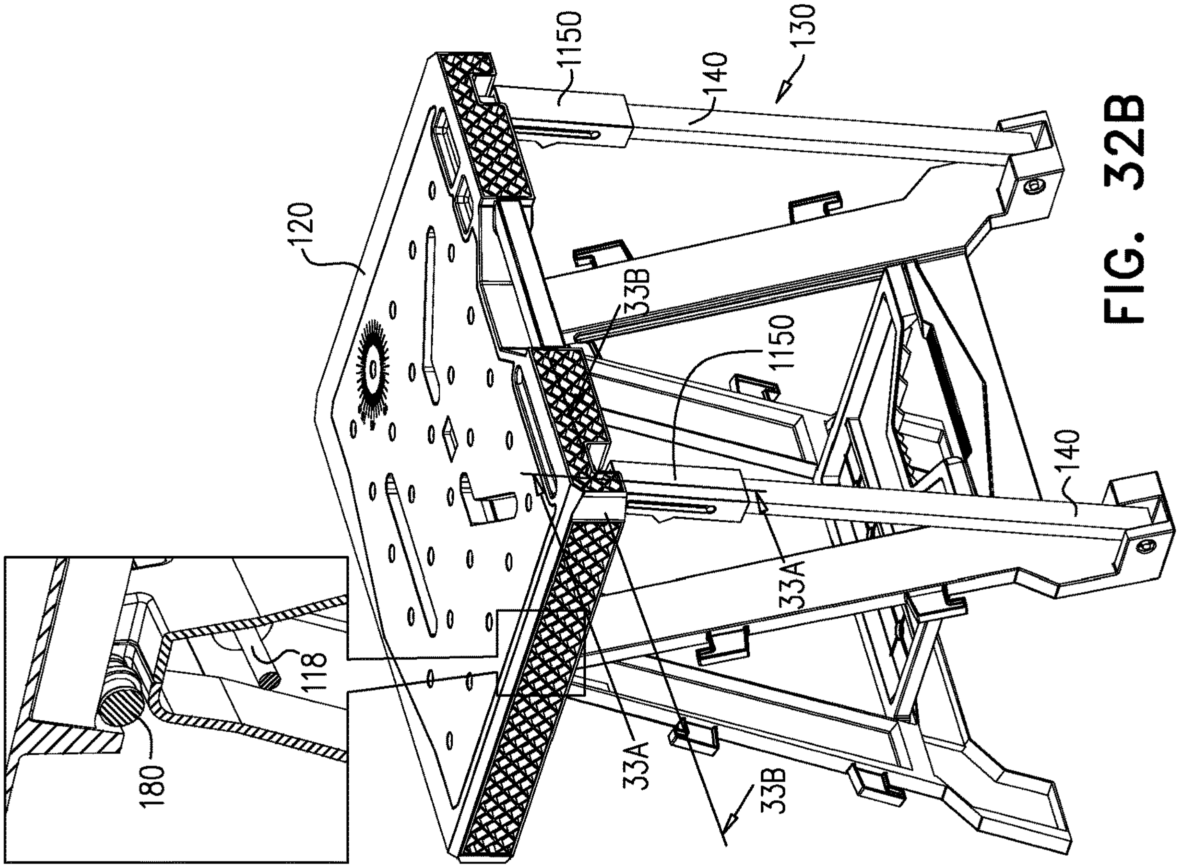
FIGS. 32A and 32B are simplified respective exploded view and assembled view illustrations showing pivotable mounting of worktable auxiliary support assembly onto the worktable surface defining element in the embodiment of FIGS. 26A-27B.
Figure 32A:
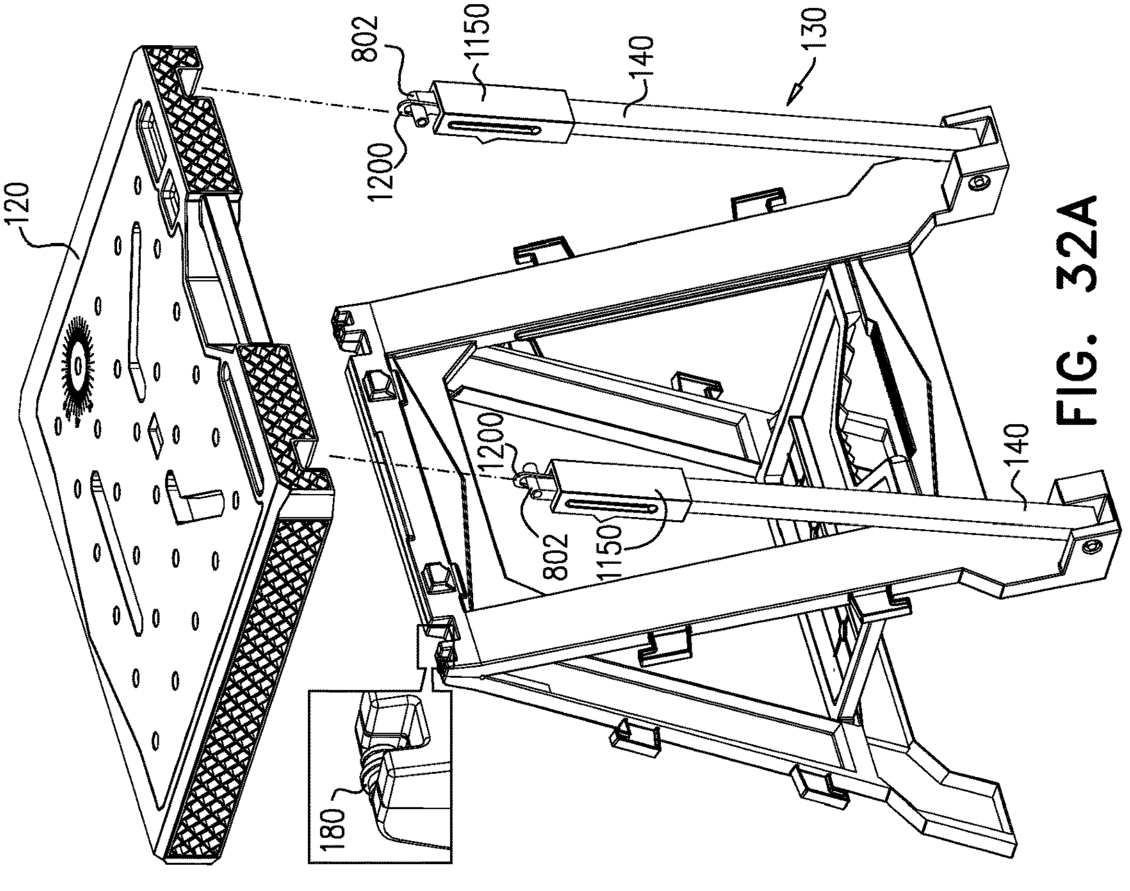
Figure 33A:
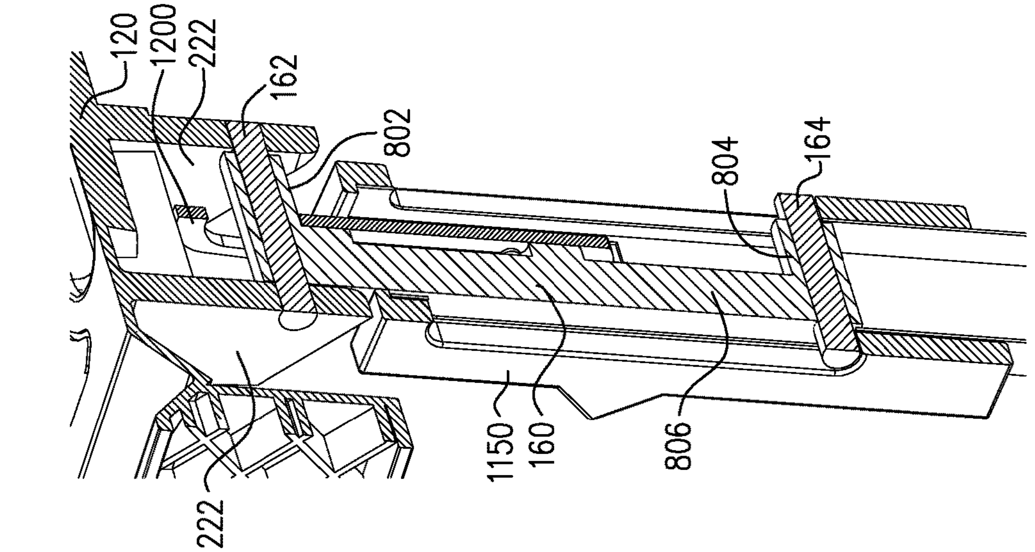
FIGS. 33A and 33B are sectional illustrations taken along respective lines 33A-33A and 33B-33B in FIG. 32.
Figure 33B:
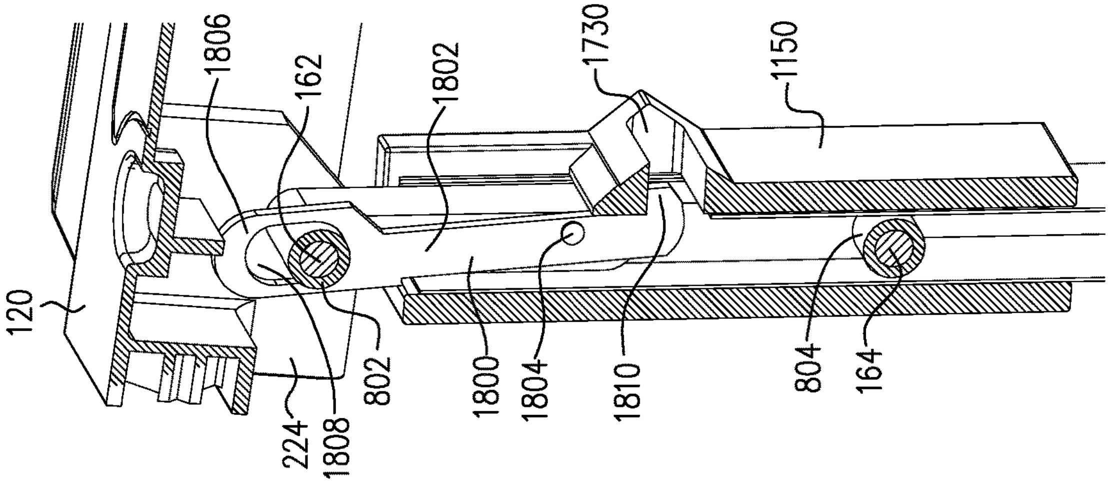
Figure 36A:
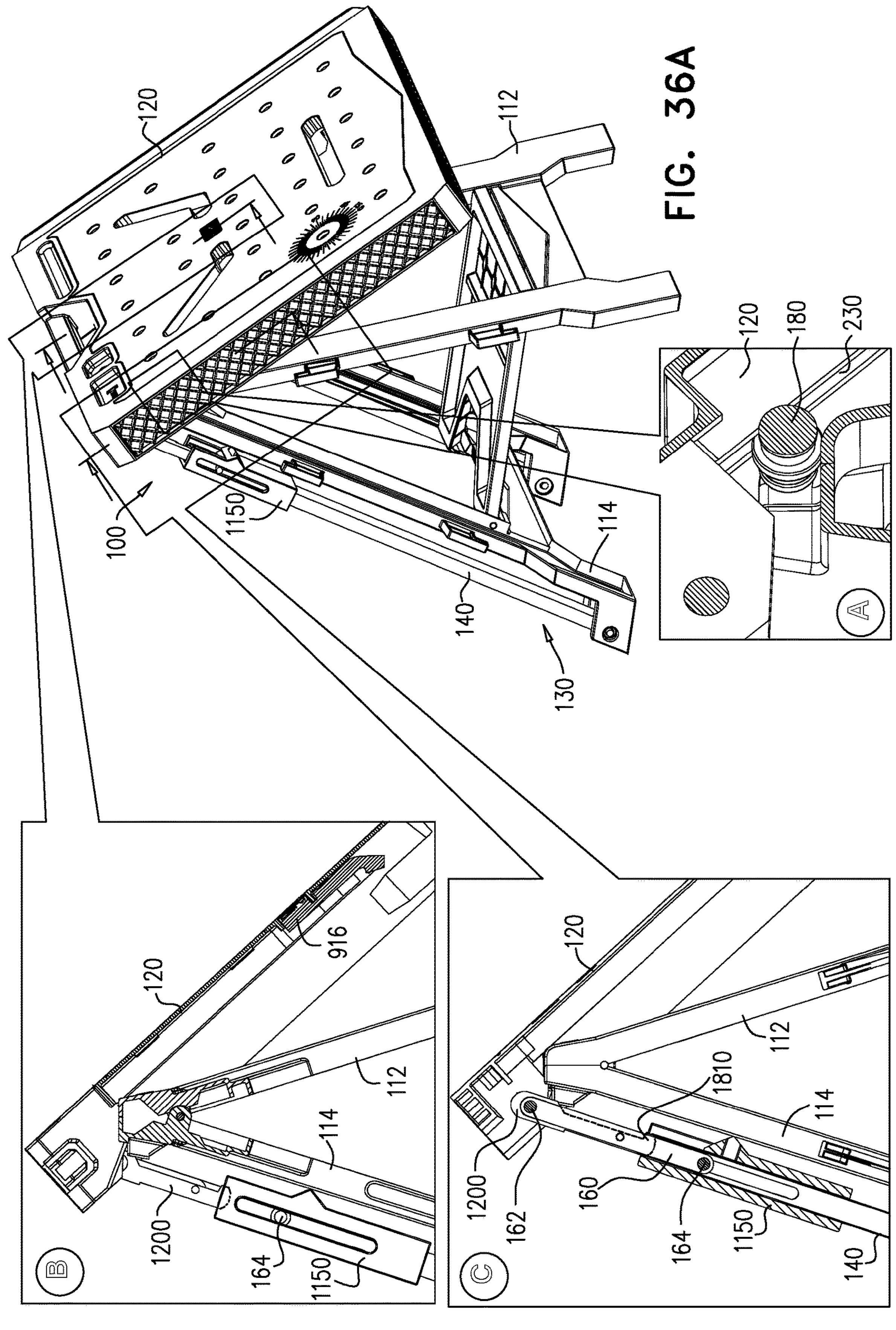
FIGS. 36A, 36B and 36C are simplified first and second pictorial and planar side view illustrations of the convertible sawhorse and worktable assembly of FIGS. 26A-33B in a second intermediate operative orientation wherein the sawhorse assembly is in an open operative orientation and the worktable surface defining element is in a partially raised orientation.
Figure 36B:
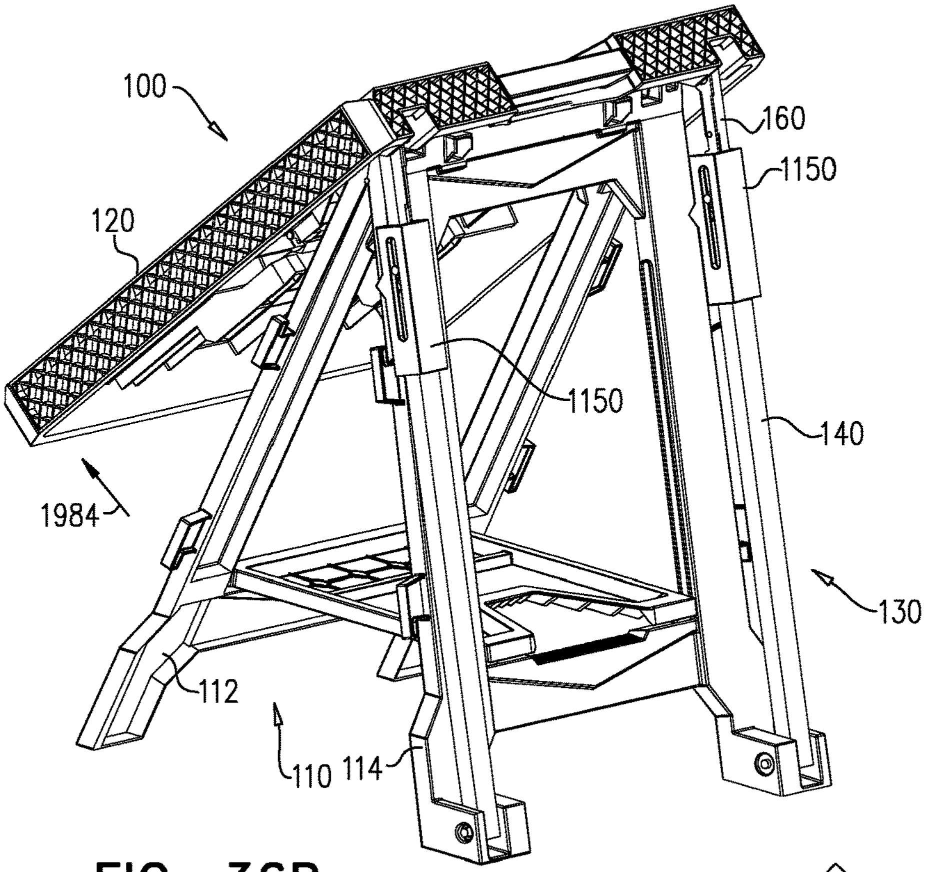
Figure 36C:
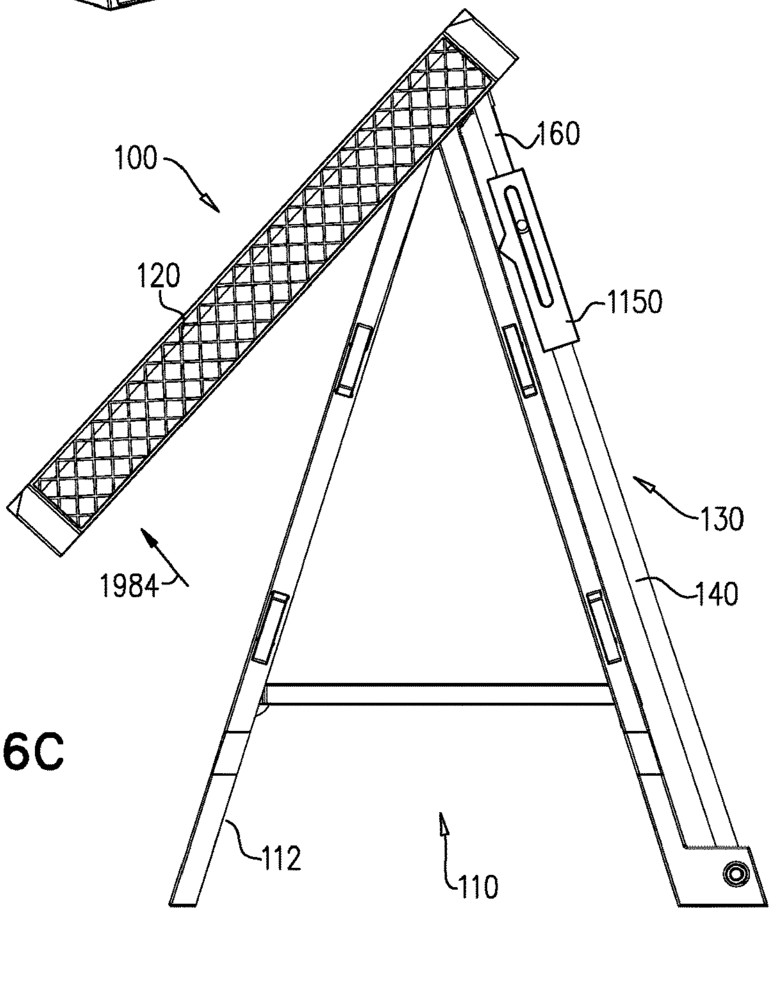

Reference is now made to FIGS. 32A and 32B, which are simplified respective exploded view and assembled view illustrations showing pivotable mounting of worktable auxiliary support assembly 130 of the embodiment shown in FIGS. 26A-31, including selectably lockable leg articulation element 1150, onto the worktable surface defining element 120 in a leg locked operative orientation corresponding to the operative orientation shown in FIGS. 36A, 36B and 36C, and to FIGS. 33A and 33B, which are sectional illustrations taken along respective lines 33A-33A and 33B-33B in FIG. 32B.

It is seen that pivotable engagement pin 162, which extends through first cylindrical portion 802 of linkage element 160, engages and is retained between apertured pivotable mounting brackets 222. It is also seen that leg locking element 1200 is slidably and pivotably mounted onto worktable surface defining element 120 via cylindrical portion 802 of linkage element 160 and pin 162, extending therethrough, and lockingly engages leg articulation element 1150 at transverse bore 1730 thereof.

Reference is now made to FIGS. 34A-38C, which illustrate various stages in the operation of convertible sawhorse and worktable assembly 100 of FIGS. 26A-33B.

Figure 34A:
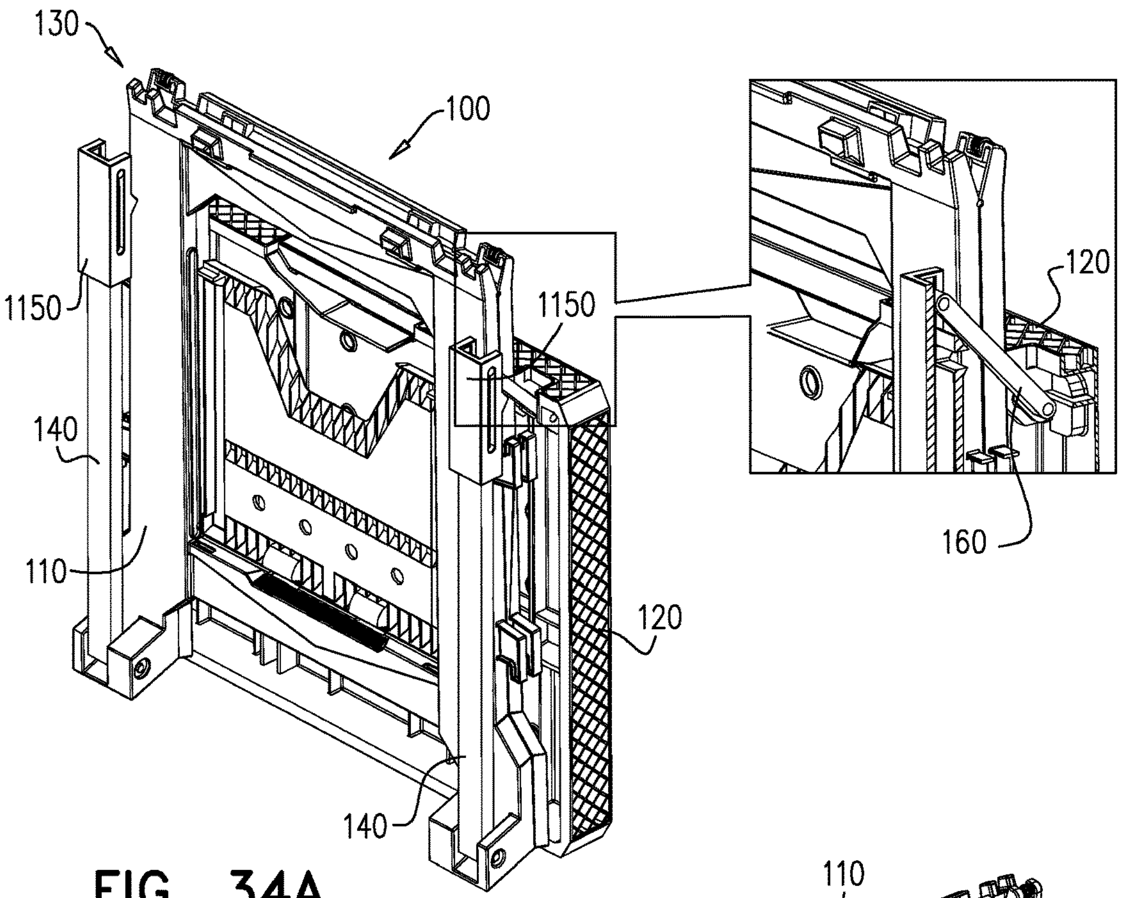
FIGS. 34A, 34B and 34C are simplified first and second pictorial and planar side view illustrations of the convertible sawhorse and worktable assembly of FIGS. 26A-33B in a storage operative orientation.
Figure 34B:
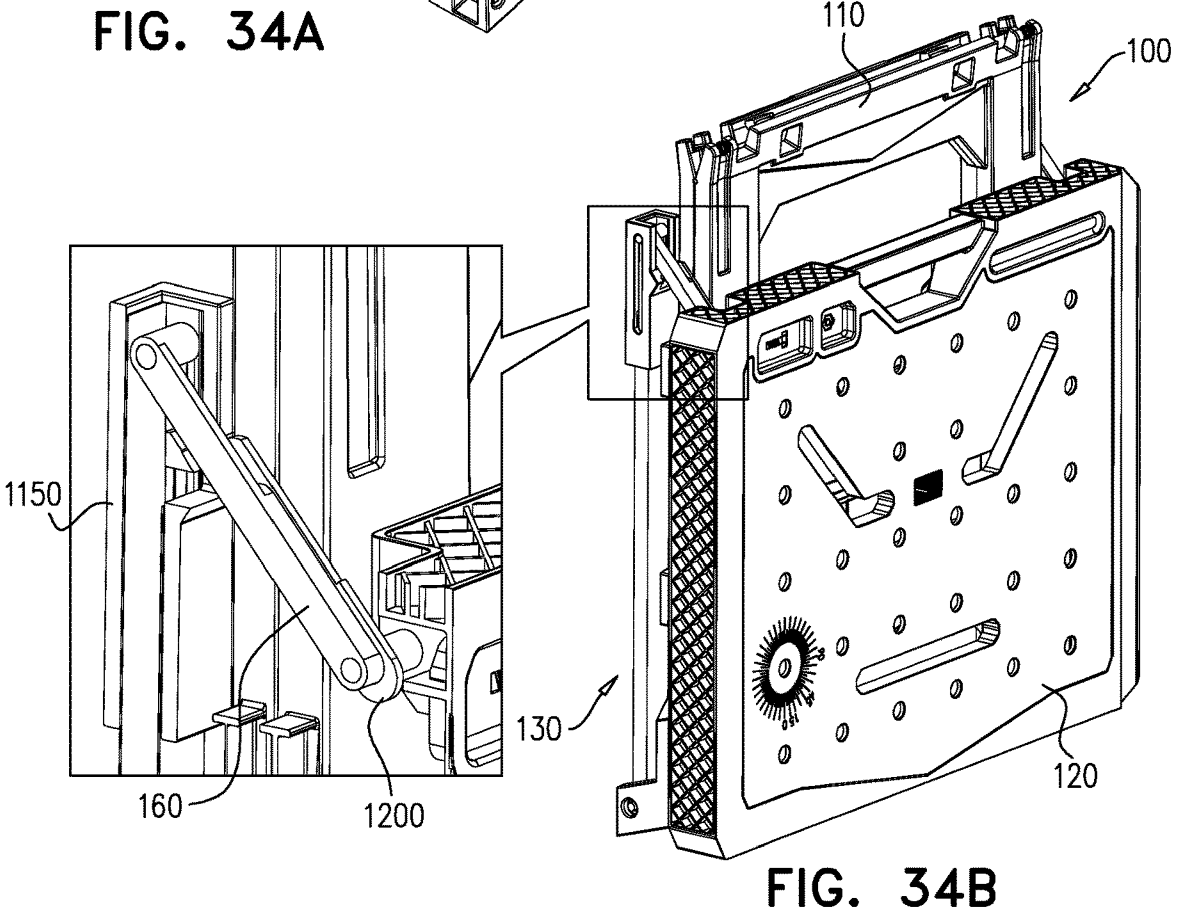
Figure 34C:
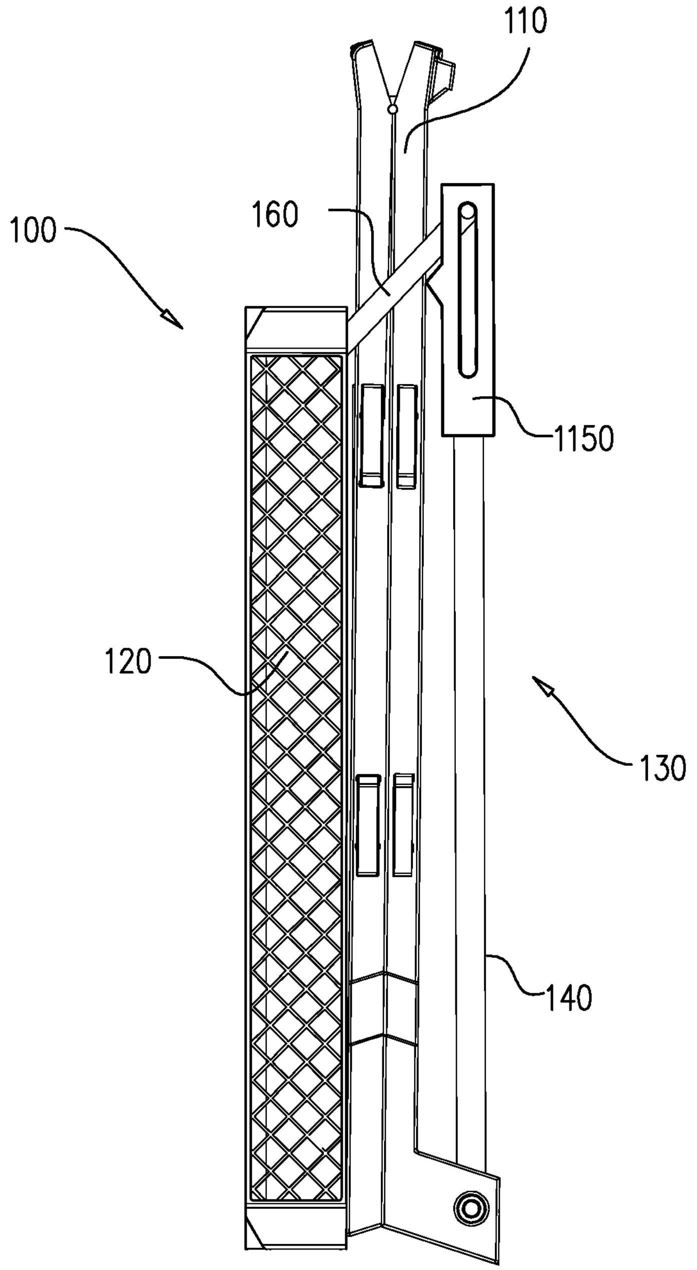

Referring specifically to FIGS. 34A-34C, it is seen that in a storage operative orientation, the convertible sawhorse and worktable assembly 100 of FIGS. 26A-33B is in a compact state with the sawhorse assembly 110 being in a closed, generally flat, state, the worktable surface defining element 120 being located generally parallel to the sawhorse assembly 110 on a first side thereof and the worktable auxiliary support assembly 130 being located generally parallel to the sawhorse assembly 110 on a second side thereof and being joined to the worktable surface defining element 120 by linkage elements 160.

Figure 35A:
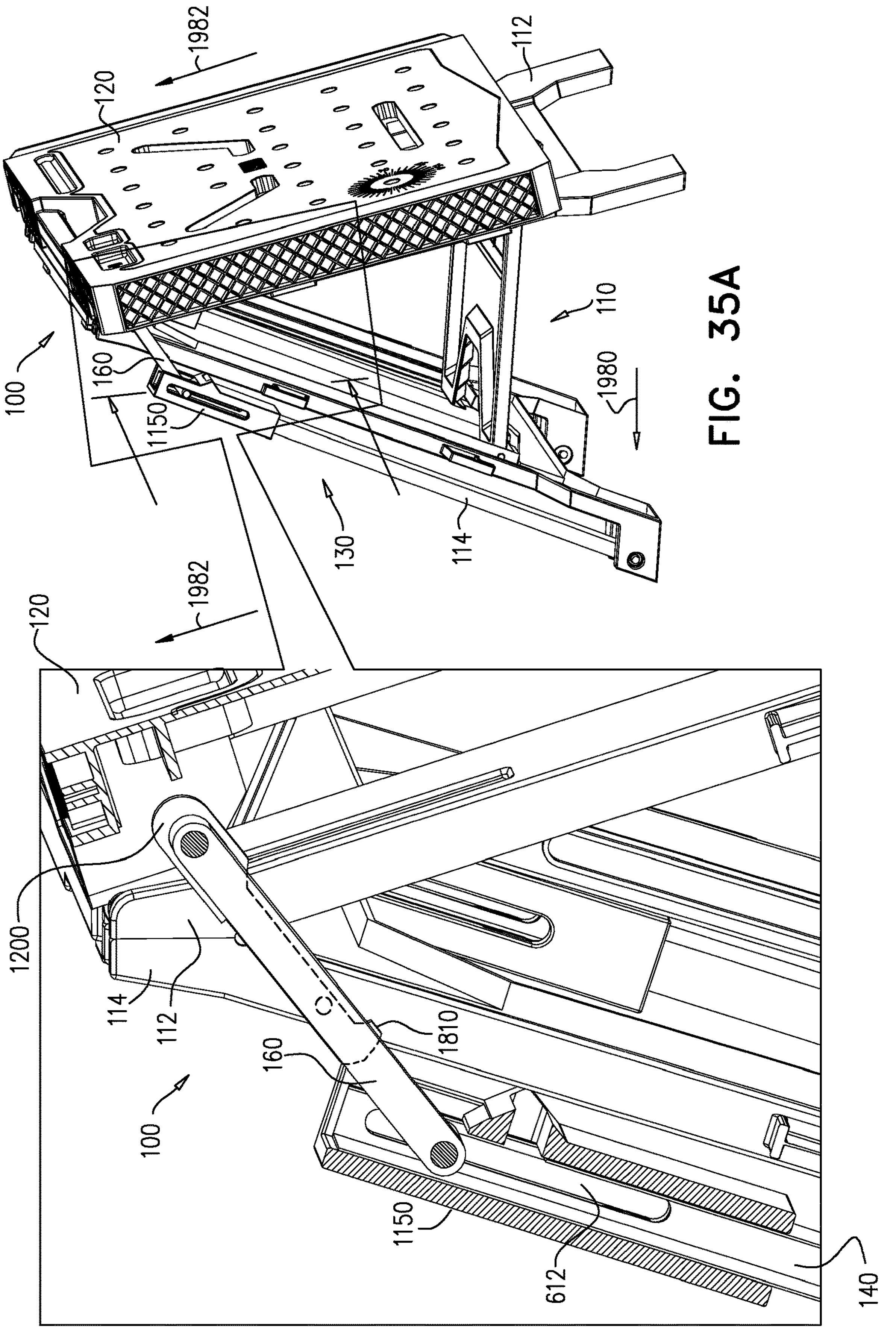
FIGS. 35A, 35B and 35C are simplified first and second pictorial and planar side view illustrations of the convertible sawhorse and worktable assembly of FIGS. 26A-33B in a first intermediate operative orientation wherein the sawhorse assembly is in an open operative orientation and the worktable surface defining element is in a fully lowered orientation.
Figure 35B:
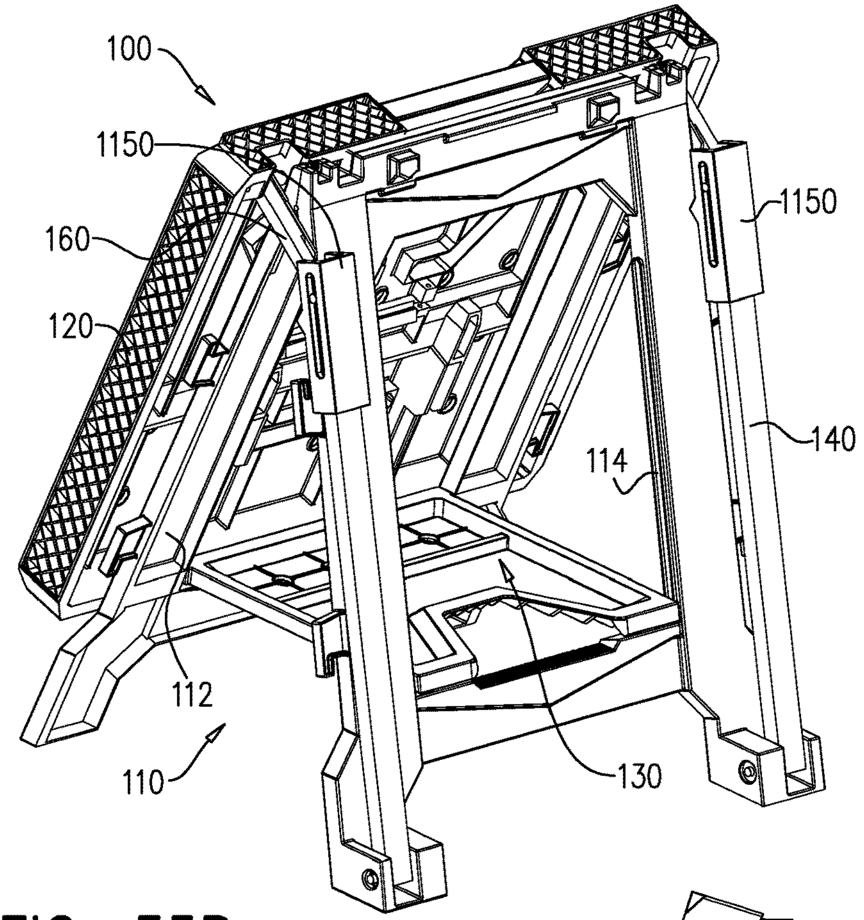
Figure 35C:
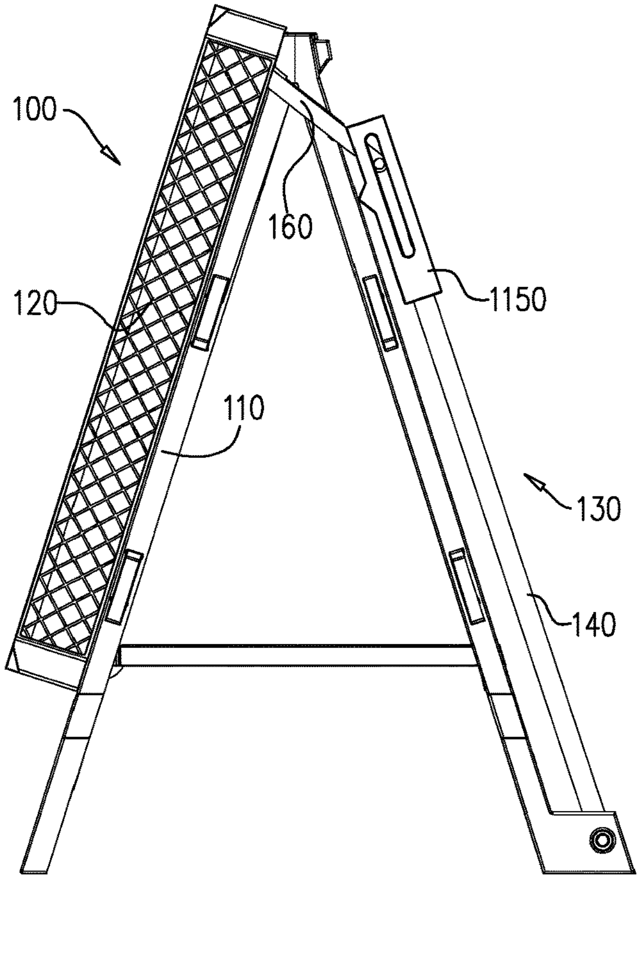

Referring now specifically to FIGS. 35A, 35B and 35C, it is seen that in a first intermediate operative orientation, the sawhorse assembly 110 is in an open, inverted V-shaped, operative orientation and the worktable surface defining element 120 is located generally parallel to first sawhorse element 112 of the sawhorse assembly 110 on a first side thereof and the worktable auxiliary support assembly 130 is located generally parallel to second sawhorse element 114 of the sawhorse assembly 110 on a second side thereof and is joined to the worktable surface defining element 120 by linkage elements 160. As seen in FIGS. 35A-35C, opening of the sawhorse assembly 110 moves second sawhorse element 114 relative to sawhorse element 112, as indicated by an arrow 1980, causing worktable surface defining element 120 to move upwardly relative to first sawhorse element 112 while remaining generally parallel to first sawhorse element 112, as indicated by an arrow 1982.

Referring now specifically to FIGS. 36A, 36B and 36C, it is seen that in a second intermediate operative orientation, the sawhorse assembly 110 is in an open operative orientation and the worktable surface defining element 120 is no longer located generally parallel to the sawhorse assembly 110 and is beginning to be raised and pivoted relative to the sawhorse assembly 110, as indicated by an arrow 1984, by engagement of parallel roller engagement tracks 230 of the worktable surface defining element 120 with rollers 180 of the sawhorse assembly 110.

As seen particularly in enlargement C of FIG. 36A, hook portion 1810 of leg locking element 1200 is not in locking engagement with transverse bore 1730 of leg articulation element 1150.

Figure 37A:
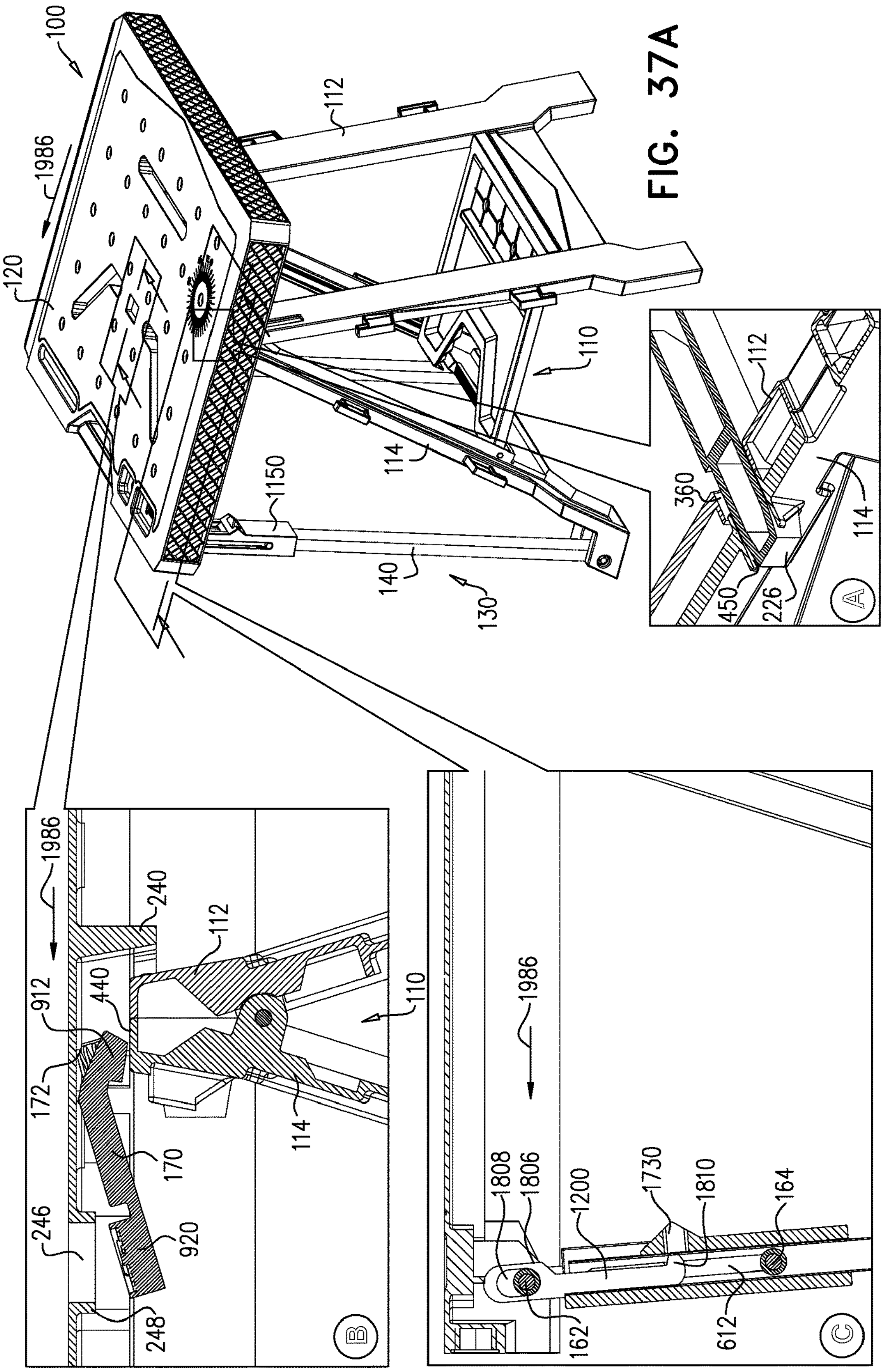
FIGS. 37A, 37B and 37C are simplified first and second pictorial and planar side view illustrations of the convertible sawhorse and worktable assembly of FIGS. 26A-33B in a third intermediate operative orientation wherein the sawhorse assembly is in an open operative orientation and the worktable surface defining element is in a fully raised and unlocked orientation.
Figure 37B:
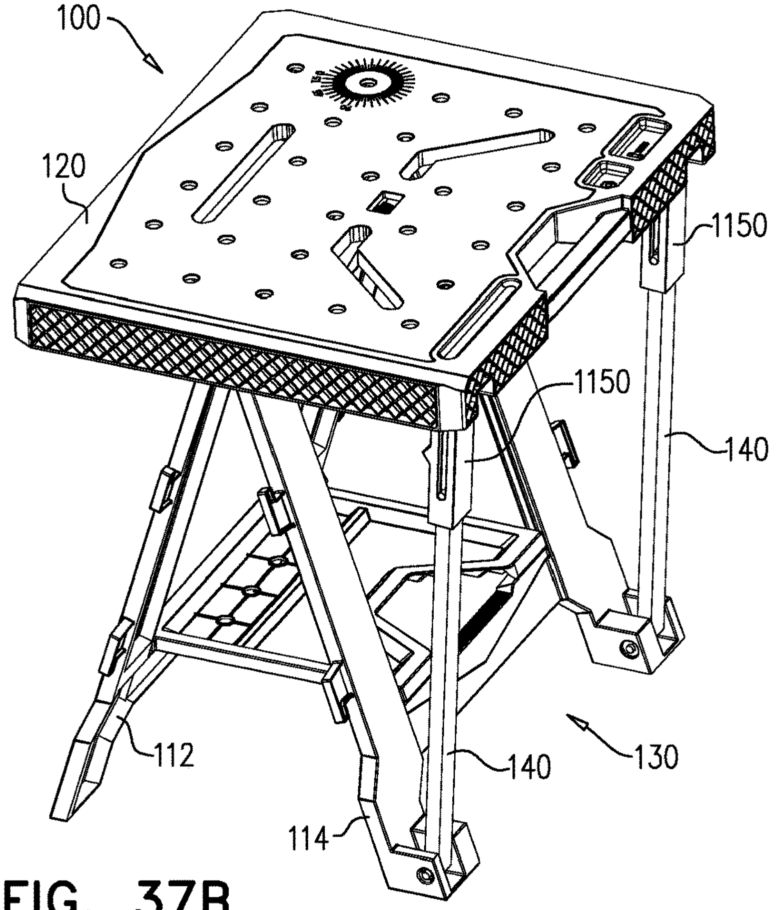
Figure 37C:
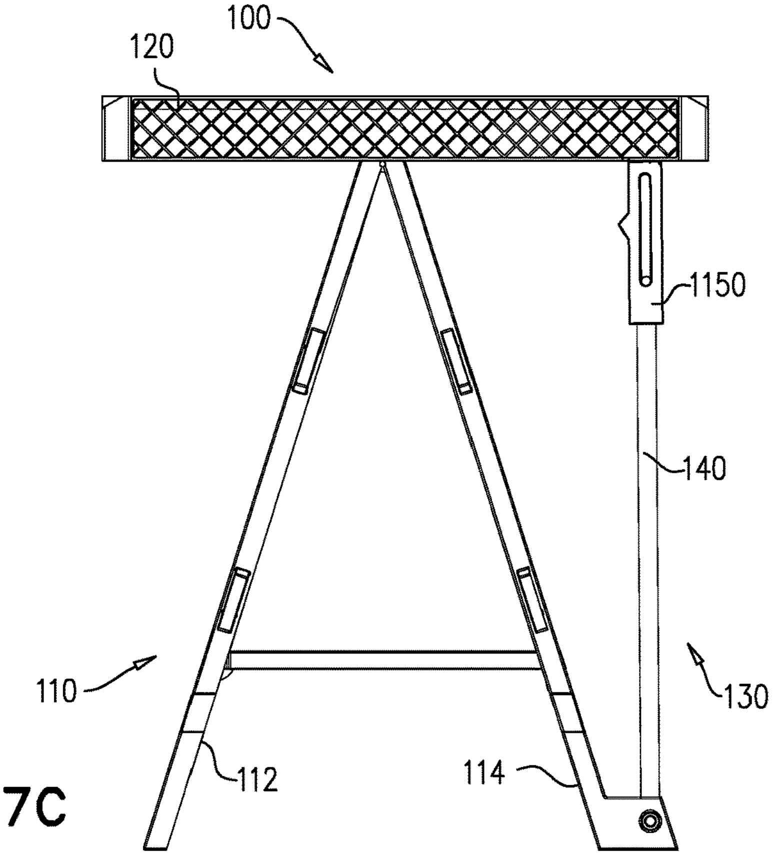

Referring now specifically to FIGS. 37A, 37B and 37C, it is seen that in a third intermediate operative orientation, the sawhorse assembly 110 is in an open operative orientation and the worktable surface defining element 120 is generally horizontal and is supported on the sawhorse assembly 110 but is not yet locked in place. As seen particularly in enlargement A of FIG. 37A, in this operative orientation locking protrusions 226 of worktable surface defining assembly 120 have partially engaged locking protrusion receiving apertures 360 of first sawhorse element 112 of sawhorse assembly 110 and apertured locking element receiving protrusions 450 of second sawhorse element 114 of the sawhorse assembly 110.

In the operative orientation shown in FIGS. 37A-37C, as seen particularly in enlargement B of FIG. 37A, manual engageable button portion 920 of manually operable table locking element 170 is prevented from engaging manually engageable button accommodating aperture 246, against urging of compression springs 172 seated on engagement portion 912 of manually operable table locking element 170, by engagement of elongate portion 912 of manually operable table locking element 170 with top facing edge 440 of second sawhorse element 114 of sawhorse assembly 110.

As seen particularly in enlargement C of FIG. 37A, hook portion 1810 of leg locking element 1200 is not in locking engagement with transverse bore 1730 of leg articulation element 1150.

Locking of worktable surface defining assembly 120 is achieved by moving worktable surface defining assembly 120 forwardly relative to sawhorse assembly 110, in a direction indicated by an arrow 1986 in FIG. 37A, thereby allowing elongate portion 912 of manually operable table locking element 170 to clear top facing edge 440 of second sawhorse element 114 of sawhorse assembly 110 and causing engagement of engageable button portion 920 of manually operable table locking element 170 with manually engageable button accommodating aperture 246, under the urging of compression springs 172, seated on engagement portion 912 of manually operable table locking element 170. Additionally, forward movement of worktable surface defining assembly 120 relative to sawhorse assembly 110 together with rotation of leg elements 140 of worktable auxiliary support assembly 130 relative to second sawhorse element 114 about mounting pins 144 moves hook portion 1810 of leg locking element 1200 into locking engagement with transverse bore 1730 of leg articulation element 1150 of worktable auxiliary support assembly 130. Locking protrusions 226 of worktable surface defining assembly 120 fully engage locking protrusion receiving apertures 360 of first sawhorse element 112 of sawhorse assembly 110 and apertured locking element receiving protrusions 450 of second sawhorse element 114 of the sawhorse assembly 110.

A worktable usage operative orientation of convertible sawhorse and worktable assembly 100 of FIGS. 26A-33B, in which sawhorse assembly 110 is open and worktable surface defining assembly 120 is locked relative thereto, is described below with specific reference to FIGS. 38A, 38B and 38C. It is seen that, in the worktable usage operative orientation, the sawhorse assembly 110 is in an open operative orientation and the worktable surface defining element 120 is generally horizontal and is supported on the sawhorse assembly 110 and is shifted slightly forward from the orientation shown in FIGS. 37A-37C, in a direction indicated by an arrow 1988, relative to the sawhorse assembly 110 and is locked in place.

Figure 38A:
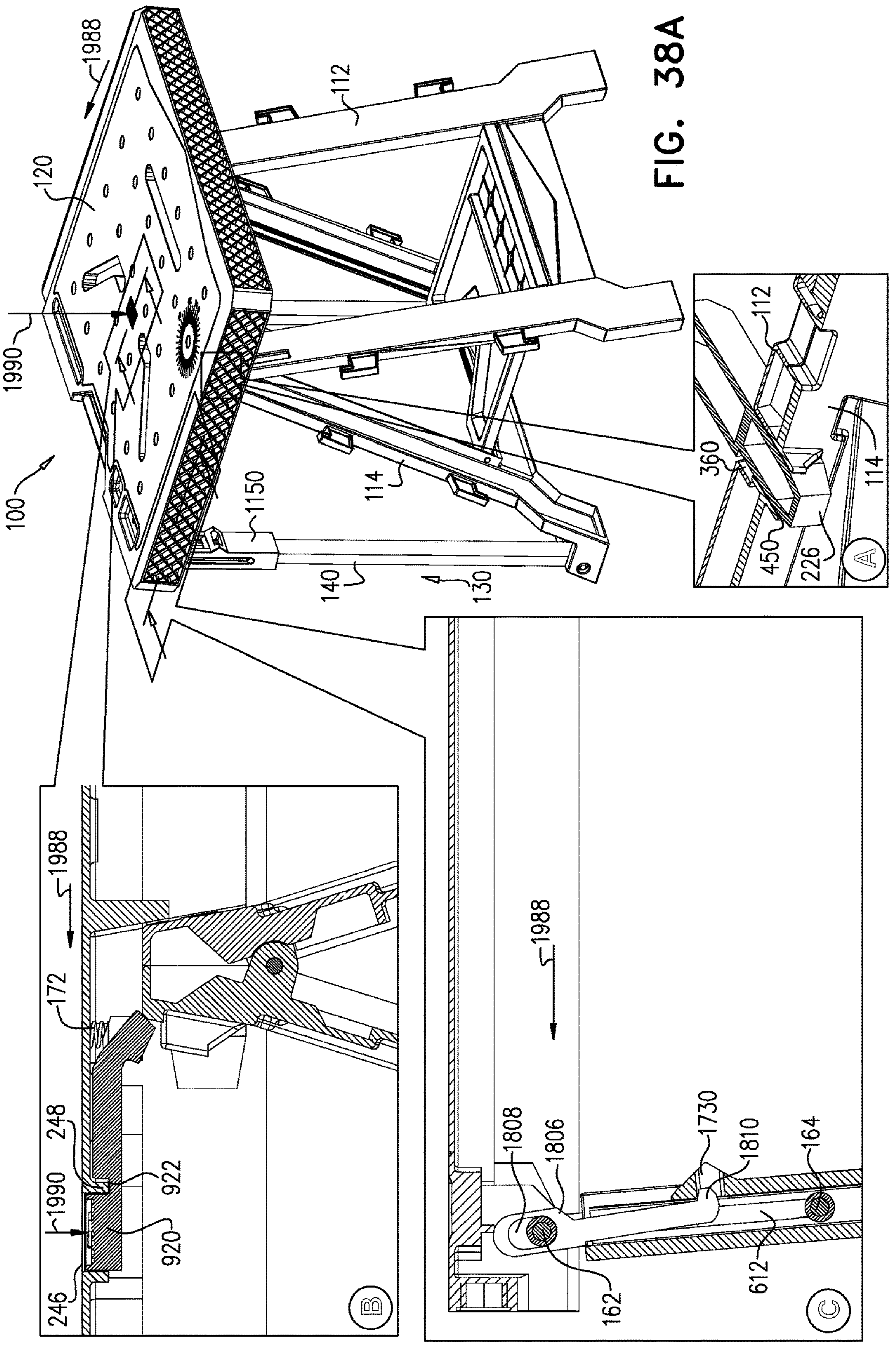
FIGS. 38A, 38B and 38C are simplified first and second pictorial and planar side view illustrations of the convertible sawhorse and worktable assembly of FIGS. 26A-33B in a worktable usage operative orientation wherein the sawhorse assembly is in an open operative orientation and the worktable surface defining element is in a fully raised and locked orientation.

As seen particularly in enlargement A of FIG. 38A, in this operative orientation locking protrusions 226 of worktable surface defining assembly 120 fully engage locking protrusion receiving apertures 360 of first sawhorse element 112 of sawhorse assembly 110 and apertured locking element receiving protrusions 450 of second sawhorse element 114 of sawhorse assembly 110. The locking engagement of locking protrusions 226 of worktable surface defining assembly 120 with locking protrusion receiving apertures 360 and apertured locking element receiving protrusions 450 of sawhorse assembly 110 prevents vertical movement of worktable surface defining assembly 120 relative to sawhorse assembly 110.

Figure 38B:
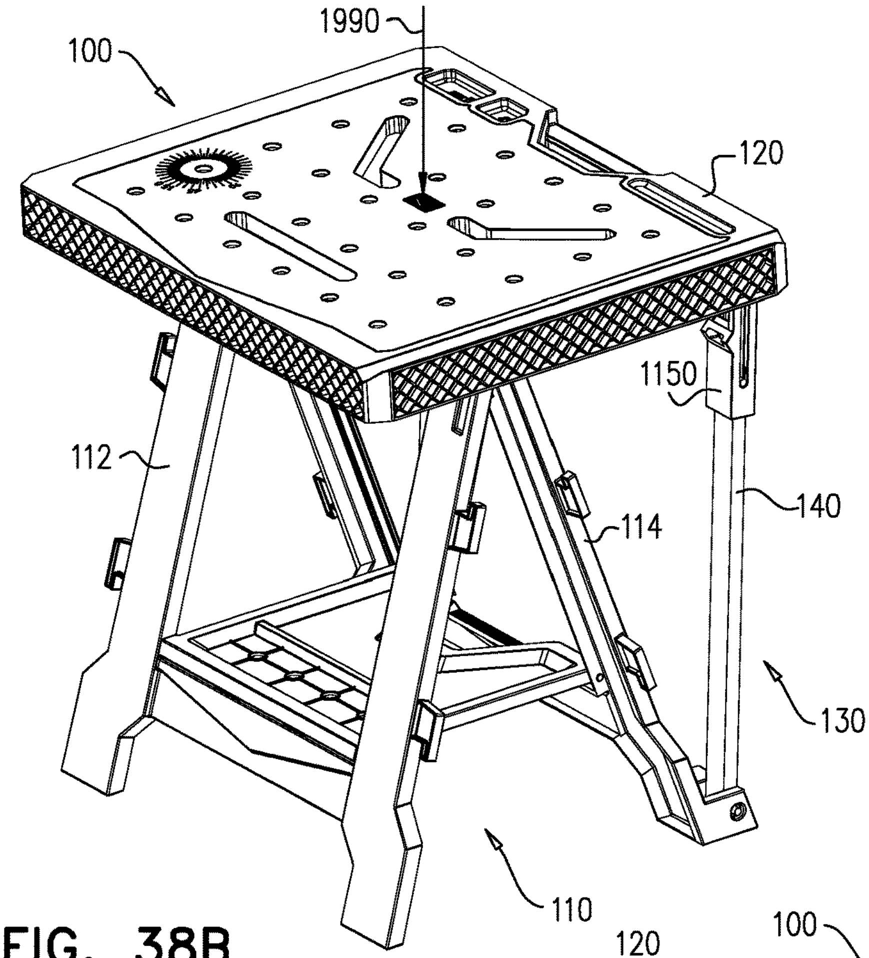
Figure 38C:
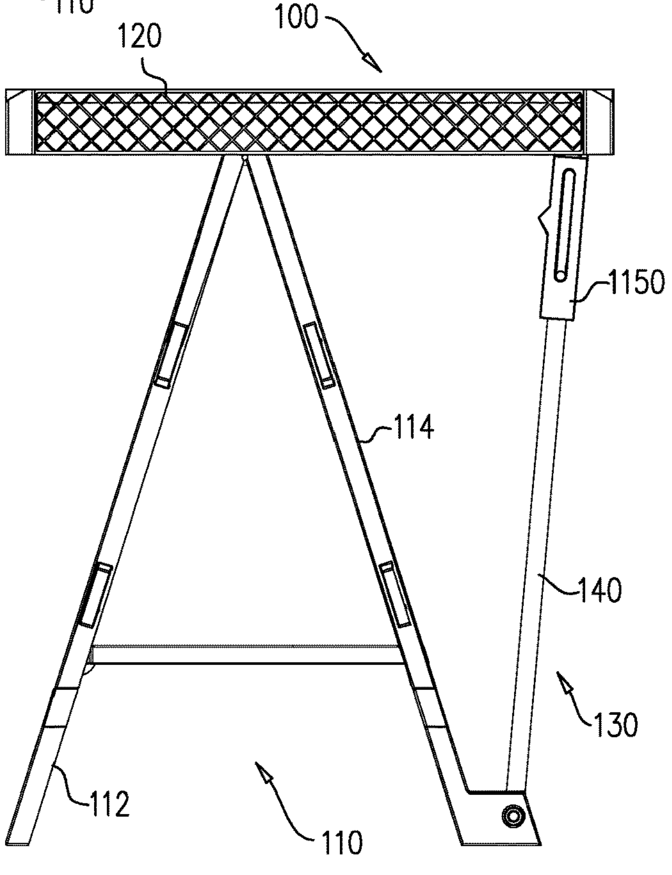

As seen particularly in enlargement B of FIG. 38A, in the operative orientation shown in FIGS. 38A-38C, engageable button portion 920 of manually operable table locking element 170 is in engagement with manually engageable button accommodating aperture 246, under urging of compression springs 172 seated on engagement portion 912 of manually operable table locking element 170. Additionally, a portion of rectangular protrusion 248 of worktable surface defining element 120 engages linkage portion 922 of manually operable table locking element 170. The locking engagement of engageable button portion 920 with manually engageable button accommodating aperture 246 and locking engagement of portion of rectangular protrusion 248 of worktable surface defining element 120 with linkage portion 922 of manually operable table locking element 170 prevents horizontal movement of worktable surface defining element 120 relative to sawhorse assembly 110.

As seen particularly in enlargement C of FIG. 38A, hook portion 1810 of leg locking element 1200 is in locking engagement with transverse bore 1730 of leg articulation element 1150 of worktable auxiliary support assembly 130. The locking engagement of hook portion 1810 of leg locking element 1200 with transverse bore 1730 of leg articulation element 1150 of worktable auxiliary support assembly 130 prevents worktable surface defining assembly 120 from tilting relative to sawhorse element 110.

Unlocking of the convertible sawhorse and worktable assembly of FIGS. 26A-33B from the worktable usage operative orientation is achieved by manually depressing button portion 920 of table locking element 170 as indicated by an arrow 1990 in FIGS. 38A and 38B. This depression disengages engageable button portion 920 of table locking element 170 from manually engageable button accommodating aperture 246 of the worktable surface defining element 120 and allows displacement of the worktable surface defining element 120 relative to sawhorse assembly 110 to any of the operative orientations described hereinabove with reference to FIGS. 34A-37C.

It will be appreciated by persons skilled in the art that the present invention is not limited by what has been particularly shown and described hereinabove. Rather the scope of the present invention includes both combinations and subcombinations of the various features described hereinabove as well as modifications thereof which would occur to persons skilled in the art upon reading the foregoing description and which are not in the prior art.

The invention claimed is:

1. An assembly comprising:

a sawhorse including first and second sawhorse elements pivotably connected to each other at one end thereof to define an upper end of said sawhorse, said first and second sawhorse elements pivotable relative to each other between a closed sawhorse position in which said first and second sawhorse elements are folded substantially against each other and an open sawhorse position in which said first and second sawhorse elements are spaced apart from each other below said upper end;

a worktable including an upper surface and a lower surface;

a first support leg pivotably secured at a first location thereof to said first sawhorse element; and a first link comprising an elongate portion extending along a longitudinal axis, said link further comprising a first engagement pin pivotably disposed with respect to said elongate portion and pivotably secured to said lower surface of said worktable, said link pivotably secured to said first support leg at a second location of said first support leg to pivotably secure the first support leg to said worktable.

2. The assembly recited in claim 1, said link further comprising a first cylindrical portion extending from said elongate portion, said first engagement pin disposed in said first cylindrical portion.

3. The assembly recited in claim 2, said link comprising a second cylindrical portion extending from said elongate portion.

4. The assembly recited in claim 3, said first support leg including a support leg aperture, said first link further comprising a second engagement pin disposed in said second cylindrical portion and extending through said support leg aperture, said second engagement pin slidable in and pivotable relative to said support leg aperture.

5. The assembly recited in claim 4, said worktable including mounting brackets formed on said lower surface, said first engagement pin pivotably secured to said mounting brackets.

6. The assembly recited in claim 5, said support leg second location defining one end of said support leg, said assembly further comprising a lockable leg articulation element fixed on said one end of said support leg and having a lockable leg articulation element slot aligned with said support leg aperture.

7. The assembly recited in claim 1, said assembly comprising first and second support legs, each of said first and second support legs pivotably secured at a first location thereof to said first sawhorse element, said assembly comprising first and second links, said first link attached to said worktable and pivotably secured to said first support leg at a second location of said first support leg to pivotably secure the first support leg to said worktable and said second link attached to said worktable and pivotably secured to said second support leg at a second location of said second support leg to pivotably secure the second support leg to said worktable.

8. The assembly recited in claim 7, said first and second links both pivotably attached to said worktable.

9. The assembly recited in claim 8, said first and second links each comprising an elongate portion extending along a longitudinal axis and first and second cylindrical portions extending from said elongate portion.

10. The assembly recited in claim 9, the second location of said first support leg defining one end of said first support leg and the second location of said second support leg defining one end of said second support leg, said assembly further comprising first and second lockable leg articulation elements, said first lockable leg articulation element fixed on said one end of said first support leg and said second lockable leg articulation element fixed on said one end of said second support leg.

* * * * *